US012598303B2

(12) United States Patent
Xu et al.

(10) Patent No.: US 12,598,303 B2
(45) Date of Patent: Apr. 7, 2026

(54) VIDEO ENCODING METHOD AND APPARATUS, VIDEO DECODING METHOD AND APPARATUS, AND DEVICE, SYSTEM AND STORAGE MEDIUM

(71) Applicant: GUANGDONG OPPO MOBILE TELECOMMUNICATIONS CORP., LTD., Dongguan (CN)

(72) Inventors: Luhang Xu, Dongguan (CN); Hang Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/949,592

(22) Filed: Nov. 15, 2024

(65) Prior Publication Data

US 2025/0080739 A1     Mar. 6, 2025

Related U.S. Application Data

(63) Continuation of application No. PCT/CN2022/093411, filed on May 17, 2022.

(51) Int. Cl.
H04N 19/13        (2014.01)
H04N 19/132      (2014.01)
(Continued)

(52) U.S. Cl.
CPC ........... H04N 19/13 (2014.11); H04N 19/132 (2014.11); H04N 19/176 (2014.11); H04N 19/70 (2014.11)

(58) Field of Classification Search
CPC .... H04N 19/91; H04N 19/124; H04N 19/625; G06T 5/70
See application file for complete search history.

(56) References Cited

U.S. PATENT DOCUMENTS

| | | | | |
|---|---|---|---|---|
| 2003/0108099 A1* | 6/2003 | Nagumo | ................... | G06T 9/20 |
| | | | | 375/E7.199 |
| 2014/0003533 A1* | 1/2014 | He | ......................... | H04N 19/91 |
| | | | | 375/240.01 |

(Continued)

FOREIGN PATENT DOCUMENTS

| | | |
|---|---|---|
| CN | 103813167 A | 5/2014 |
| CN | 104380740 A | 2/2015 |

(Continued)

OTHER PUBLICATIONS

International Search Report and Written Opinion of the International Searching Authority regarding International Patent Application No. PCT/CN2022/093411, dated Dec. 14, 2022. Translation provided by WIPO Translate.

*Primary Examiner* — Joseph Suh
(74) *Attorney, Agent, or Firm* — BAYES PLLC

(57) ABSTRACT

A video decoding method according to the present invention includes: decoding a bitstream, to obtain P quantization coefficients of a current region; determining, according to the P quantization coefficients, parity of a quantization coefficient whose parity is hidden of a first quantization coefficient; determining a target context model corresponding to the first quantization coefficient, and decoding the first quantization coefficient which is encoded based on context using the target context model, to obtain a decoded first quantization coefficient; and determining the second quantization coefficient according to the parity of the quantization coefficient whose parity is hidden and the decoded first quantization coefficient.

20 Claims, 7 Drawing Sheets

(51) Int. Cl.
  *H04N 19/176* (2014.01)
  *H04N 19/70* (2014.01)

(56) References Cited

U.S. PATENT DOCUMENTS

2019/0387259 A1* 12/2019 Coban .................. H04N 19/184
2020/0177882 A1* 6/2020 Yoo ........................ H04N 19/18

FOREIGN PATENT DOCUMENTS

| CN | 109788285 A | 5/2019 |
| CN | 111819854 A | 10/2020 |
| CN | 114342396 A | 4/2022 |

* cited by examiner

<u>100</u>
Encoding device 110
| Video source 111 | — | Video encoder 112 | — | Output interface 113 |
~ 130
Decoding device 120
| Display device 123 | — | Video decoder 122 | — | Input interface 121 |
FIG. 1
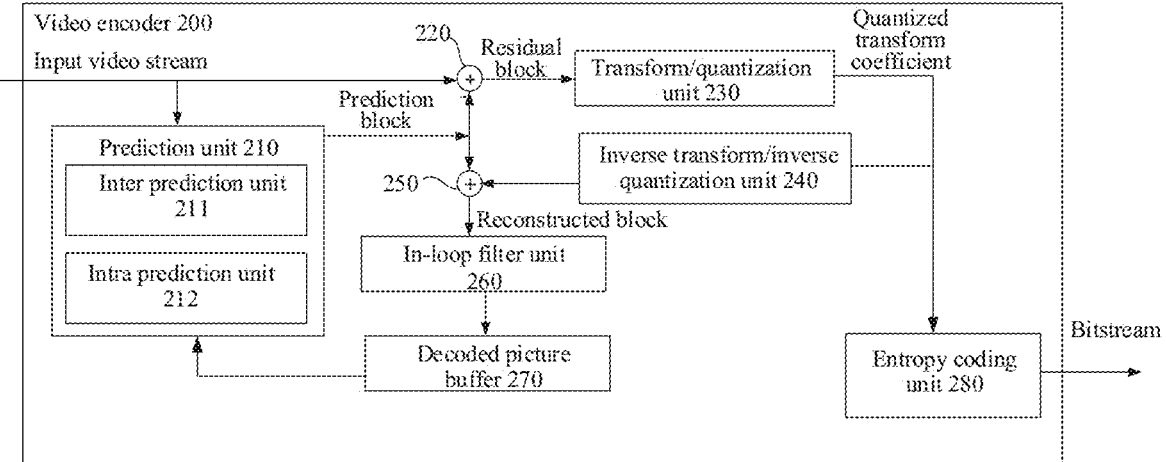
FIG. 2
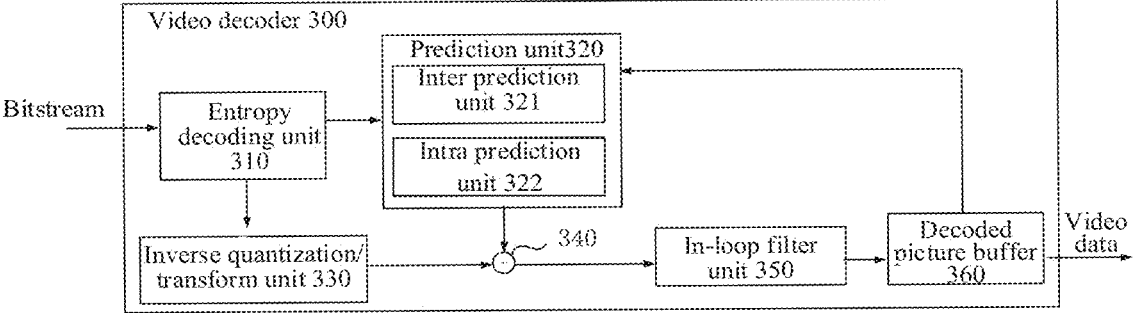
FIG. 3

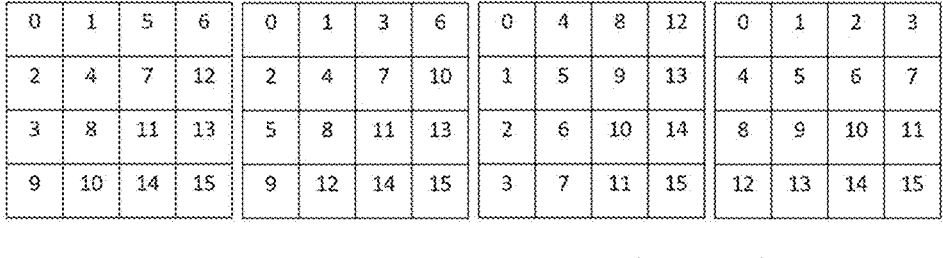

FIG. 4A      FIG. 4B      FIG. 4C      FIG. 4D

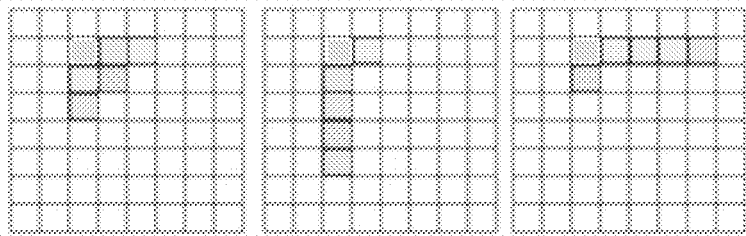

FIG. 5A      FIG. 5B      FIG. 5C

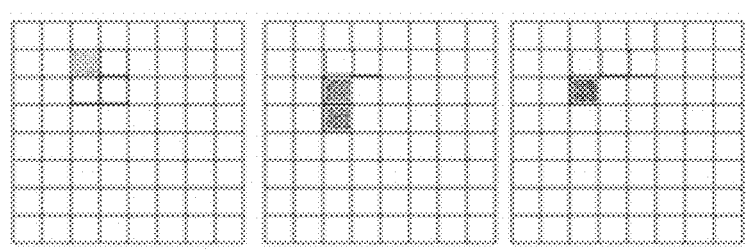

FIG. 5D      FIG. 5E      FIG. 5F

A bitstream is decoded, to obtain P quantization coefficients of a current region    S401

↓

Parity of a quantization coefficient whose parity is hidden of a first quantization coefficient is determines according to the P quantization coefficients    S402

↓

A target context model corresponding to the first quantization coefficient is determined, and the first quantization coefficient which is encoded based on context is decoded using the target context model, to obtain a decoded first quantization coefficient    S403

↓

The second quantization coefficient is determined according to the parity of the quantization coefficient whose parity is hidden and the decoded first quantization coefficient    S404

FIG. 6

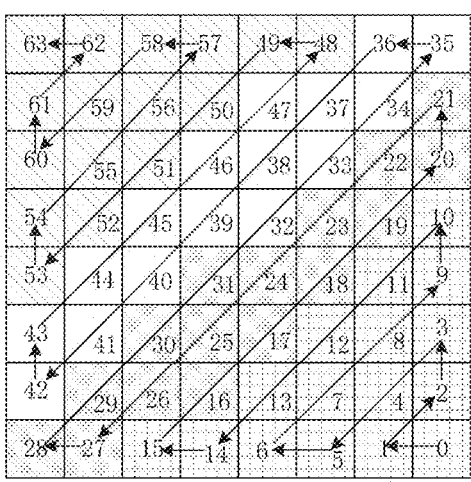
FIG. 7
| | | | | | | | |
|---|---|---|---|---|---|---|---|
| | 1 | 5 | 6 | 14 | 15 | 27 | 28 |
| 2 | 4 | 7 | 13 | | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | | 39 | 45 | 52 | 54 |
| 20 | 22 | 33 | 38 | 46 | 51 | 55 | 60 |
| | 34 | 37 | 47 | 50 | 56 | 59 | 61 |
| 35 | 36 | | 49 | 57 | 58 | 62 | 63 |
FIG. 8
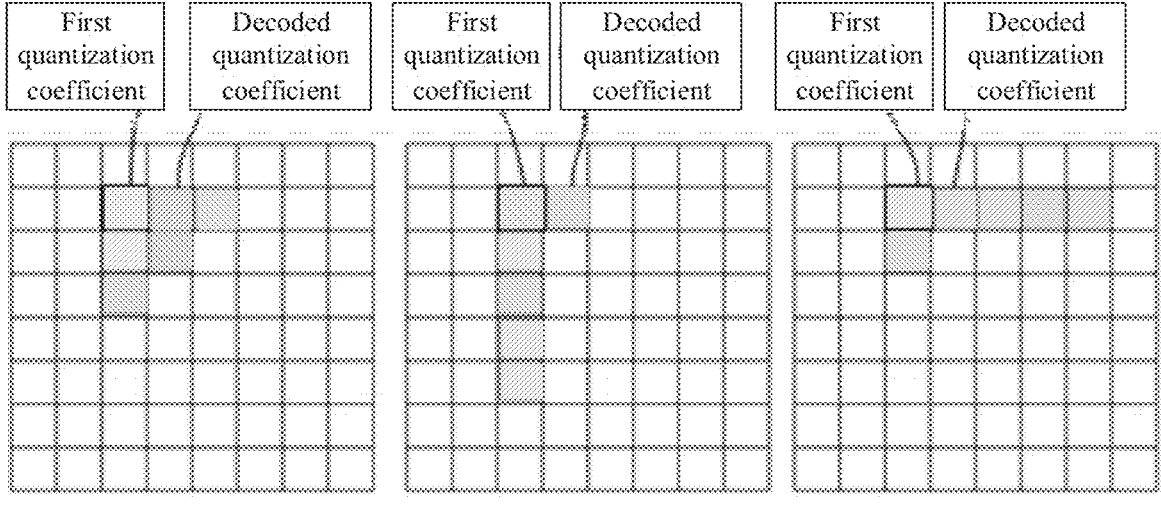
FIG. 9A                    FIG. 9B                    FIG. 9C

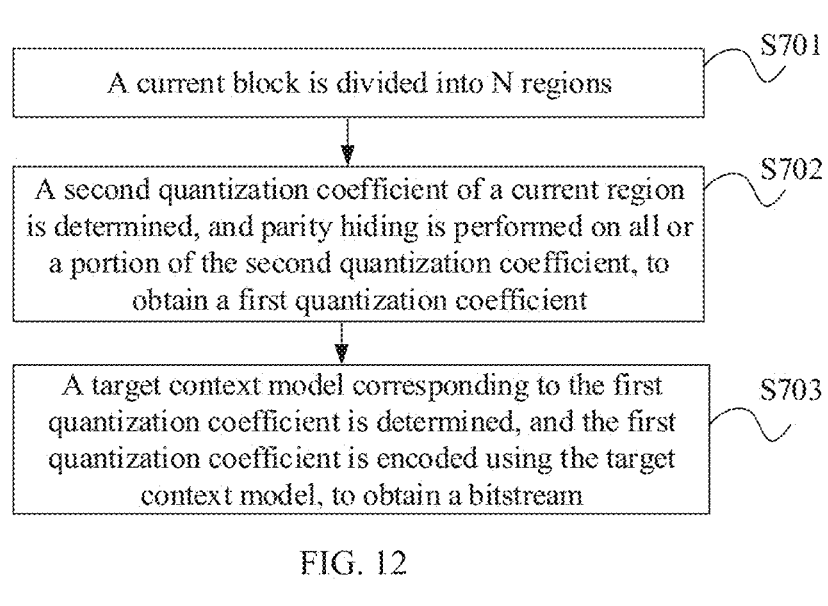

A current block is divided into N regions — S701

A second quantization coefficient of a current region is determined, and parity hiding is performed on all or a portion of the second quantization coefficient, to obtain a first quantization coefficient — S702

A target context model corresponding to the first quantization coefficient is determined, and the first quantization coefficient is encoded using the target context model, to obtain a bitstream — S703

FIG. 12

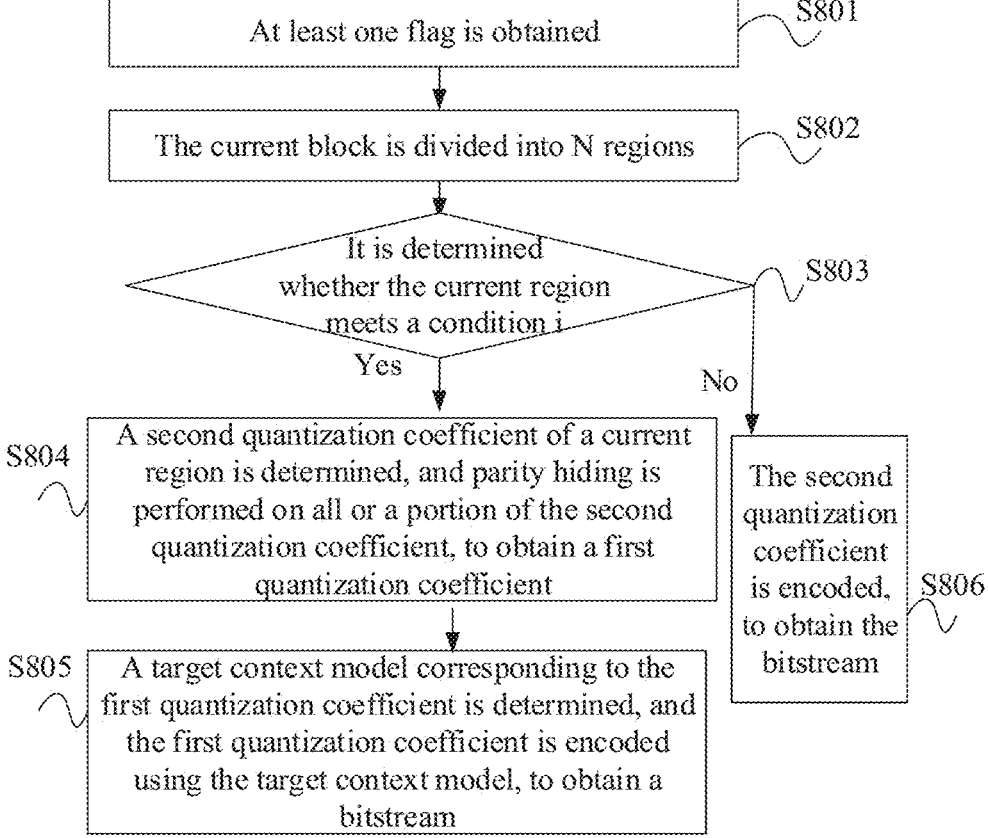

At least one flag is obtained — S801

The current block is divided into N regions — S802

It is determined whether the current region meets a condition i — S803

Yes

No

A second quantization coefficient of a current region is determined, and parity hiding is performed on all or a portion of the second quantization coefficient, to obtain a first quantization coefficient — S804

A target context model corresponding to the first quantization coefficient is determined, and the first quantization coefficient is encoded using the target context model, to obtain a bitstream — S805

The second quantization coefficient is encoded, to obtain the bitstream — S806

FIG. 13

| Video decoding device 10 |
|---|
| Decoding unit 11 |
| Parity determination unit 12 |
| Processing unit 13 |
| Determining unit 14 |

| Video encoding device 20 |
|---|
| Division unit 21 |
| Processing unit 22 |
| Encoding unit 23 |

30

Electronic device

33

Transceiver

31

Memory

Computer program

32

Processor

34

Video encoding and decoding system 40

Video encoder 41 — Video decoder 42

VIDEO ENCODING METHOD AND APPARATUS, VIDEO DECODING METHOD AND APPARATUS, AND DEVICE, SYSTEM AND STORAGE MEDIUM

CROSS-REFERENCE TO RELATED APPLICATION

This application is a Continuation Application of International Application No. PCT/CN2022/093411 filed on May 17, 2022, which is incorporated herein by reference in its entirety.

TECHNICAL FIELD

The present application relates to the field of video coding technology, and in particular, to a video encoding method, a video decoding method, an apparatus, a device, a system and a storage medium.

BACKGROUND

Digital video technology can be incorporated into a variety of video apparatuses, such as digital televisions, smartphones, computers, e-readers, or video players. With the development of video technology, data volume included in video data is larger, to facilitate transmission of the video data, video apparatuses implement video compression technology to enable more efficient transmission or storage of the video data.

To facilitate encoding during a video compression process, a quantization is performed on a transform coefficient. The purpose of quantization is to scale the transform coefficient so as to reduce the number of bits consumed in a case of encoding the coefficient. However, the current method of quantization has a high encoding cost.

SUMMARY

Embodiments of the present application provide a video encoding method, a video decoding method, an apparatus, a device, a system and a storage medium to reduce encoding cost.

In a first aspect, the present application provides a video decoding method, which includes:

decoding a bitstream, to obtain P quantization coefficients of a current region, where the current region is a region of a current block that includes at least one non-zero quantization coefficient, and P is a positive integer;

determining, according to the P quantization coefficients, parity of a quantization coefficient whose parity is hidden of a first quantization coefficient, where the first quantization coefficient is a quantization coefficient obtained by performing parity hiding on all or a portion of a second quantization coefficient of the current region, the second quantization coefficient is a quantization coefficient whose parity is not hidden of the current region;

determining a target context model corresponding to the first quantization coefficient, and decoding the first quantization coefficient which is encoded based on context using the target context model, to obtain a decoded first quantization coefficient; and determining the second quantization coefficient according to the parity of the quantization coefficient whose parity is hidden and the decoded first quantization coefficient.

In a second aspect, the embodiments of the present application provide a video encoding method, which includes:

dividing a current block into N regions, where N is a positive integer;

determining a second quantization coefficient of a current region, and performing parity hiding on all or a portion of the second quantization coefficient, to obtain a first quantization coefficient, where the current region is a region that includes at least one non-zero quantization coefficient in the N regions; and determining a target context model corresponding to the first quantization coefficient, and encoding the first quantization coefficient using the target context model to obtain a bitstream, where parity of a quantization coefficient whose parity is hidden of the first quantization coefficient is indicated by P quantization coefficients of the current region, and P is a positive integer.

In a third aspect, the present application provides a video encoder, which is configured to perform the method in the above second aspect or its various implementations. Exemplarily, the encoder includes functional units configured to perform the method in the first aspect or its various implementations.

In a fourth aspect, the present application provides a video decoder, which is configured to perform the method in the above second aspect or its various implementations. Exemplarily, the decoder includes functional units configured to perform the method in the first aspect or its various implementations.

In a fifth aspect, a video encoder is provided, and the video encoder includes: a processor and a memory. The memory is configured to store a computer program, and the processor is configured to call the computer program stored in the memory and run the computer program, to perform the method in the second aspect or its various implementations.

In a sixth aspect, a video decoder is provided, and the video decoder includes: a processor and a memory. The memory is configured to store a computer program, and the processor is configured to call the computer program stored in the memory and run the computer program, to perform the method in the first aspect or its various implementations.

In a seventh aspect, a video coding system is provided, and the video coding system includes: a video encoder and a video decoder. The video encoder is configured to perform the method in the above second aspect or its various implementations, and the video decoder is configured to perform the method in the above first aspect or its various implementations.

In an eighth aspect, a chip is provided, which is configured to implement the method in any one of the above first to second aspects or various implementations thereof. Exemplarily, the chip includes a processor configured to call a computer program from a memory and run the computer program, to cause a device equipped with the chip to perform the method in any one of the above first to second aspects or various implementations thereof.

In a ninth aspect, a computer-readable storage medium is provided, which is configured to store a computer program. The computer program causes a computer to perform the method in any one of the above first to second aspects or various implementations thereof.

In a tenth aspect, a computer program product is provided, which includes computer program instructions. The computer program instructions cause a computer to perform the method in any one of the above first to second aspects or various implementations thereof.

In an eleventh aspect, a computer program is provided, and the computer program, when executed on a computer, causes the computer to perform the method in any one of the above first to second aspects or various implementations thereof.

In the twelfth aspect, a bitstream is provided, which includes the bitstream generated by the second aspect.

BRIEF DESCRIPTION OF THE DRAWINGS

FIG. 1 is a schematic block diagram of a video coding system involved in the embodiments of the present application.

FIG. 2 is a schematic block diagram of a video encoder provided by the embodiments of the present application.

FIG. 3 is a schematic block diagram of a decoding framework provided by the embodiments of the present application.

FIGS. 4A to 4D are schematic diagrams of scan orders involved in the present application.

FIGS. 5A to 5C are schematic diagrams of a decoded coefficient of a first quantization coefficient involved in the present application.

FIGS. 5D to 5F are schematic diagrams of another decoded coefficient of the first quantization coefficient involved in the present application.

FIG. 6 is a schematic flowchart of a video decoding method provided by the embodiments of the present application.

FIG. 7 is a schematic diagram of a region division involved in the embodiments of the present application.

FIG. 8 is a schematic diagram of a scan order of a transform block involved in the embodiments of the present application.

FIGS. 9A to 9C are schematic diagrams of a decoded coefficient of a first quantization coefficient involved in the present application.

FIG. 12 is a schematic flowchart of a video encoding method provided by the embodiments of the present application.

FIG. 13 is a schematic flowchart of a video encoding method provided by an embodiment of the present application.

DETAILED DESCRIPTION

Figures 10A, 10B, 10C:
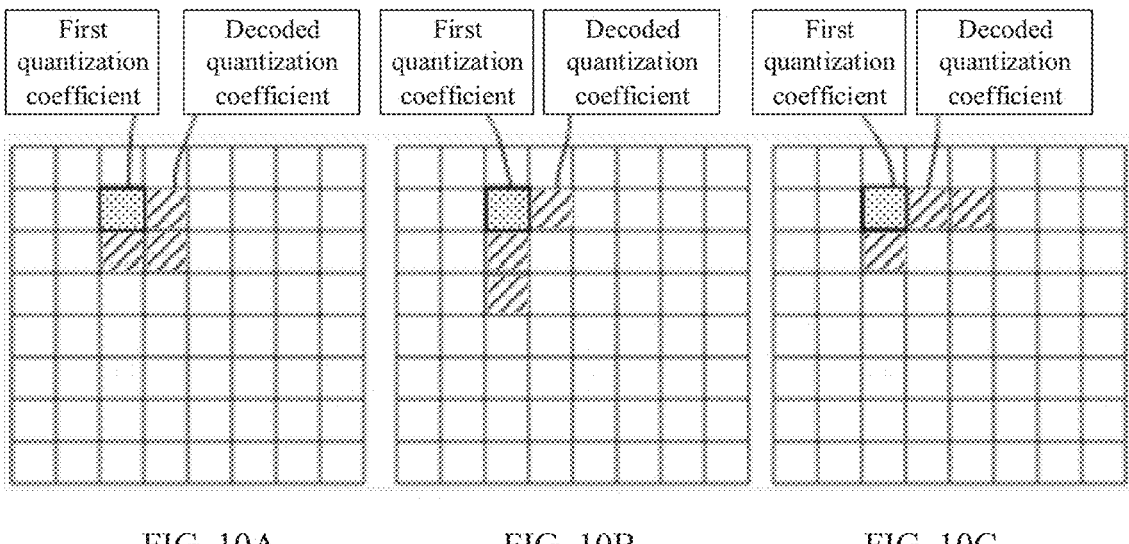
FIGS. 10A to 10C are schematic diagrams of another decoded coefficient of the first quantization coefficient involved in the present application.

Technical solutions in the embodiments of the present application will be described below in conjunction with the accompanying drawings in the embodiments of the present application.

The present application may be applied to a field of picture coding, a field of video coding, a field of hardware video coding, a field of dedicated circuit video coding, a field of real-time video coding, or the like. Alternatively, solutions of the present application may be operated in conjunction with other dedicated or industrial standards, the standards include ITU-TH.261, ISO/IECMPEG-1 Visual, ITU-TH.262 or ISO/IECMPEG-2 Visual, ITU-TH.263, ISO/IECMPEG-4 Visual, ITU-TH.264 (also referred to as ISO/IECMPEG-4AVC), containing scalable video coding (SVC) and multi-view video coding (MVC) extensions. It should be understood that the technology of the present application is not limited to any particular coding standard or technology.

For ease of understanding, the video coding system involved in the embodiments of the present application is first introduced in conjunction with FIG. 1.

FIG. 1 is a schematic block diagram of a video coding system involved in the embodiments of the present application. It should be noted that FIG. 1 is only an example, and the video coding system of the embodiments of the present application includes but is not limited to that shown in FIG. 1. As shown in FIG. 1, the video coding system 100 includes an encoding device 110 and a decoding device 120. The encoding device is configured to encode video data (which may be understood as compression) to generate a bitstream, and transmit the bitstream to the decoding device. The decoding device decodes the bitstream generated by the encoding device to obtain decoded video data.

The encoding device 110 of the embodiments of the present application may be understood as a device with a video encoding function, and the decoding device 120 may be understood as a device with a video decoding function, that is, the embodiments of the present application contain a wider range of apparatuses for the encoding device 110 and the decoding device 120, such as containing a smartphone, a desktop computer, a mobile computing apparatus, a notebook (e.g., laptop) computer, a tablet computer, a set-top box, a television, a camera, a display apparatus, a digital media player, a video game console, an in-vehicle computer, or the like.

In some embodiments, the encoding device 110 may transmit encoded video data (e.g., a bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit modulated video data to the decoding device 120. The communication media includes a wireless communication media, such as a radio frequency spectrum. Optionally, the communication medium may further include a wired communication media, such as one or more physical transmission lines.

In another example, the channel 130 includes a storage medium, the storage medium may store the video data encoded by the encoding device 110. Storage media include a variety of locally accessible data storage media, such as an optical disk, a DVD, a flash memory. In this example, the decoding device 120 may obtain the encoded video data from the storage medium.

In another example, the channel 130 may include a storage server, which may store the video data encoded by the encoding device 110. In this example, the decoding device 120 may download stored encoded video data from the storage server. Optionally, the storage server may store the encoded video data and may transmit the encoded video data to the decoding device 120, such as a web server (e.g., for a website), a file transfer protocol (FTP) server.

In some embodiments, the encoding device 110 includes a video encoder 112 and an output interface 113. The output interface 113 may include a modulator/demodulator (a modem) and/or a transmitter.

In some embodiments, the encoding device 110 may further includes a video source 111 in addition to the video encoder 112 and the output interface 113.

The video source 111 may include at least one of a video collecting device (e.g., a video camera), a video archive, a video input interface, or a computer graphics system, where the video input interface is used to receive video data from a video content provider, and the computer graphics system is used to generate video data.

The video encoder 112 encodes the video data from the video source 111 to generate a bitstream. The video data may include one or more pictures or a sequence of pictures. The bitstream contains encoded information of the picture or the sequence of pictures in the form of a bitstream. The encoded information may include encoded picture data and associated data. The associated data may include a sequence parameter set (SPS), a picture parameter set (PPS) and other syntax structures. The SPS may contain parameters applied to one or more sequences. The PPS may contain parameters applied to one or more pictures. A syntax structure is a set of zero or more syntax elements arranged in a specified order in a bitstream.

The video encoder 112 transmits the encoded video data directly to the decoding device 120 via the output interface 113. The encoded video data may further be stored in a storage medium or a storage server, for subsequent reading by the decoding device 120.

In some embodiments, the decoding device 120 includes an input interface 121 and a video decoder 122.

In some embodiments, the decoding device 120 may include a display apparatus 123 in addition to the input interface 121 and the video decoder 122.

Here, the input interface 121 includes a receiver and/or a modem. The input interface 121 may receive the encoded video data via the channel 130.

The video decoder 122 is used to decode the encoded video data to obtain decoded video data, and transmit the decoded video data to the display apparatus 123.

The display apparatus 123 displays the decoded video data. The display apparatus 123 may be integrated with the decoding device 120 or external to the decoding device 120. The display apparatus 123 may include various display apparatuses, such as a liquid crystal display (LCD), a plasma display, an organic light emitting diode (OLED) display, or other types of display apparatuses.

In addition, FIG. 1 is only an example, and the technical solution of the embodiments of the present application is not limited to FIG. 1. For example, the technology of the present application may also be applied to unilateral video encoding or unilateral video decoding.

The video encoder involved in the embodiments of the present application is introduced below.

FIG. 2 is a schematic block diagram of a video encoder provided by the embodiments of the present application. It should be understood that the video encoder 200 may be used to perform lossy compression on a picture, or may be used to perform lossless compression on a picture. The lossless compression may be visually lossless compression or mathematically lossless compression.

The video encoder 200 may be applied to picture data in a luma and chroma (YCbCr, YUV) format. For example, a YUV ratio may be 4:2:0, 4:2:2 or 4:4:4, where Y indicates luma, Cb (U) indicates blue chroma, Cr (V) indicates red chroma, U and V indicate chroma for describing color and saturation. For example, in a color format, 4:2:0 indicates every 4 samples with 4 luma components and 2 chroma components (YYYYCbCr), 4:2:2 indicates every 4 samples with 4 luma components and 4 chroma components (YYYYCbCrCbCr), and 4:4:4 indicates full sample displayed (YYYYCbCrCbCrCbCrCbCr).

For example, the video encoder 200 reads video data, and for each picture in the video data, divides one picture into a number of coding tree units (CTUs). In some examples, a CTU may be referred to as a "tree block", "largest coding unit (LCU)" or "coding tree block (CTB)". Each CTU may be associated with sample blocks of equal size within the picture. Each sample may correspond to one luma (luminance) sample and two chroma (chrominance) samples. Thus, each CTU may be associated with one luma sample block and two chroma sample blocks. The size of a CTU is, for example, 128×128, 64×64, 32×32. A CTU may be further divided into several coding units (CUs) for encoding. The CU may be a rectangular block or a square block. The CU may be further divided into prediction unit (PU) and transform unit (TU), which makes separation of encoding, prediction and transform more flexible in processing. In an example, a CTU is divided into CUs in a quadtree manner, and a CU is divided into TUs and PUs in a quadtree manner.

The video encoder and the video decoder may support various PU sizes. Assuming that the size of a specific CU is 2N×2N, the video encoder and the video decoder may support a PU size of 2N×2N or N×N for intra prediction, and support symmetric PUs of 2N×2N, 2N×N, N×2N, N×N or similar sizes for inter prediction. The video encoder and video decoder may further support asymmetric PUs of 2N×nU, 2N×nD, nL×2N, and nR×2N for inter prediction.

In some embodiments, as shown in FIG. 2, the video encoder 200 may include: a prediction unit 210, a residual unit 220, a transform/quantization unit 230, an inverse transform/quantization unit 240, a reconstructed unit 250, an in-loop filter unit 260, a decoded picture buffer 270 and an entropy coding unit 280. It should be noted that the video encoder 200 may include more, fewer or different functional components.

Optionally, in the present application, a current block may be referred to as a current coding unit (CU) or a current prediction unit (PU), or the like. A prediction block may also be called a prediction picture block or a picture prediction block, and the reconstructed picture block may also be called a reconstructed block or a picture reconstructed picture block.

In some embodiments, the prediction unit 210 includes an inter prediction unit 211 and an intra prediction unit 212. Due to a strong correlation between adjacent samples in a frame of a video, the intra prediction method is used in video coding technology to eliminate spatial redundancy between the adjacent samples. Due to the strong similarity between adjacent frames in a video, the inter prediction method is used in video coding technology to eliminate temporal redundancy between the adjacent frames, thereby improving coding efficiency.

The inter prediction unit 211 may be used for inter prediction. The inter prediction may refer to picture information of different frames. The inter prediction uses motion information to find a reference block from a reference frame, and generates a prediction block according to the reference block to eliminate temporal redundancy. Frames used for inter prediction may be a P frame and/or a B frame, the P frame refers to a forward prediction frame, and the B frame refer to a bidirectional prediction frame. Motion information includes a reference frame list where the reference frame is located, a reference frame index, and a motion vector. The motion vector may be an integer sample or a fractional sample. If the motion vector is the fractional sample, then it is necessary to use interpolation filtering in the reference frame to obtain the required fractional sample blocks. Here, the integer sample or fractional sample block in the reference frame found according to the motion vector is called a reference block. The reference block is used as a prediction block directly in some technologies, while a prediction block is generated on the basis of processing the reference block some technologies. The prediction block being generated on the basis of processing the reference block may also be understood as using the reference block as a prediction block and then processing the prediction block to generate a new prediction block.

The intra prediction unit 212 only refers to information of a same picture to predict sample information of a current coding picture block, to eliminate spatial redundancy. The frame used for intra prediction may be an I frame. For example, as shown in FIG. 5, the white 4×4 block is the current block, and the gray samples in the left column and the top row of the current block are the reference samples of the current block. Intra prediction uses these reference samples to predict the current block. These reference samples may all be available, that is, all of them have been encoded or decoded. Or some of them may be unavailable, for example, if the current block is at the leftmost portion of the whole frame, then the reference samples to the left of the current block are unavailable. Or in a case of encoding or decoding the current block, the lower left portion of the current block has not been encoded or decoded, so the reference sample at the lower left is also unavailable. In the case where the reference samples are unavailable, available reference samples or certain values or methods may be used for padding or not.

In some embodiments, the intra prediction mode further includes multiple reference line (MRL) intra prediction mode. More reference samples may be used in MRL, thereby improving coding efficiency.

There are several prediction modes for intra prediction. There are 9 modes of intra prediction for 4×4 blocks in H.264. Among them, the samples above the current block are copied in vertical direction to the current block as a prediction value in mode 0; the reference samples on the left side are copied in horizontal direction to the current block as a prediction value in mode 1; the average of the eight points A to D and I to L is used as a prediction value of all points in mode 2 (DC); the reference samples are copied to the corresponding positions of the current block at a certain angle, respectively, in modes 3 to 8. Because some positions of the current block cannot correspond exactly to the reference samples, a weighted average value of the reference samples, or interpolated fractional samples of the reference samples, may need to be used.

The intra prediction modes used by HEVC include a planar mode, a DC mode and 33 angular modes, for a total of 35 prediction modes. The intra modes used by VVC include a planar mode, a DC mode, and 65 angular modes, for a total of 67 prediction modes. The intra modes used by AVS3 include a DC mode, a plane mode, a bilinear mode and 63 angular modes, for a total of 66 prediction modes.

It should be noted that with the increase of angular modes, intra prediction will be more accurate and more in line with the needs of the development of high-definition and ultra-high-definition digital videos.

The residual unit 220 may generate a residual block of a CU based on a sample block of the CU and a prediction block of a PU of the CU. For example, the residual unit 220 may generate a residual block of the CU, so that each sample of the residual block has a value equal to a difference between: a sample in the sample block of the CU and a corresponding sample in the prediction block of the PU of the CU.

The transform/quantization unit 230 may quantize transform coefficient. The transform/quantization unit 230 may quantize transform coefficient associated with a TU of a CU based on a quantization parameter (QP) value associated with the CU. The video encoder 200 may adjust a degree of quantization applied to transform coefficient associated with the CU by adjusting the QP values associated with the CU.

The inverse transform/quantization unit 240 may apply inverse quantization and inverse transform to a quantized transform coefficient, respectively, to reconstruct a residual block from the quantized transform coefficient.

The reconstructed unit 250 may add a sample of the reconstructed residual block to a corresponding sample of one or more prediction blocks generated by the prediction unit 210, to generate a reconstructed picture block associated with the TU. By reconstructing the sample blocks of each TU of a CU in this method, the video encoder 200 may reconstruct the sample block of the CU.

The in-loop filter unit 260 may perform a deblocking filtering operation to reduce blocking effects of sample blocks associated with the CU.

In some embodiments, the in-loop filter unit 260 includes a deblocking filter unit, a sample adaptive offset (SAO) unit, and an adaptive loop filter (ALF) unit.

The decoded picture buffer 270 may store the reconstructed sample blocks. The inter prediction unit 211 may use a reference picture containing the reconstructed sample block to perform inter prediction on a PU of other pictures. In addition, the intra prediction unit 212 may use the reconstructed sample block of the decoded picture buffer 270 to perform intra prediction on other PUs of the same picture as the CU.

The entropy coding unit 280 may receive quantized transform coefficient from the transform/quantization unit 230. The entropy coding unit 280 may perform one or more entropy coding operations on the quantized transform coefficient, to generate entropy-coded data.

The basic procedure of video coding involved in the present application is as follows that: at a coding side, the current picture is divided into blocks, and for the current block, the prediction unit 210 generates a prediction block of the current block using intra prediction or inter prediction. The residual unit 220 may calculate a residual block based on the prediction block and an original block of the current block, that is, a difference between the prediction block and the original block of the current block. The residual block may also be referred to as residual information. The residual block is transformed and quantized by the transform/quantization unit 230, which removes information that is not sensitive to the human eye, to eliminate visual redundancy. Optionally, the residual block before being transformed and quantized by the transform/quantization unit 230 may be referred to as a time domain residual block, and the time domain residual block after being transformed and quantized by the transform/quantization unit 230 may be referred to as a frequency residual block or a frequency domain residual block. The entropy coding unit 280 receives the quantized transform coefficient output by the transform/quantization unit 230, and may perform entropy coding on the quantized transform coefficient, to output a bitstream. For example, the entropy coding unit 280 may eliminate character redundancy according to a target context model and probability information of a binary bitstream.

In addition, the video encoder performs inverse quantization and inverse transform on the quantized transform coefficient output by the transform/quantization unit 230, to obtain a residual block of the current block, and then adds the residual block of the current block to the prediction block of the current block, to obtain a reconstructed block of the current block. As the encoding proceeds, reconstructed blocks corresponding to other picture blocks of the current picture may be obtained, and these reconstructed blocks are spliced, to obtain a reconstructed picture of the current picture. Since errors are introduced during the encoding process, in order to reduce the errors, the reconstructed picture is filtered, for example, the reconstructed picture is filtered using an ALF, to reduce the difference between sample values of samples of the reconstructed picture and original sample values of samples of the current picture. The filtered reconstructed picture is stored in the decoded picture buffer 270 and may be used as a reference frame for inter prediction for subsequent frames.

It should be noted that the block divided information, as well as the mode information such as prediction, transform, quantization, entropy encoding, in-loop filtering, or parameter information, etc., determined by the encoding side, are carried in the bitstream if necessary. The decoding side determines the same block divided information, mode information such as prediction, transform, quantization, entropy coding, in-loop filtering, or parameter information as that of the encoding side by parsing the bitstream and perform analysis according to existing information, thereby ensuring that the decoded picture obtained by the encoding side is the same as the decoded picture obtained by the decoding side.

FIG. 3 is a schematic block diagram of a video decoder provided by the embodiments of the present application.

As shown in FIG. 3, the video decoder 300 includes an entropy decoding unit 310, a prediction unit 320, an inverse quantization/transform unit 330, a reconstructed unit 340, an in-loop filter unit 350, and a decoded picture buffer 360. It should be noted that the video decoder 300 may include more, fewer or different functional components.

The video decoder 300 may receive a bitstream. The entropy decoding unit 310 may parse the bitstream to extract syntax elements from the bitstream. As a portion of parsing the bitstream, the entropy decoding unit 310 may parse the entropy-coded syntax elements in the bitstream. The prediction unit 320, the inverse quantization/transform unit 330, the reconstructed unit 340, and the in-loop filter unit 350 may decode video data according to the syntax elements extracted from the bitstream, that is, to generate decoded video data.

In some embodiments, the prediction unit 320 includes an inter prediction unit 321 and an intra prediction unit 322.

The inter prediction unit 321 may perform intra prediction to generate a prediction block of a PU. The inter prediction unit 321 may use the intra prediction mode to generate a prediction block of a PU based on sample blocks of spatially neighboring PUs. The inter prediction unit 321 may also determine the intra prediction mode of the PU according to one or more syntax elements parsed from the bitstream.

The intra prediction unit 322 may construct a first reference picture list (list 0) and a second reference picture list (list 1) according to syntax elements parsed from the bitstream. Furthermore, if the PU is encoded by using inter prediction, entropy decoding unit 310 may parse motion information of the PU. The intra prediction unit 322 may determine one or more reference blocks of the PU according to the motion information of the PU. The inter prediction unit 321 may generate a prediction block for the PU according to one or more reference blocks of the PU.

The inverse quantization/transform unit 330 may inverse quantize (i.e., dequantize) a transform coefficient associated with a TU. The inverse quantization/transform unit 330 may use a QP value associated with the CU of the TU to determine a degree of quantization.

After inverse quantizing the transform coefficient, the inverse quantization/transform unit 330 may apply one or more inverse transforms to the inverse quantized transform coefficient, to generate a residual block associated with the TU.

The reconstructed unit 340 uses residual blocks associated with the TU of the CU and a prediction block of the PU of the CU to reconstruct a sample block of the CU. For example, the reconstructed unit 340 may add a sample of the residual block to a corresponding sample of the prediction block to reconstruct the sample block of the CU, to obtain a reconstructed picture block.

The in-loop filter unit 350 may perform a deblocking filtering operation to reduce blocking effects of the sample block associated with the CU.

In some embodiments, the in-loop filter unit 350 includes a deblocking filter unit, a sample adaptive offset (SAO) unit, and an adaptive loop filter (ALF) unit.

The video decoder 300 may store the reconstructed picture of the CU of the decoded picture buffer 360. The video decoder 300 may use the reconstructed picture of the decoded picture buffer 360 as a reference picture for subsequent prediction, or transmit the reconstructed picture to a display apparatus for presentation.

The basic procedure of video decoding involved in the present application is as follows that: the entropy decoding unit 310 may parse the bitstream to obtain prediction information, a quantization coefficient matrix, etc., of the current block, and the prediction unit 320 generates a prediction block of the current block by using intra prediction or inter prediction for the current block based on the prediction information. The inverse quantization/transform unit 330 uses the quantization coefficient matrix obtained from the bitstream to perform inverse quantization and inverse transform on the quantization coefficient matrix to obtain a residual block. The reconstructed unit 340 adds the prediction block and the residual block, to obtain a reconstructed block. Reconstructed blocks constitute a reconstructed picture. The in-loop filter unit 350 performs in-loop filtering on the reconstructed picture based on the picture or on the block, to obtain a decoded picture. The decoded picture may also be referred to as a reconstructed picture. On the one hand, the reconstructed picture may be displayed by a display device, on the other hand, the reconstructed picture may be stored in the decoded picture buffer 360, to be used as a reference frame for inter prediction for subsequent frames.

The above is the basic procedure of the video encoder and video decoder under the block-based hybrid coding framework. With the development of technology, some modules or steps of the framework or procedure may be optimized. The present application is applicable to the basic procedure of the video encoder and video decoder under the block-based hybrid encoding framework, but is not limited to the framework and procedure.

The quantization-related technologies involved in the present application are introduced below.

Quantization and inverse quantization are closely related to the coefficient encoding portion. The purpose of quantization is to scale transform coefficients so as to reduce the number of bits consumed in a case of encoding the coefficients.

In some embodiments, a case of skipping transform exists, and in this case an object of quantization is a residual, that is, the residual is directly scaled and then encoded.

Exemplarily, the quantization may be achieved by using the following formula (1):

$$q_i = \text{round}\left(\frac{t_i}{qstep}\right) \qquad (1)$$

where $t_i$ is the transform coefficient, qstep is a quantization step size, which is related to a quantization parameter set in configuration files, $q_i$ is the quantization coefficient, round is a rounding process, which is not limited to rounding up or rounding down, etc. The process of quantization is controlled by the encoder.

Exemplarily, the inverse quantization may be achieved by using the following formula (2):

$$t_i' = q_i \cdot qstep \qquad (2)$$

where $t_i'$ is the reconstructed transform coefficient, and $t_i'$ is different from $t_i$, due to the loss of accuracy caused by the rounding process.

Quantization will reduce the accuracy of the transform coefficient, and the loss of accuracy is irreversible. Encoders usually measure the cost of quantization via a rate-distortion cost function.

Exemplarily, the quantization cost is determined using the following formula (3):

$$J = D + \lambda \cdot R = (t_i - t_i')^2 + \lambda \cdot B(q_i) \qquad (3)$$

where B( ) is the bits consumed by the encoder to estimate the encoded quantization coefficient $q_i$.

In theory, no matter how the encoder decides the value of $q_i$, the inverse quantization process at the decoding side is unchanged, so the encoder may decide $q_i$ more freely. Usually, the encoder will adjust each $q_i$ according to a principle of minimizing the total cost of the current block to achieve the overall cost optimization. This process is called rate-distortion optimization quantization, which is also widely used in video coding.

In some embodiments, the quantization coefficients may be encoded or decoded using a manner of multi-symbol arithmetic coding, each quantization coefficient may be indicated by one or more multi-symbol flags, and, exemplarily, may be indicated by the following multi-symbol flag bits in segments, according to the size of the quantization coefficient.

Flag 1 indicates the portion (range) of 0 to 3 with 4 symbols (0, 1, 2, 3), in a case where the symbol of flag 1 is 3, flag 2 needs to be further encoded/decoded.

Flag 2 indicates the portion (range) of 3 to 6 with 4 symbols (0, 1, 2, 3), in a case where the symbol of flag 2 is 3, flag 3 needs to be further encoded/decoded.

Flag 3 indicates the portion (range) of 6 to 9 with 4 symbols (0, 1, 2, 3), in a case where the symbol of flag 3 is 3, flag 4 needs to be further encoded/decoded.

Flag 4 indicates the portion (range) of 9 to 12 with 4 symbols (0, 1, 2, 3), in a case where the symbol of flag 4 is 3, flag 5 needs to be further encoded/decoded.

Flag 5 indicates the portion (range) of 12 to 15 with 4 symbols (0, 1, 2, 3), in a case where the symbol of flag 5 is 3, the portion (range) greater than or equal to 15 needs to be further encoded/decoded.

The portion greater than or equal to 15 is encoded/decoded using exponential Golomb and do not rely on a context model, while flags 1 to 5 use a context model, where flag 1 has a separate context model and flags 2 to 5 share a common context model. In addition, if the current coefficient is a non-zero coefficient, a sign of the current coefficient need to be encoded/decoded. The encoding/decoding process of each flag of the transform block is as follows.

First, flags 1 to 5 are encoded/decoded in a scan order from a last non-zero coefficient to an upper left corner of the transform block.

Here, a coefficient portion (coefficient range) indicated by flag 1 is called base range (BR), a coefficient portion indicated by flags 2 to 5 is called lower range (LR), and the portion greater than or equal to 15 is called higher range (HR).

The index qIdx of decoded quantization coefficient is a sum of the flags 1 to 5 plus a portion exceeding 15. Exemplarily, as shown in formula (4):

$$qIdx = \sum\left(BR + \sum LR\right) \qquad (4)$$

since LR includes 4 flags, i.e., flags 2 to 5, $\Sigma LR$ is used to indicate the summing the portion of flags 2 to 5.

In a case where parity hiding technology is not introduced, an absolute value level of the quantization coefficient is equal to qIdx.

Then, the sign of the non-zero coefficient and the portion of the non-zero coefficient exceeding 15 are encoded/decoded, in an order from the upper left corner of the transform block to the last non-zero coefficient. Here, if the coefficient at the upper left corner is non-zero, the sign of the non-zero coefficient is encoded/decoded using context model coding and non-zero coefficients at other positions are encoded/decoded using equal probability model coding.

Exemplarily, the coding syntax is shown in Table 1 below.

TABLE 1

```
for ( c = eob − 1; c >= 0; c— ) {
    pos = scan[ c ]
    if (c == ( eob − 1 ) ) {
        coeff_base_eob                              S( )
        level = coeff_base_eob + 1
    } else {
        coeff_base                                  S( )
        level = coeff_base
    }
    if ( level > NUM_BASE_LEVELS ) {
        for ( idx = 0;
              idx < COEFF_BASE_RANGE / ( BR_CDF_SIZE −
              1 );
              idx++ ) {
            coeff_br                                S( )
            level += coeff_br
            if ( coeff_br < (BR_CDF_SIZE − 1 ) )
                break
        }
```

TABLE 1-continued

```
        }
    Quant[ pos ] = level
}
    for ( c = 0; c < eob; c++ ) {
        pos = scan[ c ]
        if ( Quant[ pos ] != 0 ) {
            if ( c == 0 ) {
                dc_sign                                     S( )
                sign = dc_sign
            } else {
                sign_bit                                    L(1)
                sign = sign_bit
            }
        } else {
            sign = 0
        }
        if ( Quant[ pos ] >
            ( NUM_BASE_LEVELS + COEFF_BASE_RANGE ) ) {
                length = 0
                do {
                    length++
                    golomb_length_bit                       L(1)
                } while ( !golomb_length_bit )
                x = 1
                for ( i = length − 2; i >= 0; i−− ) {
                    golomb_data_bit                         L(1)
                    x = ( x << 1 ) | golomb_data_bit
                }
                Quant[ pos ] = x + COEFF_BASE_RANGE +
NUM_BASE_LEVELS
        }
        if ( pos == 0 && Quant[ pos ] > 0 ) {
            dcCategory = sign ? 1 : 2
        }
        Quant[ pos ] = Quant[ pos ] & 0xFFFFF
        culLevel += Quant[ pos ]
        if ( sign )
            Quant[ pos ] = − Quant[ pos ]
    }
```

In the above Table 1, S( ) is the context model coding of multiple symbols, and L(1) is the bypass coding.

In some embodiments, in a case of coding quantization coefficients, different coefficient coding orders (i.e., scan orders) are selected according to different selected transform types. Exemplarily, the transform include the following 16 types, and the corresponding relationship between these 16 types of transform and the scan orders is shown in Table 2.

TABLE 2

| | Transform Type | Vertical Mode | Horizontal Mode |
|---|---|---|---|
| DCT_DCT | 2D | DCT | DCT |
| ADST_DCT | 2D | ADST | DCT |
| DCT_ADST | 2D | DCT | ADST |
| ADST_ADST | 2D | ADST | ADST |
| FLIPADST_DCT | 2D | Flipped ADST | DCT |
| DCT_FLIPADST | 2D | DCT | Flipped ADST |
| FLIPADST_FLIPADST | 2D | Flipped ADST | Flipped ADST |
| ADST_FLIPADST | 2D | ADST | Flipped ADST |
| FLIPADST_ADST | 2D | Flipped ADST | ADST |
| IDTX | 2D | Identity | Identity |
| V_DCT | 1D | DCT | Identity |
| H_DCT | 1D | Identity | DCT |
| V_ADST | 1D | ADST | Identity |
| H_ADST | 1D | Identity | ADST |
| V_FLIPADST | 1D | Flipped ADST | Identity |
| H_FLIPADST | 1D | Identity | Flipped ADST |

In Table 2, Tansform Type indicates a transform type, Vertical Mode indicates a transform type in a vertical direction, and Horizontal Mode indicates a transform type in a horizontal direction. Tansform Type includes 1D Tansform Type and 2D Transform Type. A scanning mode of 1D Tansform Type is divided into row scan and column scan according to horizontal and vertical directions. 2D Transform Type is divided into zig-zag scan and diagonal scan.

In some embodiments, as shown in FIGS. 4A to 4D, four scan orders, Zig-Zag scan, Diagonal scan, Column scan and Row scan, are used for coefficient coding, and the numbers in the figures indicate the index of the scan order. Since the transform can concentrate the energy in the upper left corner of the transform block, an actual coefficient decoding order is defined as an inverse scan order, that is, sequential decoding is performed in a decoding order starting from the first non-zero coefficient at the lower right corner of the transform block. For example, the Zig-Zag scan order in FIG. 4A is from 0, 1 . . . , 15 . . . , and a corresponding decoding order is . . . 15, 14 . . . , 1, 0. If the first non-zero coefficient position in decoding order is index 12, then the actual decoding order of coefficients is 12, 11, . . . , 1, 0.

In the process of coefficient decoding, it is determined which decoded coefficient portions of the surrounding area will be selected as a reference according to different scan orders, to select a context model of the current coefficient. Taking Zig-Zag scan, Column scan and Row scan as examples, in a case of decoding the symbol of the portion of flag 1 (i.e., BR) of the current coefficient, as shown in FIGS. 5A to 5C, the context model corresponding to flag 1 (i.e., BR) is determined according to the portion of the decoded coefficients around the current coefficient which absolute values less than or equal to 3, and the portion of flag 1 (i.e., BR) of the current coefficient is decoded using the determined context model corresponding to flag 1 (i.e., BR). For another example, in a case of decoding the portion of flags 2 to 5 (i.e., LR) of the current coefficient, as shown in FIGS. 5D to 5F, different surrounding coefficients are selected according to different scan orders, and according to the portion of the selected surrounding coefficients which absolute values less than or equal to 15, a context model corresponding to the portion of flags 2 to 5 (i.e., LR) is determined, so that the portion of flags 2 to 5 (i.e., LR) of the current coefficient is decoded using the context model corresponding to the determined portion of flags 2 to 5.

In this case, when determining the context model corresponding to the current coefficient, conditions such as whether the current coefficient is the last non-zero coefficient, a distance of the position of the current coefficient from the upper left corner of the transform block, and the size of the transform block need to be considered.

In some embodiments, when coding flag 1 (i.e., BR), a model needs to be selected from 4 QP segments, 5 transform block sizes, luma or color components, 42 position distances, and a size of a sum of portions of the surrounding coded coefficients whose absolute value is less than or equal to 3, a total of $4 \times 5 \times 2 \times 42$, i.e. 1680 context models, for coding and updating the model probability value according to the quantization parameter (QP).

In some embodiments, when coding flags 2 to 5 (i.e., LR), a model needs to be selected from 4 QP segments, 5 transform block sizes, luma or chroma components, 21 position distances, and a size of a sum of portions of the surrounding coded coefficients whose absolute value is less than or equal to 15, a total of $4 \times 5 \times 2 \times 21$, i.e. 840 context models, for coding and updating the model probability value according to the quantization parameter (QP).

In some embodiments, the calculation method for determining an index value of the context model is shown in Table 3.

15

TABLE 3

| Luma Component | Index of Context Model |
|---|---|
| BR in DC coefficient position | $\min\left(4,\left(\left(\sum_{\Theta}BR\right)+1\right)\gg 1\right)$ |
| BR in non-DC coefficient position | $5+\min\left(4,\left(\left(\sum_{\Theta}BR\right)+1\right)\gg 1\right)$ |
| LR in DC coefficient position | $\min\left(6,\left(\left(\left(\sum_{\Phi}\left(BR+\sum LR\right)\right)\right)+1\right)\gg 1\right)$ |
| LR in non-DC coefficient position | $7+\min\left(6,\left(\left(\left(\sum_{\Phi}\left(BR+\sum LR\right)\right)\right)+1\right)\gg 1\right)$ |
| Chroma Component | Index of Context Model |
| BR in DC coefficient position | $10+\min\left(4,\left(\left(\sum_{\Theta}BR\right)+1\right)\gg 1\right)$ |
| BR in non-DC coefficient position | $15+\min\left(4,\left(\left(\sum_{\Theta}BR\right)+1\right)\gg 1\right)$ |
| LR in DC coefficient position | $14+\min\left(6,\left(\left(\left(\sum_{\Phi}\left(BR+\sum LR\right)\right)\right)+1\right)\gg 1\right)$ |
| LR in non-DC coefficient position | $21+\min\left(6,\left(\left(\left(\sum_{\Phi}\left(BR+\sum LR\right)\right)\right)+1\right)\gg 1\right)$ |

In Table 3, $\Theta$ is five decoded quantization coefficients around the first quantization coefficient in several scan manners in FIGS. 5A to 5C, and $\Phi$ is three decoded quantization coefficients around the first quantization coefficient in several scan manners in FIGS. 5D to 5F. In Table 3, DC indicates the position located at the upper left corner of the transform block. According to the method described in Table S above, after determining the context model corresponding to the quantization coefficient, the quantization parameters are coded using the context model.

At present, the encoding method of quantization coefficient is usually to completely encode signs and absolute values of the quantization coefficients, which occupies more bits and has a high encoding cost.

In the embodiments of the present application, during the process of encoding the quantization coefficients, at least one quantization coefficient of the current region is hidden according to the parity related to the quantization coefficients of the current region to reduce the encoding cost.

A video decoding method is provided in a first clause of the present application, and the method includes:

decoding a bitstream, to obtain P quantization coefficients of a current region, where the current region is a region of a current block that includes at least one non-zero quantization coefficient, and P is a positive integer;

determining, according to the P quantization coefficients, parity of a quantization coefficient whose parity is hidden of a first quantization coefficient, where the first quantization coefficient is a quantization coefficient obtained by performing parity hiding on all or a portion of a second quantization coefficient, the second quantization coefficient is a quantization coefficient whose parity is not hidden of the current region;

determining a target context model corresponding to the first quantization coefficient, and decoding the first quantization coefficient which is encoded based on context using the target context model, to obtain a decoded first quantization coefficient; and

16 determining the second quantization coefficient according to the parity of the quantization coefficient whose parity is hidden and the decoded first quantization coefficient.

In a second clause, the method of the first clause, where the target context model corresponding to the first quantization coefficient is the same as at least one of context models corresponding to other quantization coefficients whose parity is not hidden.

In a third clause, the method of the second clause, where determining the target context model corresponding to the first quantization coefficient includes:

obtaining multiple context models corresponding to target quantization coefficients of other quantization coefficients whose parity is not hidden, where the target quantization coefficients are portions of quantization coefficients among quantization coefficients; and determining a target context model corresponding to a target quantization coefficient of the first quantization coefficient from the multiple context models corresponding to the target quantization coefficients; and decoding the first quantization coefficient which is encoded based on context encoding using the target context model, to obtain the decoded first quantization coefficient includes:

decoding the target quantization coefficient of the first quantization coefficient using the target context model corresponding to the target quantization coefficient, to obtain the decoded first quantization coefficient.

In a fourth clause, the method of the third clause, where determining the target context model corresponding to the target quantization coefficient of the first quantization coefficient from the multiple context models corresponding to the target quantization coefficients includes:

determining an index of the target context model corresponding to the target quantization coefficient; and determining, according to the index, the target context model corresponding to the target quantization coefficient from the multiple context models corresponding to the target quantization coefficients.

In a fifth clause, the method of the fourth clause, where determining the index of the target context model corresponding to the target quantization coefficient includes:

in response to that the target quantization coefficient is a base range indicated by flag 1 of the first quantization coefficient, determining an index of the target context model corresponding to the base range according to a sum of base ranges of decoded quantization coefficients around the first quantization coefficient.

In a sixth clause, the method of the fifth clause, where determining the index of the target context model corresponding to the base range according to the sum of the base ranges of the decoded quantization coefficients around the first quantization coefficient includes:

adding the sum of the base ranges of the decoded quantization coefficients around the first quantization coefficient to a first preset value, to obtain a first sum value;

dividing the first sum value by a first value, to obtain a first ratio; and determining, according to the first ratio, the index of the target context model corresponding to the base range.

In a seventh clause, the method of the sixth clause, the first value is 4.

In an eighth clause, the method of the sixth clause, the first preset value is 2.

In a ninth clause, the method of the seventh clause, where determining, according to the first ratio, the index of the target context model corresponding to the base range includes:

determining a minimum value between the first ratio and a first preset threshold as a second value; and determining, according to the second value, the index of the target context model corresponding to the base range.

In a tenth clause, the method of the seventh clause, the first preset threshold is 4.

In a eleventh clause, the method of the ninth clause, where determining, according to the second value, the index of the target context model corresponding to the base range includes:

determining an offset index of the base range; and determining a sum of the second value and the offset index of the base range as the index of the target context model corresponding to the base range.

In a twelfth clause, the method of the eleventh clause, where determining the offset index of the base range includes:

determining the offset index of the base range according to at least one of a position of the first quantization coefficient of the current block, a size of the current block, a scan order of the current block, or a color component of the current block.

In a thirteenth clause, the method of the twelfth clause, in a case where the first quantization coefficient is a quantization coefficient at an upper left position of the current block, the offset index of the base range is a first threshold.

In a fourteenth clause, the method of the thirteenth clause, in a case where the color component of the current block is a luma component, the first threshold is 0.

In a fifteenth clause, the method of the twelfth clause, in a case where the first quantization coefficient is not a quantization coefficient at an upper left position of the current block, the offset index of the base range is a second threshold.

In a sixteenth clause, the method of the fifteenth clause, in a case where the color component of the current block is a luma component, the second threshold is 5.

In a seventeenth clause, the method of the fourth clause, where determining the index of the target context model corresponding to the target quantization coefficient includes:

in response to that the target quantization coefficient is a lower range indicated by flags 2 to 5 of the first quantization coefficient, determining an index of a target context model corresponding to the lower range according to a sum of base ranges and lower ranges of decoded quantization coefficients around the first quantization coefficient.

In an eighteenth clause, the method of the seventeenth clause, where determining the index of the target context model corresponding to the lower range according to the sum of the base ranges and the lower ranges of the decoded quantization coefficients around the first quantization coefficient includes:

adding the sum of the base ranges and lower ranges of the decoded quantization coefficients around the first quantization coefficient to a second preset value, to obtain a second sum value;

dividing the second sum value by a third value, to obtain a second ratio; and determining, according to the second ratio, the index of the target context model corresponding to the lower range.

In a nineteenth clause, the method of the eighteenth clause, the third value is 4.

In a twentieth clause, the method of the eighteenth clause, the second preset value is 2.

In a twenty-first clause, the method of the eighteenth clause, where determining, according to the second ratio, the index of the target context model corresponding to the lower range includes:

determining a minimum value between the second ratio and a second preset threshold as a fourth value; and determining, according to the fourth value, the index of the target context model corresponding to the lower range.

In a twenty-second clause, the method of the twenty-first clause, the second preset threshold is 4.

In a twenty-third clause, the method of the twenty-first clause, where determining, according to the fourth value, the index of the target context model corresponding to the lower range includes:

determining an offset index of the lower range; and determining a sum of the fourth value and the offset index of the lower range as the index of the target context model corresponding to the lower range.

In a twenty-fourth clause, the method of the twenty-third clause, where determining the offset index of the lower range includes:

determining the offset index of the lower range according to at least one of a position of the first quantization coefficient of the current block, a size of the current block, a scan order of the current block, or a color component of the current block.

In a twenty-fifth clause, the method of the twenty-fourth clause, in a case where the first quantization coefficient is a quantization coefficient at an upper left position of the current block, the offset index of the lower range is a third threshold.

In a twenty-sixth clause, the method of the twenty-fifth clause, in a case where the color component of the current block is a luma component, the third threshold is 0.

In a twenty-seventh clause, the method of the twenty-fourth clause, in a case where the first quantization coefficient is not a quantization coefficient at an upper left position of the current block, the offset index of the lower range is a fourth threshold.

In a twenty-eighth clause, the method of the twenty-seventh clause, in a case where the color component of the current block is a luma component, the fourth threshold is 7.

In a twenty-ninth clause, the method of any one of the third to twenty-eighth clause, where decoding the target quantization coefficient of the first quantization coefficient using the target context model corresponding to the target quantization coefficient, to obtain the decoded first quantization coefficient includes:

decoding a base range of the first quantization coefficient using a target context model corresponding to a base range indicated by flag 1 of the first quantization coefficient, to obtain a decoded base range; and determining the first quantization coefficient according to the decoded base range.

In a thirtieth clause, the method of the twenty-ninth clause, where determining the first quantization coefficient according to the decoded base range includes:

in response to that the first quantization coefficient further includes a lower range indicated by flags 2 to 5, decoding a lower range of the first quantization coefficient using a target context model corresponding to the lower range to obtain a decoded lower range; and determining the first quantization coefficient according to the decoded base range and decoded lower range.

In a thirty-first clause, the method of any one of the fourth to twenty-eighth clause, where determining, according to the index, the target context model corresponding to the target quantization coefficient from the multiple context models corresponding to the target quantization coefficients includes:

selecting at least one context model from the multiple context models corresponding to the target quantization coefficients, according to at least one of a quantization parameter, a transform type, a transform block size, a scan type, or a color component corresponding to the first quantization coefficient; and determining a context model corresponding to the index in the at least one context model as the target context model corresponding to the target quantization coefficient.

In a thirty-second clause, the method of any one of the third to twenty-eighth clause, the method further includes:

initializing the multiple context models corresponding to the target quantization coefficients; and determining the target context model corresponding to the target quantization coefficient of the first quantization coefficient from the multiple context models corresponding to the target quantization coefficients includes:

determining the target context model corresponding to the target quantization coefficient of the first quantization coefficient from initialized multiple context models corresponding to the target quantization coefficients.

In a thirty-third clause, the method of the thirty-second clause, where initializing the multiple context models corresponding to the target quantization coefficients includes:

initializing the multiple context models corresponding to the target quantization coefficients using an equal probability value; or initializing the multiple context models corresponding to the target quantization coefficients using a convergent probability value, where the convergent probability value is a convergent probability value corresponding to a context model in a case where the context model is used to encode a test video.

In a thirty-fourth clause, the method of any one of the first to twenty-eighth clause, the method further includes:

determining whether parity of the first quantization coefficient is allowed to be hidden, according to at least one of a quantization parameter, a transform type, a transform block size, a scan type, or a color component corresponding to the first quantization coefficient; and determining, according to the P quantization coefficients, the parity of the quantization coefficient whose parity is hidden of the first quantization coefficient includes:

in a case where it is determined that the parity of the first quantization coefficient is allowed to be hidden, determining, according to the P quantization coefficients, the parity of the quantization coefficient whose parity is hidden.

In a thirty-fifth clause, the method of the thirty-fourth clause, where determining whether the parity of the first quantization coefficient is allowed to be hidden, according to at least one of the quantization parameter, the transform type, the transform block size, the scan type, or the color component corresponding to the first quantization coefficient includes:

in response to that the transform type of the current block is a first transform type, determining that the parity of the first quantization coefficient is not allowed to be hidden, where the first transform type is used to indicate that at least one direction of the current block is skipped transform.

In a thirty-sixth clause, the method of the thirty-fourth clause, where determining whether the parity of the first quantization coefficient is allowed to be hidden, according to at least one of the quantization parameter, the transform type, the transform block size, the scan type, or the color component corresponding to the first quantization coefficient includes:

in response to that the color component of the current block is a first component, determining that the parity of the first quantization coefficient is not allowed to be hidden.

In a thirty-seventh clause, the method of the thirty-sixth clause, the first component is a chroma component.

In a thirty-eighth clause, the method of any one of the first to twenty-eighth clause, where determining, according to the P quantization coefficients, the parity of the quantization coefficient whose parity is hidden of the first quantization coefficient includes: determining, according to parity corresponding to the P quantization coefficients, the parity of the quantization coefficient whose parity is hidden.

In a thirty-ninth clause, the method of any one of the first to twenty-eighth clause, where determining the second quantization coefficient with parity according to the parity of the quantization coefficient whose parity is hidden and the decoded first quantization coefficient includes:

performing an operation on the quantization coefficients whose parity is hidden using a preset operation mode, to obtain a first operation result;

processing the first operation result according to the parity, to obtain a second operation result; and obtaining the second quantization coefficient according to the second operation result and the first quantization coefficient.

In a fortieth clause, the method of any one of the first to twenty-eighth clause, where determining, according to the P quantization coefficients, the parity of the quantization coefficient whose parity is hidden of the first quantization coefficient includes:

in response to that the current region meets a preset condition, determining, according to the P quantization coefficients, the parity of the quantization coefficient whose parity is hidden.

In a forty-first clause, the method of the fortieth clause, the preset condition includes at least one of:

the number of non-zero quantization coefficients of the current region being greater than a first preset numerical value;

in the current region, a distance between a first non-zero quantization coefficient and a last non-zero quantization coefficient in a decoding scan order being greater than a second preset numerical value;

in the current region, a distance between a first non-zero quantization coefficient and a last quantization coefficient in a decoding scan order being greater than a third preset numerical value;

in the current region, a sum of absolute values of non-zero quantization coefficients being greater than a fourth preset numerical value;

a color component of the current block being a second component; or

a transform type of the current block being not a first transform type, the first transform type is used to indicate that at least one direction of the current block is skipped transform.

In a forty-second clause, the method of the forty-first clause, the second component is a luma component.

In a forty-third clause, the method of any one of the first to twenty-eighth clause, the method further includes:

in response to that the current block is transformed using a target transform mode, skipping the step of determining, according to the P quantization coefficients, the parity of the quantization coefficient whose parity is hidden of the first quantization coefficient.

In a forty-fourth clause, the method of the forty-third clause, the target transform mode includes secondary transform, multiple transform or a first transform type, and the first transform type is used to indicate that at least one direction of the current block is skipped transform.

In a forty-fifth clause, the method of any one of the first to twenty-eighth clause, the method further includes:

decoding the bitstream to obtain at least one flag, where the at least one flag is used to indicate whether parity of a quantization coefficient is allowed to be hidden; and determining, according to the P quantization coefficients, the parity of the quantization coefficient whose parity is hidden of the first quantization coefficient includes:

in response to that it is determined that parity of at least one quantization coefficient of the current block is allowed to be hidden according to the at least one flag, determining, according to the P quantization coefficients, the parity of the quantization coefficient whose parity is hidden.

In a forty-sixth clause, the method of the forty-fifth clause, the at least one flag includes at least one of a sequence level flag, a picture level flag, a slice level flag, a unit level flag, or a block level flag.

In a forty-seventh clause, the method of any one of the first to twenty-eighth clause, the first quantization coefficient is a non-zero quantization coefficient which is located at a K-th position in a scan order of the current region, K is less than or equal to the number of non-zero quantization coefficients of the current region.

In a forty-eighth clause, the method of any one of the first to twenty-eighth clause, where decoding the bitstream, to obtain the P quantization coefficients of the current region includes:

decoding the bitstream, to obtain decoded information of the current block;

dividing the current block into N regions, N is a positive integer; and obtaining, from the decoded information of the current block, the P quantization coefficients of the current region.

A video encoding method is provided in a forty-ninth clause of the present application, and the method includes:

dividing a current block into N regions, where N is a positive integer;

determining a second quantization coefficient of a current region, and performing parity hiding on all or a portion of the second quantization coefficient, to obtain a first quantization coefficient, where the current region is a region that includes at least one non-zero quantization coefficient in the N regions; and determining a target context model corresponding to the first quantization coefficient, and encoding the first quantization coefficient using the target context model to obtain a bitstream, where parity of a quantization coefficient whose parity is hidden of the first quantization coefficient is indicated by P quantization coefficients of the current region, and P is a positive integer.

In a fiftieth clause, the method of the forty-ninth clause, the target context model corresponding to the first quantization coefficient is the same as at least one of context models corresponding to other quantization coefficients whose parity is not hidden.

In a fifty-first clause, the method of the fiftieth clause, where determining the target context model corresponding to the first quantization coefficient, and encoding the first quantization coefficient using the target context model to obtain the bitstream includes:

obtaining multiple context models corresponding to target quantization coefficients of other quantization coefficients whose parity is not hidden, where the target quantization coefficients are portions of quantization coefficients among quantization coefficients; and determining a target context model corresponding to a target quantization coefficient of the first quantization coefficient from the multiple context models corresponding to the target quantization coefficients; and encoding the first quantization coefficient using the target context model to obtain the bitstream includes:

encoding the target quantization coefficient of the first quantization coefficient using the target context model of the target quantization coefficient, to obtain the bitstream.

In a fifty-second clause, the method of the fifty-first clause, where determining the target context model corresponding to the target quantization coefficient of the first quantization coefficient from the multiple context models corresponding to the target quantization coefficients includes:

determining an index of the target context model corresponding to the target quantization coefficient; and determining, according to the index, the target context model corresponding to the target quantization coefficient from the multiple context models corresponding to the target quantization coefficients.

In a fifty-third clause, the method of the fifty-second clause, where determining the index of the target context model corresponding to the target quantization coefficient includes:

in response to that the target quantization coefficient is a base range indicated by flag 1 of the first quantization coefficient, determining an index of the target context model corresponding to the base range according to a sum of base ranges of the encoded quantization coefficients around the first quantization coefficient.

In a fifty-fourth clause, the method of the fifty-third clause, where determining the index of the target context model corresponding to the base range according to the sum of the base ranges of the encoded quantization coefficients around the first quantization coefficient includes:

adding the sum of the base ranges of the encoded quantization coefficients around the first quantization coefficient to a first preset value, to obtain a first sum value;

dividing the first sum value by a first value, to obtain a first ratio; and determining, according to the first ratio, the index of the target context model corresponding to the base range.

In a fifty-fifth clause, the method of the fifty-fourth clause, the first value is 2.

In a fifty-sixth clause, the method of the fifty-fourth clause, the first preset value is 2.

In a fifty-seventh clause, the method of the fifty-fourth clause, where determining, according to the first ratio, the index of the target context model corresponding to the base range includes:

determining a minimum value between the first ratio and a first preset threshold as a second value; and determining, according to the second value, the index of the target context model corresponding to the base range.

In a fifty-eighth clause, the method of the fifty-fourth clause, the first preset threshold is 4.

In a fifty-ninth clause, the method of the fifty-seventh clause, where determining, according to the second value, the index of the target context model corresponding to the base range includes:

determining an offset index of the base range; and determining a sum of the second value and the offset index of the base range as the index of the target context model corresponding to the base range.

In a sixtieth clause, the method of the fifty-ninth clause, where determining the offset index of the base range includes:

determining the offset index of the base range according to at least one of a position of the first quantization coefficient of the current block, a size of the current block, a scan order of the current block, or a color component of the current block.

In a sixty-first clause, the method of the sixtieth clause, in a case where the first quantization coefficient is a quantization coefficient at an upper left position of the current block, the offset index of the base range is a first threshold.

In a sixty-second clause, the method of the sixty-first clause, in a case where the color component of the current block is a luma component, the first threshold is 0.

In a sixty-third clause, the method of the sixtieth clause, in a case where the first quantization coefficient is not a quantization coefficient at an upper left position of the current block, the offset index of the base range is a second threshold.

In a sixty-fourth clause, the method of the sixty-third clause, in a case where the color component of the current block is a luma component, the second threshold is 5.

In a sixty-fifth clause, the method of the fifty-second clause, where determining the index of the target context model corresponding to the target quantization coefficient includes:

in response to that the target quantization coefficient is a lower range indicated by flags 2 to 5 of the first quantization coefficient, determining an index of a target context model corresponding to the lower range according to a sum of base ranges and lower ranges of encoded quantization coefficients around the first quantization coefficient.

In a sixty-sixth clause, the method of the sixty-fifth clause, where determining the index of the target context model corresponding to the lower range according to the sum of the base ranges and the lower ranges of the encoded quantization coefficients around the first quantization coefficient includes:

adding the sum of the base ranges and lower ranges of the encoded quantization coefficients around the first quantization coefficient to a second preset value, to obtain a second sum value;

dividing the second sum value by a third value, to obtain a second ratio; and determining, according to the second ratio, the index of the target context model corresponding to the lower range.

In a sixty-seventh clause, the method of the sixty-sixth clause, the third value is 2.

In a sixty-eighth clause, the method of the sixty-sixth clause, the second preset value is 2.

In a sixty-ninth clause, the method of the sixty-sixth clause, where determining, according to the second ratio, the index of the target context model corresponding to the lower range includes:

determining a minimum value between the second ratio and a second preset threshold as a fourth value; and determining, according to the fourth value, the index of the target context model corresponding to the lower range.

In a seventieth clause, the method of the sixty-ninth clause, the second preset threshold is 4.

In a seventy-first clause, the method of the sixty-ninth clause, where determining, according to the fourth value, the index of the target context model corresponding to the lower range includes:

determining an offset index of the lower range; and determining a sum of the fourth value and the offset index of the lower range as the index of the target context model corresponding to the lower range.

In a seventy-second clause, the method of the seventy-first clause, where determining the offset index of the lower range includes:

determining the offset index of the lower range according to at least one of a position of the first quantization coefficient of the current block, a size of the current block, a scan order of the current block, or a color component of the current block.

In a seventy-third clause, the method of the seventy-second clause, in a case where the first quantization coefficient is a quantization coefficient at an upper left position of the current block, the offset index of the lower range is a third threshold.

In a seventy-fourth clause, the method of the seventy-third clause, in a case where the color component of the current block is a luma component, the third threshold is 0.

In a seventy-fifth clause, the method of the seventy-second clause, in a case where the first quantization coefficient is not a quantization coefficient at an upper left position of the current block, the offset index of the lower range is a fourth threshold.

In a seventy-sixth clause, the method of the seventy-fifth clause, in a case where the color component of the current block is a luma component, the fourth threshold is 7.

In a seventy-seventh clause, the method of any one of the fifty-first to seventy-sixth clause, where encoding the target quantization coefficient of the first quantization coefficient using the target context model of the target quantization coefficient, to obtain the bitstream includes:

encoding a base range of the first quantization coefficient using a target context model corresponding to a base range indicated by flag 1 of the first quantization coefficient, to obtain an encoded base range; and obtaining the bitstream according to the encoded base range.

In a seventy-eighth clause, the method of the seventy-seventh clause, where obtaining the bitstream according to the encoded base range includes:

in response to that the first quantization coefficient further includes a lower range indicated by flags 2 to 5, encoding a lower range of the first quantization coefficient using a target context model corresponding to the lower range to obtain an encoded lower range; and determining the bitstream according to the encoded base range and encoded lower range.

In a seventy-ninth clause, the method of any one of the fifty-second to seventy-sixth clause, where determining, according to the index, the target context model corresponding to the target quantization coefficient of the first quantization coefficient from the multiple context models corresponding to the target quantization coefficients includes:

selecting at least one context model from the multiple context models corresponding to the target quantization coefficients, according to at least one of a quantization parameter, a transform type, a transform block size, a scan type, or a color component corresponding to the first quantization coefficient; and determining a context model corresponding to the index in the at least one context model as the target context model corresponding to the target quantization coefficient of the first quantization coefficient.

In an eightieth clause, the method of any one of the fifty-first to seventy-sixth clause, the method further includes:

initializing the multiple context models corresponding to the target quantization coefficients; and determining the target context model corresponding to the target quantization coefficient of the first quantization coefficient from the multiple context models corresponding to the target quantization coefficients includes:

determining the target context model corresponding to the target quantization coefficient of the first quantization coefficient from initialized multiple context models corresponding to the target quantization coefficients.

In an eighty-first clause, the method of the eightieth clause, where initializing the multiple context models corresponding to the target quantization coefficients includes:

initializing the multiple context models corresponding to the target quantization coefficients using an equal probability value; or initializing the multiple context models corresponding to the target quantization coefficients using a convergent probability value, where the convergent probability value is a convergent probability value corresponding to a context model in a case where the context model is used to encode a test video.

In an eighty-second clause, the method of any one of the forty-ninth to seventy-sixth clause, the method further includes:

determining whether parity of the first quantization coefficient is allowed to be hidden, according to at least one of a quantization parameter, a transform type, a transform block size, a scan type, or a color component corresponding to the first quantization coefficient; and performing parity hiding on all or a portion of the second quantization coefficient, to obtain the first quantization coefficient includes:

in a case where it is determined that the parity of the first quantization coefficient is allowed to be hidden, performing parity hiding on all or a portion of the second quantization coefficient, to obtain the first quantization coefficient.

In an eighty-third clause, the method of the eighty-second clause, where determining whether the parity of the first quantization coefficient is allowed to be hidden, according to at least one of the quantization parameter, the transform type, the transform block size, the scan type, or the color component corresponding to the first quantization coefficient includes:

in response to that the transform type of the current block is a first transform type, determining that the parity of the first quantization coefficient is not allowed to be hidden, where the first transform type is used to indicate that at least one direction of the current block is skipped transform.

In an eighty-fourth clause, the method of the eighty-third clause, where determining whether the parity of the first quantization coefficient is allowed to be hidden, according to at least one of the quantization parameter, the transform type, the transform block size, the scan type, or the color component corresponding to the first quantization coefficient includes:

in response to that the color component of the current block is a first component, determining that the parity of the first quantization coefficient is not allowed to be hidden.

In an eighty-fifth clause, the method of the eighty-fourth clause, the first component is a chroma component.

In an eighty-sixth clause, the method of any one of the forty-ninth to seventy-sixth clause, the parity of the quantization coefficient whose parity is hidden is indicated by parity corresponding to the P quantization coefficients of the current region.

In an eighty-seventh clause, the method of the eighty-sixth clause, where in response to that the parity corresponding to the P quantization coefficients is inconsistent with the parity of the quantization coefficient whose parity is hidden, the method further includes:

adjusting the P quantization coefficients, to make the parity corresponding to the P quantization coefficients is consistent with the parity of the quantization coefficient whose parity is hidden.

In an eighty-eighth clause, the method of any one of the forty-ninth to seventy-sixth clause, where performing parity hiding on all or a portion of the second quantization coefficient, to obtain the first quantization coefficient includes:

processing all or a portion of the second quantization coefficient using a preset operation mode, to obtain the first quantization coefficient.

In an eighty-ninth clause, the method of the eighty-eighth clause, where the preset operation mode includes dividing all or a portion of the second quantization coefficient by 2 and rounding a result.

In a ninetieth clause, the method of any one of the forty-ninth to seventy-sixth clause, where performing parity hiding on all or a portion of the second quantization coefficient, to obtain the first quantization coefficient includes:

in response to that the current region meets a preset condition, performing parity hiding on all or a portion of the second quantization coefficient, to obtain the first quantization coefficient.

In a ninety-first clause, the method of the ninetieth clause, the preset condition includes at least one of:

the number of non-zero quantization coefficients of the current region being greater than a first preset numerical value;

in the current region, a distance between a first non-zero quantization coefficient and a last non-zero quantization coefficient in a scan order being greater than a second preset numerical value;

in the current region, a distance between a first non-zero quantization coefficient and a last quantization coefficient in a scan order being greater than a third preset numerical value;

in the current region, a sum of absolute values of non-zero quantization coefficients being greater than a fourth preset numerical value;

a color component of the current block being a second component; or a transform type of the current block being not a first transform type, where the first transform type is used to indicate that at least one direction of the current block is skipped transform.

In a ninety-second clause, the method of the ninety-first clause, the second component is a luma component.

In a ninety-third clause, the method of any one of the forty-ninth to seventy-sixth clause, the method further includes:

in response to that the current block is transformed using a target transform mode, skipping the step of performing parity hiding on all or a portion of the second quantization coefficient, to obtain the first quantization coefficient.

In a ninety-fourth clause, the method of the ninety-third clause, the target transform method includes secondary transform, multiple transform or a first transform type, and the first transform type is used to indicate that at least one direction of the current block is skipped transform.

In a ninety-fifth clause, the method of any one of the forty-ninth to seventy-sixth clause, the method further includes:

obtaining at least one flag, where the at least one flag is used to indicate whether parity of a quantization coefficient is allowed to be hidden; and performing parity hiding on all or a portion of the second quantization coefficient, to obtain the first quantization coefficient includes:

in response to that it is determined that parity of a quantization coefficient of the current block is allowed to be hidden according to the at least one flag, performing parity hiding on all or a portion of the second quantization coefficient, to obtain the first quantization coefficient.

In a ninety-sixth clause, the method of the ninety-fifth clause, the at least one flag includes at least one of a sequence level flag, a picture level flag, a slice level flag, a unit level flag, or a block level flag.

In a ninety-seventh clause, the method of any one of the forty-ninth to seventy-sixth clause, the first quantization coefficient is a non-zero quantization coefficient which is located at a K-th position in a scan order of the current region, K is less than or equal to the number of non-zero quantization coefficients of the current region.

The technical solution provided in the embodiments of the present application will be described in detail below in conjunction with specific embodiments.

First, in conjunction with FIG. 6, a decoding side will be introduced as an example.

FIG. 6 is a schematic flowchart of a video decoding method provided by the embodiments of the present application. The embodiments of the present application are applied to video decoders shown in FIG. 1 and FIG. 3. As shown in FIG. 6, the method of the embodiments of the present application includes following content.

S401, a bitstream is decoded, to obtain P quantization coefficients of a current region.

Here, the current region is a region of a current block that includes at least one non-zero quantization coefficient.

In the embodiments of the present application, the current block is divided into one or more regions, for example, into N regions, where N is a positive integer, and the current region is a region of the N regions of the current block that includes at least one non-zero quantization coefficient.

To reduce encoding cost, according to parity related to quantization coefficients of the same region, for example, according to parity of a sum of absolute values of the quantization coefficients of the region, an encoding side may perform parity hiding on one or more quantization coefficients of the region, to reduce quantization coefficients whose parity is hidden. For example, a second quantization coefficient whose parity is to be hidden is a1, and parity hiding is performed on all or a portion of the second quantization coefficient, to obtain a first quantization coefficient a2, where a2 is less than a1, such that, encoding a2 uses fewer bits than encoding a1, thereby reducing the encoding cost.

From the above, it can be known that, in the embodiments of the present application, the encoding side hides all or a portion of the parity of the second quantization coefficient, to obtain the first quantization coefficient. In this case, the first quantization coefficient includes the quantization coefficient whose parity is hidden. In the embodiments of the present application, the parity of the quantization coefficients whose parity is hidden of the first quantization coefficient is indicated by P quantization coefficients of the current region, and the decoding side reconstructs the quantization coefficients whose parity is hidden according to the parity of the quantization coefficients whose parity is hidden of the first quantization coefficient, to obtain a reconstructed second quantization coefficient. Based on this, when decoding the first quantization coefficient, the decoding side first decodes the bitstream, to obtain the P quantization coefficients of the current region.

In an example, the P quantization coefficients are all quantization coefficients of the current region except the first quantization coefficient.

In another example, the P quantization coefficients are portions of quantization coefficients of the current region.

Optionally, the P quantization coefficients do not include the first quantization coefficient of the current region.

In some embodiments, the quantization coefficients are obtained by quantizing transform coefficients. For example, the encoding side predicts the current block to obtain a predicted value of the current block, and subtracts the predicted value from the original value of the current block, to obtain a residual value of the current block. The encoding side transforms the residual value to obtain a transform coefficient of the current block, then performs quantization on the transform coefficient to obtain the quantization coefficient, and then encodes the quantization coefficient to obtain a bitstream. In this way, the decoding side receives the bitstream, and decodes the bitstream, to obtain the quantization coefficient, performs inverse quantization on the quantization coefficient, to obtain the transform coefficient of the current block, and then performs inverse transformation on the transform coefficient to obtain the residual value of the current block. Optionally, in this example, the current block may also be referred to as a current transform block.

In some embodiments, the quantization coefficients are obtained by quantizing the residual value. For example, the encoding side predicts the current block to obtain a predicted value of the current block, and subtracts the predicted value from the original value of the current block, to obtain a residual value of the current block. The encoding side performs quantization on the residual value to obtain the quantization coefficient, and then encodes the quantization coefficient to obtain a bitstream. In this way, the decoding side receives the bitstream, and decodes the bitstream, to obtain the quantization coefficient, and then performs inverse quantization on the quantization coefficient, to obtain the residual value of the current block.

In some embodiments, the quantization coefficient may be understood as a value consisting of an absolute value and a sign decoded from the bitstream. The absolute value includes a value of a flag corresponding to the quantization coefficient. If the value of the quantization coefficient exceeds 15, the absolute value further includes an absolute value of the portion exceeding 15.

In the embodiments of the present application, the current block may be divided into N regions, and sizes of the N regions may be the same or different.

In the embodiments of the present application, the decoding side and the encoding side use the same region division method to divide the current block into N regions.

In some embodiments, both the decoding side and the encoding side use a default region division method to divide the current block into N regions.

In some embodiments, the region division method of the current block may be indicated by the encoding side to the decoding side. For example, a flag A is encoded in the bitstream, and the flag A is used to indicate the region division method of the current block. In this way, the decoding side obtains the flag A by decoding the bitstream, and determines the region division method of the current block according to the flag A.

Optionally, the flag A may be a sequence level flag, used to indicate that all decoding blocks in the sequence may be divided into N regions by using the region division method.

Optionally, the flag A may be a frame level flag, used to indicate that all decoding blocks of the picture may be divided into N regions by using the region division method.

Optionally, the flag A may be a slice level flag, used to indicate that all decoding blocks of the picture slice may be divided into N regions by using the region division method.

Optionally, the flag A may be a block level flag, used to indicate that the current block may be divided into N regions by using the region division method.

In the embodiments of the present application, the process of determining the P quantization coefficients of the current region by the decoding side includes but is not limited to the following examples.

Example 1, the decoding side performs region-by-region decoding to obtain the quantization coefficients whose parity is not hidden of each region. For example, after decoding the quantization coefficients whose parity is not hidden of a region, the decoding side determines the P quantization coefficients of the region, then, the decoding side decodes the quantization coefficients whose parity is not hidden of a next region, and determines the P quantization coefficients of the next region. That is, in this embodiment, the decoding side may determine the P quantization coefficients of the current region in a case where all the quantization coefficients whose parity is not hidden of the current block are not completely decoded. For example, the division method of the regions is to take K samples in the scan direction as one region. In this way, in a case where the decoding side decodes the quantization coefficients whose parity is not hidden of K quantization coefficients, the decoding side determines P quantization coefficients from the quantization coefficients whose parity is not hidden of the K quantization coefficients.

Example 2, after determining all the quantization coefficients whose parity is not hidden of the current block, the decoding side determines P quantization coefficients of the current region. The specific steps include:

S401-A1, decoding a bitstream to obtain decoded information of the current block;

S401-A2, dividing the current block into N regions, where the N is a positive integer; and S401-A3, obtaining P quantization coefficients of the current region from the decoded information of the current block.

In Example 2, the decoding side first decodes the bitstream to obtain the decoded information of the current block, where the decoded information includes quantization coefficients of different regions of the current block. Next, the current block is divided into N regions according to the region division method. It is assumed that the current region is the k-th region in the N regions, decoded information corresponding to the k-th region in the decoded information of the current block is determined as the decoded information of the current region. The decoded information of the current region includes the P quantization coefficients of the current region.

The specific methods of dividing the current block into N regions in S401-A2 include but are not limited to the following method.

Method 1: the current block is divided into N regions according to a scan order.

Optionally, at least two regions in the N regions include the same number of quantization coefficients.

Optionally, at least two regions in the N regions include different numbers of quantization coefficients.

In an example, according to the scan direction, every M non-zero quantization coefficients of the current block are divided into one region, to obtain N regions. Each of the N regions includes M non-zero quantization coefficients. At least one of the N regions includes one or more hidden coefficients. In this example, if the number of the non-zero quantization coefficients included in the last region is not M, the last region is divided into a separate region, or the last region is merged with the previous region into one region.

In another example, according to the scan direction, every K samples of the current block are divided into one region, to obtain N regions. For example, for a transform block with 8×8 size using the reverse ZigZag scan order, in a case where each region is of equal size, that is, each region contains 16 coefficients, as shown in FIG. 7, the current block is divided into 4 regions. In this example, the N divided regions have the same size, and each region includes K samples. In the N regions, there may be a region where all quantization coefficients are zero, or there may be a region that does not include a hidden coefficient. That is, at least one region in the N regions includes one or more hidden coefficients. In this example, if the quantization coefficient included in the last region is not K, the last region is divided into a separate region, or the last region is merged with the previous region into one region.

Method 2: the current block is divided into N regions according to spatial positions.

In an example, the N regions are subblocks of the current block. For example, the current block is evenly divided into N subblocks. Exemplarily, the size of each subblock is 4*4. In this example, in the N regions, there may be a region where all quantization coefficients are 0, or there may be a region that does not include a hidden coefficient. That is, at least one region in the N regions includes one or more hidden coefficients.

In another example, according to the spatial position relationship of the samples of the current block, a plurality of samples adjacent to each other in the spatial positions are divided into one subblock, and each subblock includes at least one non-zero quantization coefficient.

In the embodiments of the present application, the method of dividing the current block into N regions may include other methods in addition to the above examples, which are not limited in the embodiments of the present application.

In the embodiments of the present application, the current region includes at least one first quantization coefficient. In some embodiments, the first quantization coefficient is also called a hidden coefficient.

In an example, the first quantization coefficient may be any non-zero quantization coefficients of the current region defaulted by the encoding side and decoding side.

In another example, the first quantization coefficient may be a non-zero quantization coefficient with a largest absolute value of the current region.

In yet another example, the first quantization coefficient is a non-zero quantization coefficient located at the K-th position in the scan order of the current region, where K is less than or equal to the number of non-zero quantization coefficients of the current region. For example, as shown in FIG. 7, the current region includes 16 coefficients, and the 16th non-zero quantization coefficient and/or 15th non-zero quantization coefficient in the scan order may be used as the first quantization coefficient of the current region.

In some embodiments, a flag may be used to indicate whether the current block is allowed to use the technology for hiding parity of the quantization coefficient provided by the embodiments of the present application. Optionally, the technology for hiding parity of the quantization coefficient provided by the embodiments of the present application is also called a parity hiding technology.

Exemplarily, the at least one flag that is set may be flags with different levels, which are used to indicate whether the parity of the quantization coefficient are allowed to be hidden on the corresponding level.

Optionally, the at least one flag includes at least one of a sequence level flag, a picture level flag, a slice level flag, a unit level flag, or a block level flag.

For example, the at least one flag includes the sequence level flag, and the sequence level flag is used to indicate whether a current sequence allows the parity of the quantization coefficient to be hidden. For example, in response to that the value of the sequence level flag is 1, the sequence level flag indicates that the current sequence allows the parity of the quantization coefficient to be hidden, or in response to that the value of the sequence level flag is 0, the sequence level flag indicates that the current sequence does not allow the parity of the quantization coefficient to be hidden.

Optionally, in response to that the at least one flag includes the sequence level flag, the sequence level flag may be located in a sequence header.

For another example, the at least one flag includes the picture level flag, and the picture level flag is used to indicate whether a current picture allows the parity of the quantization coefficient to be hidden. For example, in response to that the value of the picture level flag is 1, the picture level flag indicates that the current picture allows the parity of the quantization coefficient to be hidden, or in response to that the value of the picture level flag is 0, the picture level flag indicates that the current picture does not allow the parity of the quantization coefficient to be hidden.

Optionally, in response to that the at least one flag includes the picture level flag, the picture level flag may be located in a picture header.

For another example, the at least one flag includes the slice level flag, and the slice level flag is used to indicate whether a current slice allows the parity of the quantization coefficient to be hidden. For example, in response to that the value of the slice level flag is 1, the slice level flag indicates that the current slice allows the parity of the quantization coefficient to be hidden, or in response to that the value of the slice level flag is 0, the slice level flag indicates that the current slice does not allow the parity of the quantization coefficient to be hidden.

Optionally, in response to that the at least one flag includes the slice level flag, the slice level flag may be located in a slice header.

For another example, the at least one flag includes the unit level flag, and the unit level flag is used to indicate whether a current CTU allows the parity of the quantization coefficient to be hidden. For example, in response to that the value of the unit level flag is 1, the unit level flag indicates that the current CTU allows the parity of the quantization coefficient to be hidden, or in response to that the value of the unit level flag is 0, the unit level flag indicates that the current CTU does not allow the parity of the quantization coefficient to be hidden.

For another example, the at least one flag includes the block level flag, and the block level flag is used to indicate whether a current block allows the parity of the quantization coefficient to be hidden. For example, in response to that the value of the block level flag is 1, the block level flag indicates the current block allows the parity of the quantization coefficient to be hidden, or in response to that the value of the block level flag is 0, the block level flag indicates that the current block does not allow the parity of the quantization coefficient to be hidden.

In this way, the decoding side first decodes the bitstream to obtain the at least one flag, and determines whether the current block allows the parity of the quantization coefficient to be hidden, according to the at least one flag. In response to that it is determined that the current block does not allow the parity of the quantization coefficient to be hidden according to the at least one flag, the method of the embodiments of the present application is skipped, and the decoding side directly perform inverse quantization on the decoded quantization coefficient, to obtain a transform coefficient. In response to that it is determined that the current block is allowed to use the parity hiding technology provided by the embodiments of the present application according to the at least one flag, the method of the embodiments of the present application is performed.

For example, if the at least one flag includes a sequence level flag, a picture level flag, a slice level flag, a unit level flag, or a block level flag. In this case, the decoding side first decodes the bitstream, to obtain a sequence level flag. In response to that the sequence level flag indicates that the current sequence does not allow the use of the quantization coefficient parity hiding technology provided in the embodiments of the present application, the method of the embodiments of the present application is skipped and the traditional method is used to perform inverse quantization on the current block. In response to that the sequence level flag indicates that the current sequence allows the use of the quantization coefficient parity hiding technology provided in the embodiments of the present application, then the decoding side decodes the bitstream to obtain a picture level flag. In response to that the picture level flag indicates that the current picture does not allow the use of the quantization coefficient parity hiding technology provided in the embodiments of the present application, the method of the embodiments of the present application is skipped and the traditional method is used to perform inverse quantization on the current block. In response to that the picture level flag indicates that the current picture allows the use of the quantization coefficient parity hiding technology provided in the embodiments of the present application, then, the decoding side decodes the bitstream to obtain a slice level flag. In response to that the slice level flag indicates that the current slice does not allow the use of the quantization coefficient parity hiding technology provided in the embodiments of the present application, the method of the embodiments of the present application is skipped and the traditional method is used to perform inverse quantization on the current block. In response to that the slice level flag indicates that the current slice allows the use of the quantization coefficient parity hiding technology provided in the embodiments of the present application, then the decoding side decodes the bitstream to obtain a unit level flag. In response to that the unit level flag indicates that the current CTU does not allow the use of the quantization coefficient parity hiding technology provided in the embodiments of the present application, the method of the embodiments of the present application is skipped and the traditional method is used to perform inverse quantization on the current block. In response to that the unit level flag indicates that the current CTU allows the use of the quantization coefficient parity hiding technology provided in the embodiments of the present application, then the decoding side decodes the bitstream to obtain a block level flag. In response to that the block level flag indicates that the current block does not allow the use of the quantization coefficient parity hiding technology provided in the embodiments of the present application, the method of the embodiments of the present application is skipped and the traditional method is used to perform inverse quantization on the current block. In response to that the block level flag indicates that the current block allows the use of the quantization coefficient parity hiding technology provided in the embodiments of the present application, the embodiments of the present application is performed.

In some embodiments, the quantization coefficient parity hiding technology provided by the embodiments of the present application is mutually exclusive with a target transform mode, where the target transform mode includes secondary transform, multiple transform or a first transform type, etc., where the first transform type is used to indicate that at least one direction of the current block is skipped transform. In this case, in a case where the decoding side determines that the current block is transformed using the target transform mode, the technical solution provided by the embodiments of the present application is skipped, for example, the following step S402 is skipped.

S402, parity of a quantization coefficient whose parity is hidden of a first quantization coefficient is determines according to the P quantization coefficients.

Here, the first quantization coefficient is a quantization coefficient obtained by performing parity hiding on all or a portion of a second quantization coefficient, the second quantization coefficient is a quantization coefficient whose parity is not hidden of the current region, for example, performing parity hiding on a portion of an absolute value of the second quantization coefficient that is greater than n.

For example, it is assumed that the second quantization coefficient is 45, performing parity hiding on a portion of the second quantization coefficient that is greater than 10 (i.e., 35), and exemplarily, performing parity hiding on a portion 35 of the second quantization coefficient to obtain 17. In this case, the first quantization coefficient is a sum of a parity-unhidden portion of the second quantization coefficient (i.e. 10) and the quantization coefficient whose parity is hidden (i.e. 17), that is, the first quantization coefficient is 27. That is, in the first quantization coefficient, the parity-unhidden portion is 10, the quantization coefficient whose parity is hidden is 17. When reconstructing the quantization coefficient whose parity is hidden of the first quantization coefficient, the reconstructed needs to be performed according to the parity of the quantization coefficient whose parity is hidden.

In the embodiments of the present application, the P quantization coefficients of the current region are used to indicate the parity of the quantization coefficient whose parity is hidden. In this way, after obtaining the P quantization coefficients of the current region according to the above steps, the decoding side may determine the parity of the quantization coefficient whose parity is hidden according to the P quantization coefficients of the current region, and then realize accurately reconstruction of the parity-hidden portion according to the parity of the quantization coefficient whose parity is hidden.

The embodiments of the present application does not limit the manner of determining, according to the P quantization coefficients of the current region, the parity of the quantization coefficient whose parity is hidden of the first quantization coefficient, in the above S402.

For example, a binary characteristic (0 or 1) of the P quantization coefficients of the current region is used to determine the parity of the quantization coefficient whose parity is hidden of the first quantization coefficient.

In some embodiments, the above S402 includes the following S402-A:

S402-A, determining, according to parity corresponding to the P quantization coefficients, the parity of the quantization coefficient whose parity is hidden.

The implementations of the above S402-A include but are not limited to the following cases.

Case 1: the parity corresponding to the P quantization coefficients is indicated by parity of a sum of first absolute values of the P quantization coefficients, in this case, the above S402-A includes: determining, according to the parity of the sum of the first absolute values of the P quantization coefficients, the parity of the quantization coefficient whose parity is hidden.

Here, a first absolute value of a quantization coefficient is all or a portion of the absolute value of the quantization coefficient, for example, the first absolute value is a portion of the absolute value of the quantization coefficient that is less than 15.

In the embodiments of the present application, the absolute value of the quantization coefficient is indicated by one or more flags. If the absolute value of the quantization coefficient is greater than 15, the absolute value of the quantization coefficient further includes a portion of the quantization coefficient exceeding 15.

Based on above, in the embodiments of the present application, all absolute value of the quantization coefficient refers to the entire absolute value of the quantization coefficient decoded, including the value of each flag. If the absolute value of the quantization coefficient is greater than 15, the all absolute value of the quantization coefficient further includes the value of the portion exceeding 15.

Optionally, a portion of the absolute value of the quantization coefficient refers to a value of all or a portion of the flag in the flag. For example, the decoding side determines the parity of the quantization coefficient whose parity is hidden according to parity of a sum of flag 1 of P quantization coefficients.

For example, if the sum of the first absolute values of the P quantization coefficients is even, it is determined that the quantization coefficient whose parity is hidden is even.

It should be noted that, in Case 1, in response to that the parity of the quantization coefficient whose parity is hidden of the second quantization coefficient is inconsistent with the parity of the sum of the first absolute values of the P quantization coefficients, the encoding side modifies the parity of at least one of the P quantization coefficients. For example, if the quantization coefficient whose parity is hidden of the second quantization coefficient is odd, and the sum of the first absolute values of the P quantization coefficients is even, in this case, the minimum quantization coefficient in the P quantization coefficients is added by 1 or subtracted by 1, to modify the sum of the first absolute values of the P quantization coefficients to be odd. For another example, if the quantization coefficient whose parity is hidden of the second quantization coefficient is even, and the sum of the first absolute values of the P quantization coefficients is odd, in this case, the minimum quantization coefficient in the P quantization coefficients is added by 1 or subtracted by 1, to modify the sum of the first absolute values of the P quantization coefficients to be even.

Case 2: the parity corresponding to the P quantization coefficients is parity of the number of target quantization coefficients of the P quantization coefficients, in this case, the above S402-A includes: determining the target quantization coefficients of the P quantization coefficients, and determining the parity of the quantization coefficient whose parity is hidden according to the parity of the number of target quantization coefficients of the P quantization coefficients.

A target quantization coefficient is any one of a non-zero quantization coefficient, a non-zero quantization coefficient with even value, a quantization coefficient with even value, and a quantization coefficient with odd value in the P quantization coefficients.

In an example, if the target quantization coefficient is the non-zero quantization coefficient in the P quantization coefficients, the parity of the quantization coefficient whose parity is hidden may be determined according to parity of the number of non-zero quantization coefficients in the P quantization coefficients.

For example, if the number of non-zero quantization coefficients in the P quantization coefficients is odd, it is determined that the quantization coefficient whose parity is hidden is odd.

For example, if the number of non-zero quantization coefficients in the P quantization coefficients is even, it is determined that the quantization coefficient whose parity is hidden is even.

It should be noted that, in the example, in response to that the parity of the quantization coefficient whose parity is hidden of the second quantization coefficient is inconsistent with the parity of the number of non-zero quantization coefficients in the P quantization coefficients, the encoding side modifies at least one quantization coefficient in the P quantization coefficients. For example, if the quantization coefficient whose parity is hidden of the second quantization coefficient is odd, and the number of non-zero quantization coefficients in the P quantization coefficients is even, one of the zero quantization coefficients in the P quantization coefficients may be adjusted to 1, or a value of a minimum non-zero quantization coefficient in the P quantization coefficients may be adjusted to 0, to make the number of non-zero quantization coefficients in the P quantization coefficients is odd. For another example, if the quantization coefficient whose parity is hidden of the second quantization coefficient is even, and the number of non-zero quantization coefficients in the P quantization coefficients is odd, one of the zero quantization coefficients in the P quantization coefficients may be adjusted to 1, or the value of the minimum quantization coefficient in the P quantization coefficients may be adjusted to 0, to make the number of non-zero quantization coefficients in the P quantization coefficients is even.

In another example, if the target quantization coefficient is a non-zero quantization coefficient with even value in the P quantization coefficients, the parity of the quantization coefficient whose parity is hidden may be determined according to parity of the number of non-zero quantization coefficients with even value in the P quantization coefficients.

For example, if the number of non-zero quantization coefficients with even value in the P quantization coefficients is odd, it is determined that the quantization coefficient whose parity is hidden is odd.

For example, if the number of non-zero quantization coefficients with even value in the P quantization coefficients is even, it is determined that the quantization coefficient whose parity is hidden is even.

It should be noted that, in the example, in response to that the parity of the quantization coefficient whose parity is hidden of the second quantization coefficient is inconsistent with the parity of the number of non-zero quantization coefficients with even value in the P quantization coefficients, the encoding side modifies at least one coefficient in the P quantization coefficients. For example, if the quantization coefficient whose parity is hidden of the second quantization coefficient is odd, and the number of non-zero quantization coefficients with even value in the P quantization coefficients is even, one of the zero quantization coefficients in the P quantization coefficients may be adjusted to 2, or the value of the minimum non-zero quantization coefficient in the P quantization coefficients may be added by 1 or subtracted by 1, to make the number of non-zero quantization coefficients with even value in the P quantization coefficients is odd. For another example, if the quantization coefficient whose parity is hidden of the second quantization coefficient is even, and the number of non-zero quantization coefficients with even value in the P quantization coefficients is odd, one of the zero quantization coefficients in the P quantization coefficients may be adjusted to 2, or the value of the minimum non-zero quantization coefficient in the P quantization coefficients may be added by 1 or subtracted by 1, to make the number of non-zero quantization coefficients with even value in the P quantization coefficients is even.

In another example, if the target quantization coefficient is the quantization coefficient with even value in the P quantization coefficients, the parity of the quantization coefficient whose parity is hidden may be determined according to parity of the number of quantization coefficients with even value in the P quantization coefficients. Here, the quantization coefficients with even value include a quantization coefficient with a value of 0.

For example, if the number of quantization coefficients with even value in the P quantization coefficients is odd, it is determined that the quantization coefficient whose parity is hidden is odd.

For example, if the number of quantization coefficients with even value in the P quantization coefficients is even, it is determined that the quantization coefficient whose parity is hidden is even.

It should be noted that, in the example, in response to that the parity of the quantization coefficient whose parity is hidden of the second quantization coefficient is inconsistent with the parity of the number of quantization coefficients with even value in the P quantization coefficients, the encoding side modifies at least one coefficient in the P quantization coefficients. For example, if the quantization coefficient whose parity is hidden of the second quantization coefficient is odd, and the number of quantization coefficients with even value in the P quantization coefficients is even, one of the zero quantization coefficients in the P quantization coefficients may be adjusted to 1, or the minimum non-zero quantization coefficient in the P quantization coefficients may be adjusted to 0, to make the number of quantization coefficients with even value in the P quantization coefficients is odd. For another example, if the quantization coefficient whose parity is hidden of the second quantization coefficient is even, and the number of quantization coefficients with even value in the P quantization coefficients is odd, one of the zero quantization coefficients in the P quantization coefficients may be adjusted to 1, or the minimum non-zero quantization coefficient in the P quantization coefficients may be adjusted to 0, to make the number of quantization coefficients in the P quantization coefficients is even.

In another example, if the target quantization coefficient is a quantization coefficient with odd value in the P quantization coefficients, the parity of the quantization coefficient whose parity is hidden may be determined according to parity of the number of quantization coefficients with odd value in the P quantization coefficients.

For example, if the number of quantization coefficients with odd value in the P quantization coefficients is odd, it is determined that the quantization coefficient whose parity is hidden is odd.

For example, if the number of quantization coefficients with odd value in the P quantization coefficients is even, it is determined that the quantization coefficient whose parity is hidden is even.

It should be noted that, in the example, in response to that the parity of the quantization coefficient whose parity is hidden of the second quantization coefficient is inconsistent with the parity of the number of quantization coefficients with odd value in the P quantization coefficients, the encoding side modifies at least one coefficient in the P quantization coefficients. For example, if the quantization coefficient whose parity is hidden of the second quantization coefficient is odd, and the number of quantization coefficients with odd value in the P quantization coefficients is even, one of the zero quantization coefficients in the P quantization coefficients may be adjusted to 1, or the minimum non-zero quantization coefficient in the P quantization coefficients may be adjusted to 0 or added by 1 or subtracted by 1, to make the number of quantization coefficients with odd value in the P quantization coefficients is odd. For another example, if the quantization coefficient whose parity is hidden of the second quantization coefficient is even, and the number of quantization coefficients with odd value in the P quantization coefficients is odd, one of the zero quantization coefficients in the P quantization coefficients may be adjusted to 1, or the minimum non-zero quantization coefficient in the P quantization coefficients may be adjusted to 0 or added by 1 or subtracted by 1, to make the number of quantization coefficients in the P quantization coefficients is even.

Optionally, the encoding side adjusts at least one coefficient in the P quantization coefficients using an adjustment method with the lowest rate-distortion cost.

It can be seen from the above that, in the embodiments of the present application, the parity of the quantization coefficient whose parity is hidden is determined, according to parity corresponding to other quantization coefficients of the current region.

S403, a target context model corresponding to the first quantization coefficient is determined, and the first quantization coefficient which is encoded based on context is decoded using the target context model, to obtain a decoded first quantization coefficient.

It should be noted that there is no strict order of precedence between the above S403 and S402 in the process of implementation, that is, S403 may be executed before S402, or after S402, or synchronously with S402, which is not limited in the embodiments of the present application.

In the embodiments of the present application, the first quantization coefficient is a quantization coefficient obtained by performing parity hiding on all or a portion of the second quantization coefficient of the current region, and the first quantization coefficient includes a portion whose parity is hidden.

For example, for a decode order of coefficients in AVM, since a size of transform block in AVM is usually a multiple of sixteen, the coefficients are divided into one region for every sixteen coefficients in the decode order starting from first one at a lower right corner. For example, as shown in FIG. 8, for an 8×8 transform block using Zig-Zag scan, the decode order is from 63 to 0. The transform block may be divided into four regions, which are scan indexes 48 to 63, 32 to 47, 16 to 31, and 0 to 15. For example, parity of coefficients at the four positions of indexes 48, 32, 16, and 0 is hidden. The actual decoding starts from a first non-zero coefficient in the decode order, assuming that index 21 is the first non-zero coefficient of the transform block in the decode order, coefficient decoding will skip positions with indexes greater than 21 and default them to zero, and decode a context model flag in the order of 21, 20, . . . , 0. It is assumed that the first quantization coefficient is a coefficient at a position where the index is 21 in FIG. 8, the first quantization coefficient is decoded using the context model corresponding to the first quantization coefficient.

Before decoding the first quantization coefficient, the decoding side first needs to determine a context model corresponding to the first quantization coefficient.

Method 1: since the quantization coefficient whose parity is hidden is usually less than the quantization coefficient whose parity is not hidden in the same case, it is no longer reasonable to use the same set of context models to encode two types of coefficients with different distribution probabilities (i.e., the coefficient whose parity is hidden and the coefficient whose parity is not hidden). Based on this, in the embodiments of the present application, the decoding side uses different context models to decode the quantization coefficient whose parity is hidden and the quantization coefficient whose parity is not hidden. That is, a context model corresponding to the first quantization coefficient is different from context models corresponding to other quantization coefficients whose parity is not hidden.

In the embodiments of the present application, the first quantization coefficient is indicated by one or more flags, for example, flag 1 indicates a portion from 0 to 3, flag 2 indicates a portion from 3 to 6, flag 3 indicates a portion from 6 to 9, flag 4 indicates a portion from 9 to 12, and flag 5 indicates a portion from 12 to 15.

In the embodiments of the present application, a context model may be determined for one or more flags of the flags of the first quantization coefficient, and decoding may be performed using the one or more flags. That is, in the embodiments of the present application, a target context model may be determined for a target quantization coefficient of the first quantization coefficient, and the target quantization coefficient of the first quantization coefficient may be decoded using the target context model.

Optionally, the target quantization coefficient of the first quantization coefficient may be a quantization coefficient indicated by flag 1, or a quantization coefficient indicated by any one of flags 2 to 5. In this way, the decoding side may determine two context models, one context model is used to decode flag 1, and the other context model is used to decode flags 2 to 5.

Method 2: in order to reduce the decoding complexity of the first quantization parameter, in the embodiments of the present application, the context model corresponding to the first quantization coefficient is the same as at least one of context models corresponding to other quantization coefficients whose parity is not hidden. That is, in the embodiments of the present application, the existing context model is reused to decode all or a portion of quantization parameter whose parity is hidden, thereby reducing the decoding complexity of the quantization parameter whose parity is hidden.

As can be seen from the above, the quantization parameter may be divided into at least one portion. For example, the portion from 0 to 3 indicated by flag 1 of the quantization parameter is called BR, and the portion from 4 to 15 indicated by flags 2 to 5 of the quantization parameter is called LB.

In some embodiments, different portions of the quantization parameter correspond to different context models. In this case, the above S403 includes the following steps:

S403-A, obtaining multiple context models corresponding to target quantization coefficients of other quantization coefficients whose parity is not hidden;

S403-B, determining a target context model corresponding to a target quantization coefficient of the first quantization coefficient from the multiple context models corresponding to the target quantization coefficients, where the target quantization coefficients are portions of quantization coefficients of the quantization coefficients; and S403-C, decoding the target quantization coefficient of the first quantization coefficient using the target context model corresponding to the target quantization coefficient, to obtain the first quantization coefficient.

In Method 2, in order to reduce decoding complexity, context models corresponding to other quantization coefficients whose parity is not hidden are reused to decode the first quantization coefficient whose parity is hidden. Therefore, when decoding the target quantization coefficient of the first quantization coefficient, the context models corresponding to the target quantization coefficients of other quantization coefficients whose parity is not hidden is used to decode the target quantization coefficient of the first quantization coefficient.

To improve decoding accuracy of the quantization coefficient, multiple context models are usually created for each portion of the quantization coefficient, for example, R context models are created for the BR and Q context models are created for the LR, where R and Q are both positive integers.

In this way, when decoding the target quantization coefficient of the first quantization coefficient, multiple context models corresponding to the target quantization coefficients of other quantization coefficients whose parity is not hidden are first obtained, and then, from the multiple context models corresponding to the target quantization coefficients, the target context model corresponding to the target quantization coefficient is determined, and the target quantization coefficient of the first quantization coefficient is decoded using the target context model. For example, the target quantization coefficient is the BR, and it is assumed that the BR corresponds to R context models. In this way, the decoding side selects a context model from the R context models as the target context model corresponding to the BR, and uses the target context model corresponding to the BR to decode the BR of the first quantization coefficient. Similarly, in response to that the target quantization coefficient is the LR, it is assumed that the LR corresponds to Q context models. In this way, the decoding side selects a context model from the Q context models as the target context model corresponding to the LR, and uses the target context model corresponding to the LR to decode LR of the first quantization coefficient.

The implementations of determining the target context model corresponding to the target quantization coefficient of the first quantization coefficient from the multiple context models corresponding to the target quantization coefficients in the above S403-B include but are not limited to following implementations.

Implementation 1: any one of the multiple context models corresponding to the target quantization coefficients is determined as the target context model corresponding to the target quantization coefficient of the first quantization coefficient.

Implementation 2: the above S403-B includes following steps S403-B1 and S403-B2:

S403-B1, determining an index of the target context model corresponding to the target quantization coefficient; and S403-B2, determining, according to the index, the target context model corresponding to the target quantization coefficient from the multiple context models corresponding to the target quantization coefficients.

In Implementation 2, each of the multiple context models corresponding to the target quantization coefficients includes an index, so that the decoding side may determine the index of the target context model corresponding to the target quantization coefficient, and then select the target context model corresponding to the target quantization coefficient from the multiple context models corresponding to the target quantization coefficients according to the index.

The specific implementations of determining the index of the context model corresponding to the target quantization coefficient are not limited in the embodiments of the present application.

In the embodiments of the present application, the first quantization coefficient includes a BR, if the first quantization coefficient is greater than 3, the first quantization coefficient further includes an LR. The method of determining an index of the target context model corresponding to the BR and the method of determining an index of the target context model corresponding to the LR are different. The process of determining the index of the target context model corresponding to the BR and the process of determining the index of the target context model corresponding to the LR are described separately below.

Case 1: in response to that the target quantization coefficient is the BR of the first quantization coefficient, the above S403-B1 includes following step:

S403-B11, determining an index of the target context model corresponding to the BR of the first quantization coefficient according to a sum of BRs of decoded quantization coefficients around the first quantization coefficient.

In the embodiments of the present application, the BR of the first quantization coefficient is related to the BRs of the decoded quantization coefficients around the first quantization coefficient. Therefore, in the embodiments of the present application, the index of the target context model corresponding to the BR of the first quantization coefficient is determined according to the sum of the BRs of the decoded quantization coefficients around the first quantization coefficient.

The specific implementations of the above S403-B11 are not limited in the embodiments of the present application.

In an example, the sum of the BRs of the decoded quantization coefficients around the first quantization coefficient is determined as the index of the target context model corresponding to the BR of the first quantization coefficient.

In another example, a calculating process is performed on the sum of the BRs of the decoded quantization coefficients around the first quantization coefficient, to obtain the index of the target context model corresponding to the BR of the first quantization coefficient.

In some embodiments, the above S403-B11 includes the following steps:

S403-B111, adding the sum of the BRs of the decoded quantization coefficients around the first quantization coefficient to a first preset value, to obtain a first sum value;

S403-B112, dividing the first sum value by a first value, to obtain a first ratio; and S403-B113, determining, according to the first ratio, the index of the target context model corresponding to the BR of the first quantization coefficient.

In this embodiment, the method for determining the index of the target context model corresponding to the BR of the first quantization coefficient according to the sum of the BRs of the decoded quantization coefficients around the first quantization coefficient may be to add the sum of the BRs of the decoded quantization coefficients around the first quantization coefficient to the first preset value, to obtain the first sum value, then divide the first sum value by the first value, to obtain the first ratio, and finally determine the index of the target context model corresponding to the BR of the first quantization coefficient according to the first ratio.

In the embodiments of the present application, the decoded quantization coefficients around the first quantization coefficient may be understood as J decoded quantization coefficients located around the first quantization coefficient in the scan order.

In an instance, it is assumed that J is 5, taking Zig-Zag scan, Column scan and Row scan as examples, five decoded quantization coefficients around the first quantization coefficient are shown in FIGS. 9A to 9C, where the first quantization coefficient is the black portion in the figures, and the five decoded quantization coefficients around the first quantization coefficient are the gray portion. That is, in a case of determining the index of the target context model corresponding to the BR, the five decoded quantization coefficients around the first quantization coefficient as shown in FIG. 9A to FIG. 9C are taken as the reference.

The specific values of the first preset value and the first value are not limited in the embodiments of the present application.

Optionally, the first preset value is 1.

Optionally, the first preset value may be 2.

Optionally, the first value is 1.

Optionally, the first value is 2.

The specific method of determining the index of the target context model corresponding to the BR of the first quantization coefficient according to the first ratio in the above S403-B113 is not limited in the embodiments of the present application.

In Example 1, the first ratio is determined as the index of the target context model corresponding to the BR of the first quantization coefficient.

In Example 2, the first ratio is processed to obtain the index of the target context model corresponding to the BR of the first quantization coefficient. The specific manner of processing the first ratio is not limited in the embodiments of the present application.

In a possible implementation of Example 2, the above S403-B113 includes:

S403-B113-1, determining a minimum value between the first ratio and a first preset threshold as a second value; and S403-B113-2, determining, according to the second value, the index of the target context model corresponding to the BR of the first quantization coefficient.

In the possible implementation, the first ratio is compared with the first preset threshold, and the minimum value between the first ratio and the first preset threshold is determined as the second value, and then the index of the target context model corresponding to the BR of the first quantization coefficient is determined according to the second value.

The specific method of determining the index of the target context model corresponding to the BR according to the second value in the above S403-B113-2 is not limited in the embodiments of the present application.

For example, the second value determined above is determined as the index of the target context model corresponding to the BR of the first quantization coefficient.

For another example, an offset index $\text{offset}_{BR}$ of the BR is determined, and a sum of the second value and the offset index of the BR is determined as the index of the target context model corresponding to the BR.

In an instance, the index of the target context model corresponding to the BR of the first quantization coefficient may be determined according to the following formula (5):

$$\text{Index}_{BR} = \text{offset}_{BR} + \min\left(c1, \left(\left(\sum\nolimits_{\ominus} BR\right) + a1\right) >> b1\right) \qquad (5)$$

Here, $\text{Index}_{BR}$ is the index of the target context model corresponding to the BR of the first quantization coefficient, $\text{offset}_{BR}$ is the offset index of the BR, $\Sigma_{\ominus} BR$ is a sum of the BRs of quantization parameters around the first quantization coefficient, a1 is the first preset value, b1 is one half of the first value, and c1 is the first preset threshold.

The specific values of the first preset value, the first value and the first preset threshold are not limited in the embodiments of the present application.

In a possible implementation, it is assumed that the first preset value a1 is 1, the first value is 2, that is, b1=1, and the first preset threshold is 4, the above formula (5) may be specifically expressed as the following formula (6):

$$\text{Index}_{BR} = \text{offset}_{BR} + \min\left(4, \left(\left(\sum_{\Theta} BR\right) + 1\right) >> 1\right) \qquad (6)$$

In another possible implementation, it is assumed that the first preset value a1 is 2, the first value is 4, that is, b1=2, and the first preset threshold is 4, the above formula (5) may be specifically expressed as the following formula (7):

$$\text{Index}_{BR} = \text{offset}_{BR} + \min\left(4, \left(\left(\sum_{\Theta} BR\right) + 2\right) >> 2\right) \qquad (7)$$

In the embodiments of the present application, in a case of reusing an original context model to decode the BR of the first quantization coefficient, it is considered that a size of the quantization coefficient whose parity is hidden and a size of the quantization coefficient whose parity is not hidden are distributed differently overall, for example, the size of the quantization coefficient whose parity is hidden is approximately half of the size of the quantization coefficient whose parity is not hidden. Therefore, in the embodiments of the present application, in a case of reusing an existing context model, the process of determining the index of the context model is adjusted, to select a target context model suitable for the first quantization coefficient whose parity is hidden. Exemplarily, the sum of the BRs of the quantization coefficients around the first quantization coefficient is divided by 4, to obtain the first ratio, and the index of the target context model corresponding to the BR of the first quantization coefficient is determined according to the first ratio.

Furthermore, to achieve integer division, in a case where the sum of the BRs of the quantization coefficients around the first quantization coefficient is adjusted from shifting right by one bit as shown in formula (6) to shifting right by two bits as shown in formula (7), the first preset value a1 is adjusted from 1 in formula (6) to 2 in formula (7) to achieve rounding.

The specific method of determining the offset index offset$_{BR}$ of the BR is not limited in the embodiments of the present application.

In an example, the offset index of the BR is determined according to at least one of a position of the first quantization coefficient of the current block, a size of the current block, a scan order of the current block, or a color component of the current block.

For example, in a case where the first quantization coefficient is a quantization coefficient at an upper left position of the current block, the offset index of the BR is a first threshold.

For another example, in a case where the first quantization coefficient is not a quantization coefficient at an upper left position of the current block, the offset index of the BR is a second threshold.

The specific values of the first threshold and the second threshold are not limited in the embodiments of the present application.

Optionally, in a case where the color component of the current block is a luma component, the first threshold is 0.

Optionally, in a case where the color component of the current block is a chroma component, the first threshold is 10.

Optionally, in a case where the color component of the current block is a luma component, the second threshold is 5.

Optionally, in a case where the color component of the current block is a chroma component, the second threshold is 15.

The specific process of determining the index of the target context model corresponding to the BR of the first quantization coefficient is described above. In some embodiments, if the first quantization coefficient further includes an LR, in the embodiments of the present application, the index of the target context model corresponding to the LR of the first quantization coefficient further need to be determined.

The process of determining the index of the target context model corresponding to the LR of the first quantization coefficient is described below.

Case 2: in response to that the target quantization coefficient is the LR of the first quantization coefficient, the above S403-B1 includes the following step:

S403-B21, determining an index of a target context model corresponding to the LR according to a sum of BRs and LRs of the decoded quantization coefficients around the first quantization coefficient.

In the embodiments of the present application, the LR of the first quantization coefficient is related to the BRs and LRs of the decoded quantization coefficients around the first quantization coefficient. Therefore, in the embodiments of the present application, the index of the target context model corresponding to the LR of the first quantization coefficient is determined according to the sum of the BRs and LRs of the decoded quantization coefficients around the first quantization coefficient.

The specific implementation of the above S403-B21 is not limited in the embodiments of the present application.

In an example, the sum of the BRs and LRs of the decoded quantization coefficients around the first quantization coefficient is determined as the index of the target context model corresponding to the LR of the first quantization coefficient.

In another example, a calculating process is performed on the sum of the BRs and LRs of the decoded quantization coefficients around the first quantization coefficient, to obtain the index of the target context model corresponding to the LR of the first quantization coefficient.

In some embodiments, the above S403-B21 includes the following steps:

S403-B211, adding the sum of the BRs and LRs of the decoded quantization coefficients around the first quantization coefficient to the a second preset value, to obtain a second sum value;

S403-B212, dividing the second sum value by a third value, to obtain a second ratio; and S403-B213, determining, according to the second ratio, the index of the target context model corresponding to the LR.

In this embodiment, the method for determining the index of the target context model corresponding to the LR of the first quantization coefficient according to the sum of the BRs and LRs of the decoded quantization coefficients around the first quantization coefficient may be to add the sum of the BRs and LRs of the decoded quantization coefficients around the first quantization coefficient to the second preset value, to obtain the second sum value, then divide the second sum value by the third value, to obtain the second ratio, and finally determine the index of the target context model corresponding to the LR of the first quantization coefficient according to the second ratio.

In the embodiments of the present application, the decoded quantization coefficients around the first quantization coefficient may be understood as J decoded quantization coefficients located around the first coefficient in the scan order.

In an instance, it is assumed that J is 3, taking Zig-Zag scan, Column scan and Row scan as examples, three decoded quantization coefficients around the first quantization coefficient are shown in FIGS. 10A to 10C, where the first quantization coefficient is the black portion in the figures, and the three decoded quantization coefficients around the first quantization coefficient are the gray portion. That is, in a case of determining the index of the target context model corresponding to the LR, the three decoded quantization coefficients around the first quantization coefficient as shown in FIG. 10A to FIG. 10C as the reference.

The specific values of the second preset value and the third value are not limited in the embodiments of the present application.

Optionally, the second preset value is 1.

Optionally, the second preset value may be 2.

Optionally, the third value is 1.

Optionally, the third value is 2.

The specific method of determining the index of the target context model corresponding to the LR of the first quantization coefficient according to the second ratio in the above S403-B213 is not limited in the embodiments of the present application.

In Example 1, the second ratio is determined as the index of the target context model corresponding to the LR of the first quantization coefficient.

In Example 2, the second ratio is processed to obtain the index of the target context model corresponding to the LR of the first quantization coefficient. The specific manner of processing the second ratio is not limited in the embodiments of the present application.

In a possible implementation of Example 2, the above S403-B213 includes:

S403-B213-1, determining a minimum value between the second ratio and a second preset threshold as a fourth value; and

S403-B213-2, determining, according to the fourth value, the index of the target context model corresponding to the LR.

In the possible implementation, the second ratio is compared with the second preset threshold, and the minimum value between the second ratio and the second preset threshold is determined as the fourth value, and then the index of the target context model corresponding to the LR of the first quantization coefficient is determined according to the fourth value.

The specific method of determining the index of the target context model corresponding to the LR according to the fourth value in the above S403-B213-2 is not limited in the embodiments of the present application.

For example, the fourth value determined above is determined as the index of the target context model corresponding to the LR of the first quantization coefficient.

For another example, an offset index $\text{offset}_{LR}$ of the LR is determined, and a sum of the fourth value and the offset index of the LR is determined as the index of the target context model corresponding to the LR.

In an instance, the index of the target context model corresponding to the LR of the first quantization coefficient may be determined according to the following formula (8):

$$\text{Index}_{LR} = \text{offset}_{LR} + \min\left(c2, \left(\left(\left(\sum_{\Phi}(BR + \sum LR)\right)\right) + a2\right) >> b2\right) \quad (8)$$

Here, $\text{Index}_{LR}$ is the index of the target context model corresponding to the LR of the first quantization coefficient, $\text{offset}_{LR}$ is the offset index of the LR, $\sum_{\varphi}(BR + \sum LR)$ is a sum of the portions less than 16 of quantization parameters around the first quantization coefficient, that is, a sum of the BRs and LRs of the quantization parameters around the first quantization coefficient, a2 is the second preset value, b2 is one half of the third value, and c2 is the second preset threshold.

The specific values of the second preset value, the third value and the second preset threshold are not limited in the embodiments of the present application.

In a possible implementation, it is assumed that the second preset value a2 is 1, the third value is 2, that is, b2=1, and the second preset threshold is 6, the above formula (8) may be specifically expressed as the following formula (9):

$$\text{Index}_{LR} = \text{offset}_{LR} + \min\left(6, \left(\left(\left(\sum_{\Phi}(BR + \sum LR)\right)\right) + 1\right) >> 1\right) \quad (9)$$

In another possible implementation, it is assumed that the second preset value a1 is 2, the third value is 4, that is, b2=2, and the second preset threshold is 6, the above formula (8) may be specifically expressed as the following formula (10):

$$\text{Index}_{LR} = \text{offset}_{LR} + \min\left(6, \left(\left(\left(\sum_{\Phi}(BR + \sum LR)\right)\right) + 2\right) >> 2\right) \quad (10)$$

In the embodiments of the present application, in a case of reusing an original context model to decode the LR of the first quantization coefficient, it is considered that the size of the quantization coefficient whose parity is hidden and the size of the quantization coefficient whose parity is not hidden are distributed differently overall, for example, the size of the quantization coefficient whose parity is hidden is approximately half of the size of the quantization coefficient whose parity is not hidden. Therefore, in the embodiments of the present application, in a case of reusing an existing context model, the process of determining the index of the context model is adjusted to select a target context model suitable for the first quantization coefficient whose parity is hidden. Exemplarily, the sum of less-than-16 portions of the quantization coefficients around the first quantization coefficient is divided by 4, to obtain the second ratio, and the index of the target context model corresponding to the LR of the first quantization coefficient is determined according to the second ratio.

Furthermore, in order to achieve integer division, in a case where the sum of less-than-16 portions of the quantization coefficients around the first quantization coefficient is adjusted from shifting right by one bit as shown in formula (9) to shifting right by two bits as shown in formula (10), the second preset value a21 is adjusted from 1 in formula (9) to 2 in formula (10) to achieve rounding.

The specific method of determining the offset index $\text{offset}_{LR}$ of the LR is not limited in the embodiments of the present application.

In an example, the offset index of the LR is determined according to at least one of a position of the first quantization coefficient of the current block, a size of the current block, a scan order of the current block, or a color component of the current block.

For example, in a case where the first quantization coefficient is a quantization coefficient at an upper left position of the current block, the offset index of the LR is a third threshold.

For another example, in a case where the first quantization coefficient is not a quantization coefficient at an upper left position of the current block, the offset index of the LR is a fourth threshold.

The specific values of the third threshold and the fourth threshold are not limited in the embodiments of the present application.

Optionally, in a case where the color component of the current block is a luma component, the third threshold is 0.

Optionally, in a case where the color component of the current block is a chroma component, the third threshold is 14.

Optionally, in a case where the color component of the current block is a luma component, the fourth threshold is 7.

Optionally, in a case where the color component of the current block is a chroma component, the fourth threshold is 21.

In some embodiments, the calculation of the index of the context model of the first quantization coefficient is shown in Table 4 below.

TABLE 4

| Luma Component | Index of Context Model |
| --- | --- |
| BR in DC coefficient position | $\min\left(4, \left(\left(\sum_\Theta BR\right) + 2\right) \gg 2\right)$ |
| BR in non-DC coefficient position | $5 + \min\left(4, \left(\left(\sum_\Theta BR\right) + 2\right) \gg 2\right)$ |
| LR in DC coefficient position | $\min\left(6, \left(\left(\left(\sum_\Phi \left(BR + \sum LR\right)\right)\right) + 2 \gg 2\right)\right)$ |
| LR in non-DC coefficient position | $7 + \min\left(6, \left(\left(\left(\sum_\Phi \left(BR + \sum LR\right)\right)\right) + 2\right) \gg 2\right)$ |
| Chroma Component | Index of Context Model |
| BR in DC coefficient position | $10 + \min\left(4, \left(\left(\sum_\Theta BR\right) + 2\right) \gg 2\right)$ |
| BR in non-DC coefficient position | $15 + \min\left(4, \left(\left(\sum_\Theta BR\right) + 2\right) \gg 2\right)$ |
| LR in DC coefficient position | $14 + \min\left(6, \left(\left(\left(\sum_\Phi \left(BR + \sum LR\right)\right)\right) + 2\right) \gg 2\right)$ |
| LR in non-DC coefficient position | $21 + \min\left(6, \left(\left(\left(\sum_\Phi \left(BR + \sum LR\right)\right)\right) + 2\right) \gg 2\right)$ |

In Table 4, 0 includes five decoded quantization coefficients around the first quantization coefficient in several scan manners in FIGS. 9A to 9C, and (P includes three decoded quantization coefficients around the first quantization coefficient in several scan manners in FIGS. 10A to 10C.

According to the above steps, after determining the index of the target context model corresponding to the target quantization coefficient of the first quantization coefficient, the target context model corresponding to the target quantization coefficient of the first quantization coefficient is determined from multiple context models corresponding to the target quantization coefficients according to the index. For example, according to the index of the target context model corresponding to the BR of the first quantization coefficient, the target context model corresponding to the BR of the first quantization coefficient is obtained from multiple context models corresponding to the BRs of other quantization coefficients whose parity is not hidden. According to the index of the target context model corresponding to the LR of the first quantization coefficient, the target context model corresponding to the LR of the first quantization coefficient is obtained from multiple context models corresponding to the LRs of other quantization coefficients whose parity is not hidden.

From the above, it can be seen that the above-mentioned multiple context models include context models with different indexes under multiple QP segments (e.g., 4 QP segments) and 2 components (e.g., luma component and chroma component). In this way, in S403-B2 above, determining, according to the index, the target context model corresponding to the target quantization coefficient from the multiple context models corresponding to the target quantization coefficients, including: selecting at least one context model from the multiple context models corresponding to the target quantization coefficients, according to at least one of a quantization parameter, a transform type, a transform block size, a scan type, or a color component corresponding to the first quantization coefficient; and determining a context model corresponding to the index in the at least one context model as the target context model corresponding to the target quantization coefficient.

For example, according to the above steps, it is determined that the index corresponding to the BR (i.e., flag 1) of the first quantization coefficient is index 1, the QP segment corresponding to the first quantization coefficient is QP segment 1, and the first quantization coefficient is a quantization coefficient under the luma component. It is assumed that there are S context models corresponding to flag 1, T context models under QP segment 1 and the luma component are firstly selected from the S context models, a context model corresponding to index 1 in the T context models is determined as the target context model corresponding to the BR of the first quantization coefficient, and then the BR of the first quantization coefficient is decoded using the target context model.

For another example, according to the above steps, it is determined that the index corresponding to the LR (i.e., flags 2 to 5) of the first quantization coefficient is index 2, the QP segment corresponding to the first quantization coefficient is QP segment 1, and the first quantization coefficient is a quantization coefficient under the luma component. It is assumed that there are U context models corresponding to the LR, V context models under QP segment 1 and the luma component are firstly selected from the U context models, a context model corresponding to index 2 in the V context models is determined as the target context model corresponding to flags 2 to 5 of the first quantization coefficient, and then the LR of the first quantization coefficient is decoded using the target context model.

In some embodiments, before determining the target context model from multiple context models, the decoding side needs to initialize the multiple context models, and then determine the target context model from initialized multiple context models.

For example, multiple context models corresponding to the BR are initialized, and then a target context model corresponding to the BR is selected from initialized multiple context models.

For another example, multiple context models corresponding to the LR are initialized, and then a target context model corresponding to the LR is selected from initialized multiple context models.

That is, in the embodiments of the present application, in order to enable the probability values of the context model corresponding to the coefficient whose parity is hidden to converge faster, each model may have a set of corresponding initial values according to a probability of occurrence of each symbol. In AVM, a probability of each context model is calculated as a probability that a symbol is less than a certain value of the context model, according to the number of symbols in the model and the probability of occurrence of each symbol and a cumulative distribution function. The probability value is indicated by a 16 bit integer by normalization.

In the embodiments of the present application, the methods for initializing multiple context models include but are not limited to the following method.

Method 1: the multiple context models are initialized using an equal probability value. For example, in a 4-symbol context model, symbols 0, 1, 2, and 3 all occur with a probability of 0.25. Then a probability of a symbol less than 1 is 0.25, a probability of a symbol less than 2 is 0.5, a probability of a symbol less than 3 is 0.75, and a probability of a symbol less than 4 is 1. The probabilities are rounded by 16 bits, and the probability of the symbol less than 1 is 8192, the probability of the symbol less than 2 is 16384, the probability of the symbol less than 3 is 24576, and the probability of the symbol less than 4 is 32768. These four integer values constitute the initial probability value of the context model.

Method 2: the multiple context models are initialized using a convergence probability value, where the convergence probability value is a convergent probability value corresponding to a context model in a case where the context model is used to encode a test video. Exemplarily, firstly, an initial probability value such as an equal probability is set for these context models. Next, a series of test videos are encoded using quantization coefficients corresponding to certain target bit rates, and the final convergence probability values of these context models are used as initial values of these context models. A new convergence value may be obtained by repeating the above steps, and an appropriate convergence value is selected as the final initial value.

According to the above method, after determining the target context model corresponding to the target quantization coefficient of the first quantization coefficient, the target quantization coefficient is decoded using the target context model, to obtain the first quantization coefficient.

Exemplarily, according to the index of the target context model corresponding to the BR of the first quantization coefficient, the target context model corresponding to the BR of the first quantization coefficient is obtained from obtained multiple context models corresponding to the BRs of other quantization coefficients whose parity is not hidden, and the target context model corresponding to the BR of the first quantization coefficient is used to decode the BR of the first quantization coefficient, to obtain a decoded BR, and then the first quantization coefficient is determined according to the decoded BR.

In some embodiments, if the first quantization coefficient includes only the BR but not the LR, the decoded BR is determined as the first quantization coefficient.

In some embodiments, if the first quantization coefficient further includes the LR, the target context model corresponding to the LR of the first quantization coefficient is obtained from obtained multiple context models corresponding to the LRs of other quantization coefficients whose parity is not hidden, according to the index of the target context model corresponding to the LR of the first quantization coefficient. Next, the decoding side uses the target context model corresponding to the LR to decode the LR of the first quantization coefficient, to obtain a decoded LR, and determines the first quantization coefficient according to the decoded BR and decoded LR.

For example, in response to that the first quantization coefficient does not include a portion greater than 15, a sum of the decoded BR and decoded LR is determined as an absolute value of the first quantization coefficient.

For another example, in response to that the first quantization coefficient further includes a portion greater than 15, the portion greater than 15 of the first quantization coefficient is decoded, and then a sum of the decoded BR, decoded LR and the decoded value of the portion greater than 15 is determined as the absolute value of the first quantization coefficient.

In an example, the process of decoding the first quantization coefficient is the following.

Flag 1 is decoded, here, a is used to indicate a value of flag 1, and a value of a is 0 to 3.

If the decoded flag 1 is 3, flag 2 is decoded, otherwise flag 2 is defaulted to be 0. Here, b is used to indicate a value of the flag 2, and a value of b is 0 to 3.

If the decoded flag 2 is 3, then flag 3 is decoded, otherwise flag 3 is defaulted to be 0. Here, c is used to indicate a value of the flag 3, and a value of c is 0 to 3.

If the decoded flag 3 is 3, then flag 4 is decoded, otherwise flag 4 is defaulted to be 0. Here, d is used to indicate a value of flag 4, and a value of d is 0 to 3.

If the decoded flag 4 is 3, then flag 5 is decoded, otherwise flag 5 is defaulted to be 0. Here, e is used to indicate a value of flag 5, and a value of e is 0 to 3.

If the decoded flag 5 is 3, the remainder portion is decoded.

If flag 1 is not 0 or its parity is odd, a sign of the first quantization coefficient is decoded.

According to the values of flags 1 to 5 and the value of remainder, the absolute value of the first quantization coefficient may be restored according to the following formula (11):

$$Abslevel = (a + b + c + d + e + \text{remainder}) \tag{11}$$

Here, Abslevel is the absolute value of the first quantization coefficient, and remainder is the portion of the absolute value of the first quantization coefficient exceeding 15.

According to the above S403, the first quantization coefficient is determined, according to the above S402, the parity of the quantization coefficient whose parity is hidden of the first quantization coefficient is determined, and then the following step S404 is performed.

S404, the second quantization coefficient is determined according to the parity of the quantization coefficient whose parity is hidden and the decoded first quantization coefficient.

As can be seen from above, in the embodiments of the present application, in order to reduce the encoding cost, the encoding side performs parity hiding on all or a portion of the second quantization coefficient of the current region, to obtain the first quantization coefficient. Since the parity of all or a portion of the second quantization coefficient is hidden, it is indicated by P quantization coefficients of the current region. In this way, in a case of decoding the current region, the decoding side first decodes the bitstream to obtain P the quantization coefficients of the current region, and determines the parity of the quantization coefficient whose parity is hidden of the first quantization coefficient according to the P quantization coefficients. Then, the decoding side determines the target context model corresponding to the first quantization coefficient, and uses the target context model to decode the first quantization coefficient which is encoded based on context, to obtain the first quantization coefficient. Finally, the decoding side may reconstruct the second quantization coefficient with parity according to the decoded first quantization coefficient and the parity of the quantization coefficient whose parity is hidden of the first quantization coefficient, that is, the reconstructed of the coefficient whose parity is hidden will be realized.

In some embodiments, the decoding side reconstructs the second quantization coefficient in different methods according to different parity of the quantization coefficients whose parity is hidden.

Method 1: if the quantization coefficient whose parity is hidden is odd, a first operation mode is used to operate the quantization coefficient whose parity is hidden, to obtain a first operation result, and a second quantization coefficient is obtained according to the first operation result and the first quantization coefficient.

The first operation mode used by the decoding side corresponds to a third operation mode used by the encoding side to determine the first quantization coefficient.

The specific forms of the first operation mode and the third operation mode are not limited in the embodiments of the present application, where the first operation mode may be understood as an inverse operation of the third operation mode.

For example, for a non-zero quantization coefficient, if the third operation mode used by the encoding side is to add one to a value of a portion whose parity is to be hidden of the second quantization coefficient and divide it by two. Correspondingly, the first operation mode used by the decoding side is to multiply the quantization coefficient whose parity is hidden of the first quantization coefficient by two minus one.

Method 2: if the second quantization coefficient is even, a second operation mode is used to operate the quantization coefficient whose parity is hidden, to obtain a first operation result, and a second quantization coefficient is obtained according to the first operation result and the first quantization coefficient.

The second operation mode used by the decoding side corresponds to a fourth operation mode used by the encoding side to determine the first quantization coefficient.

The specific forms of the second operation mode and the fourth operation mode are not limited in the embodiments of the present application, where the second operation mode may be understood as an inverse operation of the fourth operation mode.

In a possible implementation manner, the fourth operation mode used by the encoding side is to divide the value of the portion whose parity is to be hidden of the second quantization coefficient by two. Correspondingly, the second operation mode used by the decoding side is to multiply the quantization coefficient whose parity is hidden of the first quantization coefficient by two.

In some embodiments, the decoding side may determine the second quantization coefficient in the following method, that is, the above S404 includes the following steps:

S404-A1, performing an operation on the quantization coefficients whose parity is hidden using a preset operation mode, to obtain a first operation result;

S404-A2, processing the first operation result according to the parity, to obtain a second operation result; and S404-A3, obtaining the second quantization coefficient according to the second operation result and the first quantization coefficient.

For example, the encoding side performs parity hiding on a portion of the second quantization coefficient exceeding 10, to obtain the first quantization coefficient 25, where the portion of 10 of the first quantization coefficient is not parity hidden, and the remaining portion of 15 is the quantization coefficient whose parity is hidden. It is assumed that, according to the above method, the quantization coefficient whose parity is hidden is determined to be odd, in this way, the decoding side first performs an operation on the portion of 15 whose parity is hidden using the preset operation mode, to obtain the first operation result. Then, according to parity of the portion of 15 whose parity is hidden, the first operation result is processed, for example, a value is added to or subtracted from the first operation result, specifically corresponding to the parity hiding method at the encoding side, to obtain the second operation result. Finally, the final second quantization coefficient is obtained, according to the second operation result and the first quantization coefficient.

The specific form of the preset operation mode is not limited in the embodiments of the present application.

In some embodiments, the preset operation mode includes multiplying the quantization coefficient whose parity is hidden by two, that is, multiplying the value of the quantization coefficient whose parity is hidden of the first quantization coefficient by two, to obtain the first operation result.

Next, the second operation result is obtained according to the parity of the quantization coefficient whose parity is hidden and the first operation result. For example, a sum of the first operation result and a parity value is determined as the value of the second operation result, where if the quantization coefficient whose parity is hidden is odd, the parity value is 1, and if the quantization coefficient whose parity is hidden is even, the parity value is 0.

Finally, the second quantization coefficient is obtained according to the second operation result and the first quantization coefficient.

In some embodiments, if the encoding side performs parity hiding on all of the second quantization coefficient, to obtain the first quantization coefficient, that is, the quantization coefficient whose parity is hidden are all of the first quantization coefficient, in this case, the second operation result is determined as the second quantization coefficient.

In some embodiments, if the encoding side performs parity hiding on a portion of the second quantization coefficient, to obtain the first quantization coefficient, that is, the first quantization coefficient further includes the portion whose parity is not hidden, in this case, a sum of the portion whose parity is not hidden and the second operation result is determined as the second quantization coefficient.

Exemplarily, the decoding side may determine the second quantization coefficient according to the following formula (12):

$$C = \begin{cases} qIdx, & qIdx < n \\ (qIdx - n) \times 2 + \text{parity} + n, & qIdx \geq n \end{cases} \quad (12)$$

Here, C is the second quantization coefficient, qIdx is the first quantization coefficient, parity is the parity value of the quantization coefficient whose parity is hidden, in response to that the quantization coefficient whose parity is hidden is odd, the parity=1, in response to that the quantization coefficient whose parity is hidden is even, the parity=0. (qIdx−n) is the quantization coefficient whose parity is hidden of the first quantization coefficient, (qIdx−n)×2 is the first operation result, and (qIdx−n)×2+parity+n is the second operation result.

It can be seen from the above formula (12) that, the encoding side performs parity hiding on a portion of the second quantization coefficient that is greater than n, and does not perform parity hiding on a portion that is less than n. In this case, after the decoding side decodes the first quantization coefficient qIdx, if the first quantization coefficient qIdx is less than n, it means that the first quantization coefficient does not include the quantization coefficient whose parity is hidden, and the first quantization coefficient qIdx is determined as the second quantization coefficient C.

If the first quantization coefficient is greater than n, it means that the first quantization coefficient includes the quantization coefficient whose parity is hidden. The quantization coefficient (qIdx−n) whose parity is hidden of the first quantization coefficient is processed, to obtain the second operation result (qIdx−n)×2+parity. Then, a sum of the second operation result and the portion n of the first quantization coefficient whose parity is not hidden is determined as the second quantization coefficient.

The decoding side, according to the above method, may determine the quantization coefficient of the current block consisting of second quantization coefficients corresponding to first quantization coefficients of other regions of the current block, a second quantization coefficient of each region of the current block, and other quantization coefficients whose parity is not hidden. Next, a reconstructed value of the current block is determined according to the quantization coefficient of the current block.

In some embodiments, if the step of transform is skipped, the encoding side directly quantizes a residual value of the current block. Correspondingly, the decoding side performs inverse quantization on the quantization coefficient of the current block, to obtain the residual value of the current block. In addition, a prediction value of the current block is determined through an intra prediction method and/or an inter prediction method, and the prediction value of the current block is added to the residual value, to obtain the reconstructed value of the current block.

In some embodiments, if the step of transform is not skipped, that is, the encoding side transforms a residual value of the current block, to obtain a transform coefficient, and quantizes the transform coefficient. Correspondingly, the decoding side performs inverse quantization on the quantization coefficient of the current block to obtain the transform coefficient of the current block, and performs inverse transformation on the transform coefficient to obtain the residual value of the current block. In addition, a prediction value of the current block is determined through an intra prediction method and/or an inter prediction method, and the prediction value of the current block is added to the residual value, to obtain the reconstructed value of the current block.

In the video decoding method provided by the embodiments of the present application, the decoder decodes the bitstream to obtain the P quantization coefficients of the current region, where the current region is the region of the current block that includes at least one non-zero quantization coefficient, and P is a positive integer; according to the P quantization coefficients, the parity of the quantization coefficient whose parity is hidden of the first quantization coefficient is determined, where the first quantization coefficient is the quantization coefficient obtained by performing parity hiding on all or a portion of the second quantization coefficient of the current region; the target context model corresponding to the first quantization coefficient is determined, and the first quantization coefficient which is encoded based on context is decoded using the target context model, to obtain the decoded first quantization coefficient; and according to the parity of the quantization coefficient whose parity is hidden of the first quantization coefficient and the first quantization coefficient, the second quantization coefficient with parity is determined. In the embodiments of the present application, by means of the P quantization coefficients of the current region, parity hiding is performed on all or a portion of the second quantization coefficient of the current region, to obtain the first quantization coefficient, and the first quantization coefficient is encoded, the number of bits required for encoding may be reduced, and the cost of video compression may be reduced. In addition, in the embodiments of the present application, the target context model is re-determined for decoding the first quantization coefficient, so as to realize accurate decoding of the first quantization coefficient whose parity is hidden.

On the basis of the embodiments shown in FIG. 6 above, the video decoding method provided by the embodiments of the present application is further described below in conjunction with FIG. 11.

Figure 11:
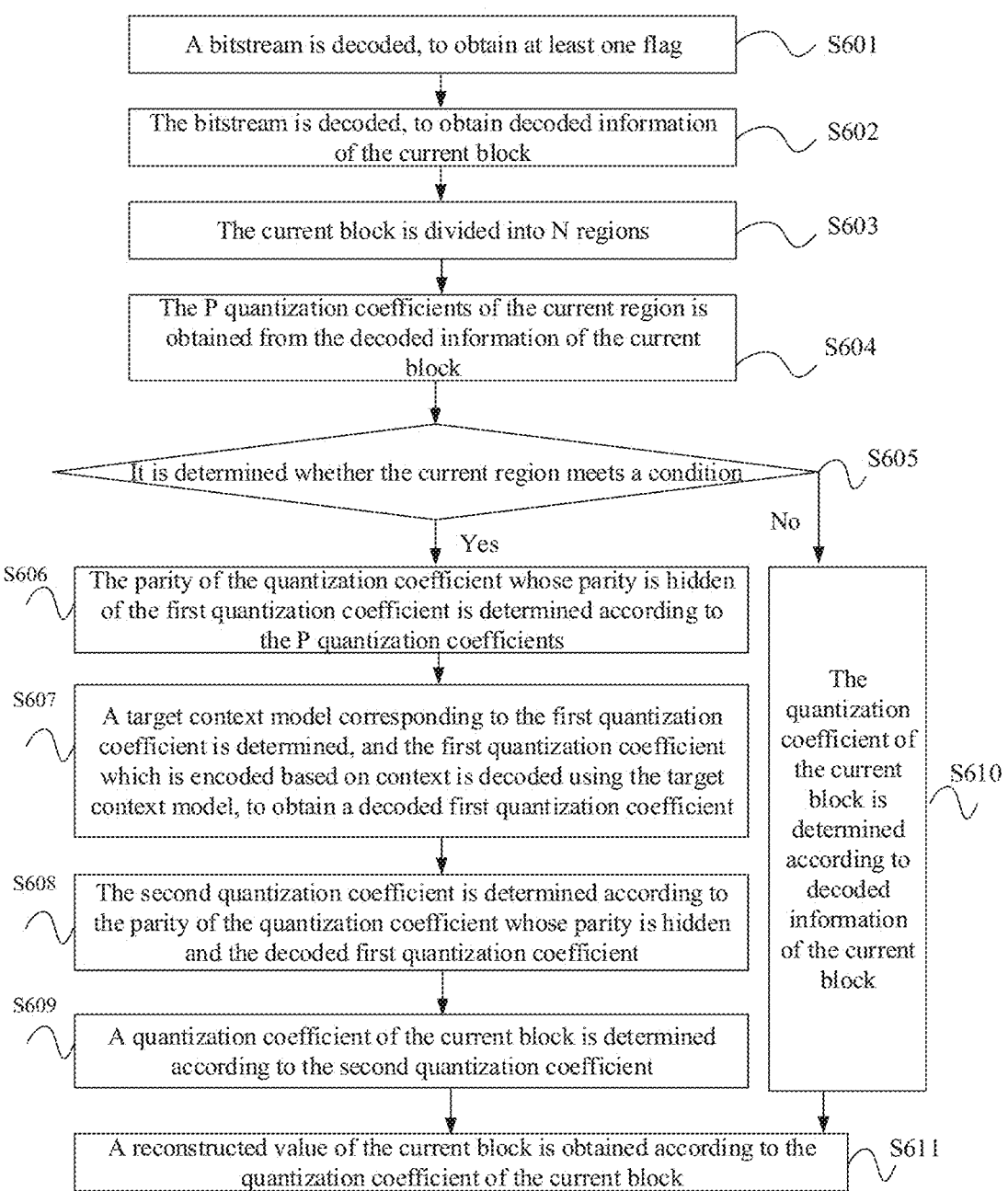
FIG. 11 is a schematic flowchart of a video decoding method provided by an embodiment of the present application.

FIG. 11 is a schematic flowchart of a video decoding method provided by an embodiment of the present application. As shown in FIG. 11, the method of the embodiments of the present application includes following steps:

S601, a bitstream is decoded, to obtain at least one flag.

The at least one flag is used to indicate whether parity of a quantization coefficient is allowed to be hidden.

Optionally, the at least one flag includes at least one of a sequence level flag, a picture level flag, a slice level flag, a unit level flag, or a block level flag.

Exemplarily, the decoding side first decodes the bitstream to obtain the at least one flag, and determines whether the parity of the quantization coefficient of the current block is allowed to be hidden according to the at least one flag.

In response to that it is determined that the parity of the quantization coefficient of the current block is not allowed to be hidden according to the at least one flag, the following steps S602 and S609 are performed, that is, the bitstream is decoded to obtain decoded information of the current block, which includes the quantization coefficient of the current block. In this case, since parity hiding is performed on the quantization coefficient of the current block, the subsequent inverse quantization process is performed.

In response to that it is determined that the parity of the quantization coefficient of the current block is allowed to be hidden according to the at least one flag, the following steps S602 to S608 are performed.

S602, the bitstream is decoded, to obtain decoded information of the current block.

The decoded information of the current block includes quantization coefficients of the current block.

Exemplarily, the decoding side first decodes flags 1 to 5, and then decodes the portion of an absolute value of each quantization coefficient exceeding 15 in a scan order from a last non-zero coefficient to an upper left corner of the transform block, and finally obtains the quantization coefficients of the current block.

S603, the current block is divided into N regions.

The region division method of the current block is not limited in the embodiments of the present application. For example, the current block is divided into the N regions according to the decoding scan order, or the current block is divided into the N regions according to spatial positions of samples of the current block.

The sizes of the N regions may be the same or different, which is not limited in the embodiments of the present application.

The specific implementation process of the above S603 may refer to the relevant description of the above S401-A2, which will not be repeated here.

S604, the P quantization coefficients of the current region is obtained from the decoded information of the current block.

Here, the current region is a region to be decoded in the N regions of the current block.

The decoded information of the current block includes the quantization coefficients of the current block, so the P quantization coefficients included in the current region may be obtained from the decoded information of the current block.

In some embodiments, the P quantization coefficients are all quantization coefficients of the current region.

In some embodiments, the P quantization coefficients are portions of the quantization coefficients of the current region.

The specific implementation process of the above S604 may refer to the relevant description of the above S401-A3, which will not be repeated here.

S605, whether the current region meets a condition is determined.

The condition includes at least one of a preset condition and a condition of enabling parity hiding technology described blow.

In the embodiments of the present application, the parity hiding technology proposed in the present application is limited. Exemplarily, in a case where the current region meets a set condition, it means that the current region may achieve significant beneficial effects by using the parity hiding technology provided by the embodiments of the present application. In this case, the following steps S606 to S609 are performed. In a case where the current region does not meet the set condition, it means that the current region cannot achieve significant beneficial effects by using the parity hiding technology provided by the embodiments of the present application. In this case, the following step S610 is performed.

The condition of enabling parity hiding technology is introduced in below.

In some embodiments, different conditions of enabling parity hiding technology may be preset according to the difference of at least one of a quantization parameter, a transform type, a transform block size, a scan type, and a color component.

For example, in response to that the quantization coefficient is greater than or equal to a certain preset value, the parity hiding technology is enabled, or in response to that the quantization coefficient is less than the certain preset value, the parity hiding technology is not enabled.

For another example, in response to that the transform type is a preset transform type, the parity hiding technology is enabled; or in response to that the transform type is not the preset transform type, the parity hiding technology is not enabled. For instance, in response to that the transform type of the current block is a first transform type, it is determined that the parity of the first quantization coefficient is not allowed to be hidden, where the first transform type is used to indicate that at least one direction of the current block is skipped transform, as detailed in Table 2 above.

For yet another example, in response to that the transform block size is greater than or equal to a preset size, the parity hiding technology is enabled, or in response to that the transform block size is less than the preset size, the parity hiding technology is not enabled.

For still another example, in response to that the color component of the current block is a first component, it is determined that the parity of the first quantization coefficient is not allowed to be hidden, that is, the parity hiding technology is not enabled; or in response to that the color component of the current block is not the first component, it is determined that the parity of the first quantization coefficient is allowed to be hidden, that is, the parity hiding technology is enabled. The first component is not limited in the embodiments of the present application. In a possible implementation, the first component is a chroma component, that is, the parity hiding technology is enabled under the luma component, and the parity hiding technology is not enabled under the chroma component.

For yet still another example, in response to that the transform block is applicable to a preset scan type, the parity hiding technology is enabled; or in response to that the transform block is not applicable to the preset scan type, the parity hiding technology is not enabled. The preset scan type is not limited in the present application, for example, the preset scan type is ZigZag scan or diagonal scan.

It should be noted that, the above examples are only exemplary descriptions, and the above examples may be combined with each other as the condition of enabling parity hiding technology.

The preset condition is introduced in below.

The specific contents of the preset condition are not limited in the embodiments of the present application, which may be set according to actual requirements.

In a possible implementation, the preset condition includes at least one of the following conditions:

Condition 1, the number of non-zero quantization coefficients of the current region being greater than a first preset numerical value;

Condition 2, in the current region, a distance between a first non-zero quantization coefficient and a last non-zero quantization coefficient in a decoding scan order being greater than a second preset numerical value;

Condition 3: in the current region, a distance between a first non-zero quantization coefficient and a last quantization coefficient in a decoding scan order being greater than a third preset numerical value;

Condition 4: in the current region, a sum of absolute values of non-zero quantization coefficients being greater than a fourth preset numerical value;

Condition 5: a color component of the current block being a second component, optionally, the second component is a luma component; or Condition 6: a transform type of the current block being not a first transform type, where the first transform type is used to indicate that at least one direction of the current block is skipped transform.

In some embodiments, the above six conditions may also be combined with each other to form new constraint conditions.

The specific values of the first preset value to the fourth preset value are not limited in the embodiments of the present application, as long as the first preset value to the fourth preset value are all positive integers.

In an example, at least one of the first preset value, the second preset value, the third preset value, or the fourth preset value is a fixed value.

In another example, at least one of the first preset value, the second preset value, the third preset value, or the fourth preset value is a non-fixed value, i.e., a value determined by the encoding side according to current encoding information.

In some embodiments, if at least one of the first preset value, the second preset value, the third preset value, or the fourth preset value is a non-fixed value, the encoding side writes the non-fixed value into the bitstream.

In some embodiments, the decoding side may first determine whether the first quantization coefficient allows the parity of the quantization coefficient to be hidden according to at least one of the quantization parameter, transform type, transform block size, or color component corresponding to the first quantization coefficient, and in a case where the first quantization coefficient allows the parity of the quantization coefficient to be hidden, the decoding side determines whether the current region meets the preset condition.

In some embodiments, in a case of determining that the current region meets the preset condition, the decoding side may determine whether the first quantization coefficient meets the condition of enabling parity hiding technology.

That is, the preset condition and the condition of enabling parity hiding technology may be used separately or in combination with each other.

S606, the parity of the quantization coefficient whose parity is hidden of the first quantization coefficient is determined according to the P quantization coefficients.

For example, the parity of the quantization coefficient whose parity is hidden is determined according to parity corresponding to the P quantization coefficients.

For example, the parity of the quantization coefficient whose parity is hidden is determined according to parity of a sum of first absolute values of the P quantization coefficients.

For example, the parity of the quantization coefficient whose parity is hidden is determined according to parity of the number of target quantization coefficients of the P quantization coefficients.

A target quantization coefficient is any one of a non-zero quantization coefficient, a non-zero quantization coefficient with even value, a quantization coefficient with even value, and a quantization coefficient with odd value in the P quantization coefficients.

The specific implementation process of the above S606 may refer to the relevant description of the above S402, which will not be repeated here.

S607, a target context model corresponding to the first quantization coefficient is determined, and the first quantization coefficient which is encoded based on context is decoded using the target context model, to obtain a decoded first quantization coefficient.

Optionally, the target context model corresponding to the first quantization coefficient is the same as at least one of the context models corresponding to other quantization coefficients whose parity is not hidden.

The implementation process of the above S607 refers to the specific description of the above S403, which will not be repeated here.

S608, the second quantization coefficient is determined according to the parity of the quantization coefficient whose parity is hidden and the decoded first quantization coefficient.

The implementation process of the above S608 refers to the specific description of the above S404, which will not be repeated here.

S609, a quantization coefficient of the current block is determined according to the second quantization coefficient.

According to the above method, the quantization coefficient whose parity is hidden of each region of the current block is determined, and the quantization coefficient of the current block is obtained by combining other quantization coefficients whose parity is not hidden of the decoded current block.

S610, the quantization coefficient of the current block is determined according to decoded information of the current block.

If the current region does not include the quantization coefficient whose parity is hidden, the quantization coefficient decoded from the bitstream is used as the final quantization coefficient of the current block.

S611, a reconstructed value of the current block is obtained according to the quantization coefficient of the current block.

According to the above method, the quantization coefficient of the current block is determined, and the reconstructed value of the current block is determined in the following two methods.

Method 1: if the step of transform is skipped, the encoding side directly quantizes a residual value of the current block. Correspondingly, the decoding side performs inverse quantization on the quantization coefficient of the current block, to obtain the residual value of the current block. In addition, a prediction value of the current block is determined through an intra prediction method and/or an inter prediction method, and the prediction value of the current block is added to the residual value, to obtain the reconstructed value of the current block.

Method 2: if the step of transform is not skipped, that is, the encoding side transforms a residual value of the current block, to obtain a transform coefficient, and quantizes the transform coefficient. Correspondingly, the decoding side performs inverse quantization on the quantization coefficient of the current block to obtain the transform coefficient of the current block, and performs inverse transformation on the transform coefficient to obtain the residual value of the current block. In addition, a prediction value of the current block is determined through an intra prediction method and/or an inter prediction method, and the prediction value of the current block is added to the residual value, to obtain the reconstructed value of the current block.

In the embodiments of the present application, a condition is set for the parity hiding technology. In a case where the current region meets the condition, it is determined that parity of at least one quantization coefficient of the current region is hidden, and then the parity hiding technology proposed in the present application is used to decode the first quantization coefficient of the current region to improve decoding accuracy.

Exemplarily, the detailed decoding process of the embodiments of the present application is shown in Table 5 and Table 6 below.

59

TABLE 5

| sequence_header_obu( ) { | Type | Annotation |
|---|---|---|
| ... | ... | Encode some other sequence header flags |
|   enable_parityhiding | f(1) | Use a fixed-length code to identify whether parity hiding is enabled in the sequence |
| } | | |

Table 5 above shows that a flag is added to a sequence header to control whether to enable the parity hiding technology for the current sequence.

enable_parityhiding being equal to 1 indicates that the parity hiding technology is enabled, and enable_parityhiding being equal to 0 indicates that the parity hiding technology is disabled. If this syntax element does not occur, its default value is zero.

TABLE 6

| | Type |
|---|---|
| ... | |
| Sets = ( eob − 1 ) / SBBSIZE + 1 | |
| posBuf[ Sets ] = { −1 } | |
|   for ( setIdx = Sets; setIdx > 0; setIdx−− ) { | |
|   set_start = min(eob, setIdx * SBBSIZE) − 1 | |
|       set_end = (setIdx − 1) * SBBSIZE | |
|       sumAbs1 = 0 | |
|       num_nz = 0 | |
|       for( scanIdx = set_start; scanIdx > set_end; scanIdx−−){ | |
|         pos = scan[ scanIdx ] | |
|         if ( scanIdx == ( eob − 1 ) ) { | |
|         coeff_base_eob | S( ) |
|         level = coeff_base_eob + 1 | |
|       } else { | |
|         coeff_base | S( ) |
|         level = coeff_base | |
|       } | |
|       if ( level > NUM_BASE_LEVELS ) { | |
|         for ( idx = 0; idx < COEFF_BASE_RANGE | |
|           / ( BR_CDF_SIZE − 1); idx++ ) { | |
|         coeff_br | S( ) |
|          level += coeff_br | |
|          if ( coeff_br < ( BR_CDF_SIZE − 1 ) ) | |
|         Break | |
|         } | |
|       } | |
|       Quant[ pos ] = level | |
|       if(level){ | |
|         num_nz++ | |
|         sumAbs1 += level | |
|       } | |
|     } // scanIdx | |
|   isHidePar = (enable_ph | |
|     && num_nz > PHTHRESH | |
|     && plane_type == PLANE_TYPE_Y) | |
|   pos = scan[ scanIdx ] | |
|     if(isHidePar){ | |
|     posBuf[setIdx − 1] = scanIdx | |
|     coeff_base | S( ) |
|     level = coeff_base | |
|     if ( level > NUM_BASE_LEVELS ) { | |
|       for ( idx = 0; idx < COEFF_BASE_RANGE | |
|         / ( BR_CDF_SIZE − 1); idx++ ) { | |
|     coeff_br | S( ) |
|         level += coeff_br | |
|     if ( coeff_br_ph < ( BR_CDF_SIZE − 1 ) ) | |
|       break | |
|       } | |
|     } | |
|   } // isHidePar | |
|   else{ | |
|     coeff_base | S( ) |
|     level = coeff_base | |
|     if ( level > NUM_BASE_LEVELS ) { | |

60

TABLE 6-continued

| | Type |
|---|---|
|   for ( idx = 0; idx < COEFF_BASE_RANGE | |
|     / ( BR_CDF_SIZE − 1); idx++ ) { | |
|     coeff_br | S( ) |
|   level += coeff_br | |
|   if ( coeff_br < ( BR_CDF_SIZE − 1 ) ) | |
|     break | |
|     } | |
|   } | |
| } // else, isHidePar | |
| Quant[ pos ] = (level << isHidePar) | |
| if(isHidePar) | |
|   Quant[ pos ] += (sumAbs1 & 1) | |
| } // setIdx | |
|     for ( c = 0; c < eob; c++ ) { | |
|     pos = scan[ c ] | |
|     if ( Quant[ pos ] != 0 ) { | |
|       if ( c == 0 ) { | |
|     dc_sign | S( ) |
|       sign = dc_sign | |
|     } else { | |
|       sign_bit | L(1) |
|       sign = sign_bit | |
|     } | |
|     } else { | |
|   sign = 0 | |
|     } | |
|     if | |
| ( Quant[ pos ] >= (NUM_BASE_LEVELS + | |
|   COEFF_BASE_RANGE + 1) | |
|   << (c == posBuf[c / SBBSIZE])) { | |
|     length = 0 | |
|     do { | |
|   length++ | |
|     golomb_length_bit | L(1) |
|     } while ( !golomb_length_bit ) | |
|     x = 1 | |
|     for ( i = length − 2; i >= 0; i−− ) { | |
|     golomb_data_bit | L(1) |
|   x = ( x << 1 ) | golomb_data_bit | |
|     } | |
|   Quant[ pos ] += x << (c == posBuf[c / SBBSIZE) | |
|   } | |
|     if ( pos == 0 && Quant[ pos ] > 0 ) { | |
|     dcCategory = sign ? 1 : 2 | |
|     } | |
|   Quant[ pos ] = Quant[ pos ] & 0xFFFFF | |
|     culLevel += Quant[ pos ] | |
|   if ( sign ) | |
|     Quant[ pos ] = − Quant[ pos ] | |
|     } // c | |

Table 6 above is the process of coefficient decoding. A value of the variable enable_ph is determined according to a value of enable_parityhiding in the sequence header, and at least one of a quantization parameter (QP) size currently used, a current transform block size, a color component of the current transform block, a scan type of the current transform block, or a transform type of the current transform block. Then, the decoding side determines whether to use the parity hiding technology according to the value of the variable enable_ph. plane_type==PLANE_TYPE_Y indicates that the current component is a luma component. SBBSIZE indicates that the number of positions contained in each region, and PHTRESH is a threshold for whether to enable the parity hiding technology in the current region. For example, SBBSIZE and PHTHRESH are 16 and 3 respectively.

In some embodiments, in the embodiments of the present application, if the parity hiding technology includes that: enable_parityhiding is equal to 1, the number of non-zero quantization coefficients included in the current region is greater than the threshold, the current component is a luma component, and the transform type of the current block is a 2D type and is not IDTX in the 2D type, as shown in Table 2, IDTX indicates that the transform operation is skipped in both the horizontal and vertical directions. In this case, as shown in Table 7, an acquisition condition of a value of the variable isHidePar in the syntax table shown in Table 6 above becomes as shown in Table 7.

TABLE 7

```
isHidePar = (enable_ph
    && num_nz > PHTHRESH
    && plane_type == PLANE_TYPE_Y
    && tx_class == TX_CLASS_2D
    && tx_type != IDTX)
```

Here, tx_class==TX_CLASS_2D indicates that the current transform type is 2D transform (as shown in Table 2).

tx_type !=IDTX indicates that the current transform type is not identity transform, where identity transform may be understood as skip transform.

In some embodiments, in the embodiments of the present application, if the parity hiding technology includes that: enable_parityhiding is equal to 1, the number of non-zero quantization coefficients included in the current region is greater than the threshold, and the transform type of the current block is 2D type and is not IDTX in the 2D type. In this case, as shown in Table 8, an acquisition condition of a value of the variable isHidePar in the syntax table shown in Table 6 above becomes as shown in Table 8.

TABLE 8

```
isHidePar = (enable_ph
    && num_nz > PHTHRESH
    && tx_class == TX_CLASS_2D
    && tx_type != IDTX)
```

The specific acquisition condition for determining the value of the variable isHidePar is not limited in the embodiments of the present application, which is determined according to actual requirements.

The acquisition condition of the value of the variable isHidePar may be understood as the preset condition described in S605 above.

It should be noted that, the Table 6 above is an example, which shows the process of determining the 16th quantization coefficient (i.e., the first quantization coefficient) of the current region according to the first 15 quantization coefficients (i.e., the P quantization coefficients) of the current region.

The decoding process shown in Table 6 above mainly includes steps shown in Table 9.

TABLE 9

Loop 1
Decoding flags 1 to 5 of the first 15 coefficients of each region
    Determining whether parity of the 16th coefficient is hidden according to the number of non-zero coefficients in the first 15 coefficients
    Decoding the 16th coefficient
Loop 2
    Decoding the sign of the non-zero coefficients and the portion greater than 15 (if it is a coefficient whose parity is hidden, decoding the portion greater than 30)

In the embodiments of the present application, in a case of decoding the current region, the decoding side first determines whether the current region meets the condition, to determine whether significant beneficial technical effects may be brought in a case where the parity hiding technology provided by the present application is used to decode the current region. In a case where it is determined that the use of the parity hiding technology has significant beneficial effects, the technical solution of the present application is used to decode the current region to improve decoding reliability.

The video decoding method involved in the embodiments of the present application is described above. On this basis, for the encoding side, the video encoding method involved in the present application will be described below.

FIG. 12 is a schematic flowchart of a video encoding method provided by the embodiments of the present application. The execution entity of the embodiments of the present application may be the encoder shown in FIG. 1 and FIG. 2 above.

As shown in FIG. 12, the method of the embodiments of the present application includes following steps.

S701, a current block is divided into N regions, where N is a positive integer.

In the embodiments of the present application, the current block is divided into one or more regions, for example, into N regions, where N is a positive integer. To reduce encoding cost, parity hiding is performed on one or more quantization coefficients of the same region, according to parity related to quantization coefficients of the same region, for example, according to parity of a sum of absolute values of the quantization coefficients of the region, to reduce quantization coefficients whose parity is hidden. For example, a value of a second quantization coefficient is a1, and parity hiding is performed on all or a portion of the second quantization coefficient, to obtain a first quantization coefficient a2, where a2 is less than a1, such that, encoding a2 uses fewer bits than encoding a1, thereby reducing the encoding cost.

The region division method of the current block is not limited in the embodiments of the present application.

Optionally, at least two regions in the N regions include the same number of quantization coefficients.

Optionally, at least two regions in the N regions include different numbers of quantization coefficients.

In some embodiments, the specific methods of dividing the current block into N regions in the S701 include but are not limited to the following method.

Method 1: the current block is divided into N regions according to a scan order.

In an example, according to the scan direction, every M non-zero quantization coefficients of the current block are divided into one region, to obtain N regions. Each of the N regions includes M non-zero quantization coefficients. At least one of the N regions includes one or more second quantization coefficients whose parity can be hidden. In this example, if the number of the non-zero quantization coefficients included in the last region is not M, the last region is divided into a separate region, or the last region is merged with the previous region into one region.

In another example, according to the scan direction, every K samples of the current block are divided into one region, to obtain N regions. For example, for a transform block with 8×8 size using the reverse ZigZag scan order, in a case where each region is of equal size, that is, each region contains 16 coefficients, as shown in FIG. 7, the current block is divided into 4 regions. In this example, if the quantization coefficient included in the last region is not K, the last region is divided into a separate region, or the last region is merged with the previous region into one region.

In Method 2, the current block is divided into N regions according to spatial positions.

In an example, the N regions are subblocks of the current block. For example, the current block is evenly divided into N subblocks. Exemplarily, the size of each subblock is 4×4.

In another example, according to the spatial position relationship of the samples of the current block, a plurality of samples adjacent to each other in the spatial positions are divided into one subblock, and each subblock includes at least one non-zero quantization coefficient.

In the embodiments of the present application, the method of dividing the current block into N regions may include other methods in addition to the above examples, which are not limited in the embodiments of the present application.

In some embodiments, a flag may be used to indicate whether the current block is allowed to use the technology for hiding parity of the quantization coefficient provided by the embodiments of the present application. In some embodiments, the technology for hiding the parity of quantization coefficient provided by the embodiments of the present application is also called a parity hiding technology.

Exemplarily, the at least one flag that is set may be flags with different levels, which are used to indicate whether the parity of the quantization coefficient are allowed to be hidden on the corresponding level.

Optionally, the at least one flag includes at least one of a sequence level flag, a picture level flag, a slice level flag, a unit level flag, or a block level flag.

For example, the at least one flag includes the sequence level flag, and the sequence level flag is used to indicate whether a current sequence allows the parity of the quantization coefficient to be hidden.

Optionally, in response to that the at least one flag includes the sequence level flag, the sequence level flag may be located in a sequence header.

For another example, the at least one flag includes the picture level flag, and the picture level flag is used to indicate whether a current picture allows the parity of the quantization coefficient to be hidden.

Optionally, in response to that the at least one flag includes the picture level flag, the picture level flag may be located in a picture header.

For another example, the at least one flag includes the slice level flag, and the slice level flag is used to indicate whether a current slice allows the parity of the quantization coefficient to be hidden.

Optionally, in response to that the at least one flag includes the slice level flag, the slice level flag may be located in a slice header.

For another example, the at least one flag includes the unit level flag, and the unit level flag is used to indicate whether a current CTU allows the parity of the quantization coefficient to be hidden.

For another example, the at least one flag includes the block level flag, and the block level flag is used to indicate whether a current block allows the parity of the quantization coefficient to be hidden.

In this way, the encoding side first obtains the at least one flag, and determines whether the current block allows the parity of the quantization coefficient to be hidden according to the at least one flag. In response to that it is determined that the current block does not allow the parity of the quantization coefficient to be hidden according to the at least one flag, the method of the embodiments of the present application is skipped. In response to that it is determined that the current block is allowed to use the parity hiding technology provided by the embodiments of the present application according to the at least one flag, the method of the embodiments of the present application is performed.

In some embodiments, the quantization coefficient parity hiding technology provided by the embodiments of the present application is mutually exclusive with a target transform mode, where the target transform mode includes secondary transform or multiple transform, etc., In this case, in a case where the encoding side determines that the current block is transformed using the target transform method, the technical solution provided by the embodiments of the present application is skipped.

S702, a second quantization coefficient of a current region is determined, and parity hiding is performed on all or a portion of the second quantization coefficient, to obtain a first quantization coefficient.

Here, the current region is a region that includes at least one non-zero quantization coefficient in the N regions.

In the embodiments of the present application, in order to reduce the encoding cost, parity hiding is performed on all or a portion of the second quantization coefficient to obtain the first quantization coefficient, and the first quantization coefficient is encoded into a bitstream instead of encoding the second quantization coefficient into the bitstream. Since the first quantization coefficient is usually less than the second quantization coefficient, the number of bits required for encoding the first quantization coefficient is reduced compared to encoding the second quantization coefficient, thereby reducing the encoding cost.

The method of performing parity hiding on all or a portion of the second quantization coefficient, to obtain the first quantization coefficient is not limited in the embodiments of the present application.

In some embodiments, different methods may be selected to determine the first quantization coefficient according to the parity of the second quantization coefficient, as shown in Case 1 and Case 2.

Case 1: if the second quantization coefficient is odd, a third operation mode is used to operate on all or a portion of the second quantization coefficient to obtain the first quantization coefficient.

The specific form of the third operation mode is not limited in the embodiments of the present application.

Method 1: the third operation mode includes that a value of the first quantization coefficient is equal to all or a portion of the second quantization coefficient plus one divided by two.

Case 2: if the second quantization coefficient is even, a fourth operation mode is used to operate all or a portion of the second quantization coefficient to obtain the first quantization coefficient.

The specific form of the fourth operation mode is not limited in the embodiments of the present application.

Exemplarily, the fourth operation mode includes that the first quantization coefficient is equal to all or a portion of the value of the second quantization coefficient divided by two.

In some embodiments, the encoding side uses a preset operation mode to operate all or a portion of the second quantization coefficient, to obtain the first quantization coefficient.

The specific value of the preset operation mode is not limited in the present application. For example, the preset operation mode is to divide all or a portion of the value of the second quantization coefficient by a positive integer greater than 1.

Exemplarily, the preset operation mode includes dividing a value of a portion whose parity is to be hidden of the second quantization coefficient by two to round the value thereof, which may be understood as a quotient operation, for example, the value of the portion whose parity is to be hidden of the second quantization coefficient is 7, and 7 divided by 2 is rounded to 3.

For example, the encoding side may determine the first quantization coefficient according to the following formula (13):

$$qIdx = \begin{cases} C, & C < n \\ (C-n)//2 + n, & C \geq n \end{cases} \qquad (13)$$

Here, C is the second quantization coefficient, qIdx is the first quantization coefficient, and (C−n) is the quantization coefficient whose parity is hidden of the second quantization coefficient.

It can be seen from the above formula (13) that, the encoding side performs parity hiding on a portion of the second quantization coefficient that is greater than n, and does not perform parity hiding on a portion that is less than n.

If the second quantization coefficient C is greater than n, it means that the second quantization coefficient includes the portion whose parity is to be hidden. The portion whose parity is to be hidden(C−n) of the second quantization coefficient is divided by 2, to obtain the portion whose parity is hidden(C−n)//2. Then, a sum of the portion whose parity is hidden (C−n)//2 and the portion whose parity is not hidden n of the second quantization coefficient is determined as the first quantization coefficient.

S703, a target context model corresponding to the first quantization coefficient is determined, and the first quantization coefficient is encoded using the target context model, to obtain a bitstream.

In the embodiments of the present application, the first quantization coefficient is a quantization coefficient obtained by performing parity hiding on all or a portion of the second quantization coefficient of the current region, and the first quantization coefficient includes a portion whose parity is hidden.

Before encoding the first quantization coefficient, the encoding side first needs to determine a context model corresponding to the first quantization coefficient.

Method 1: the encoding side uses different context models to encode the quantization coefficient whose parity is hidden and the quantization coefficient whose parity is not hidden. That is, a context model corresponding to the first quantization coefficient is different from context models corresponding to other quantization coefficients whose parity is not hidden.

In the embodiments of the present application, the first quantization coefficient is indicated by one or more flags, for example, flag 1 indicates a portion from 0 to 3, flag 2 indicates a portion from 3 to 6, flag 3 indicates a portion from 6 to 9, flag 4 indicates a portion from 9 to 12, and flag 5 indicates a portion from 12 to 15.

In the embodiments of the present application, a context model may be determined for one or more flags of the flags of the first quantization coefficient, and encoding may be performed using the one or more flags. That is, in the embodiments of the present application, a target context model may be determined for a target quantization coefficient of the first quantization coefficient, and the target quantization coefficient of the first quantization coefficient may be decoded using the target context model.

Optionally, the target quantization coefficient of the first quantization coefficient may be a quantization coefficient indicated by flag 1, or a quantization coefficient indicated by any one of flags 2 to 5. In this way, the encoding side may determine two context models, one context model is used to encode flag 1, and the other context model is used to encode flags 2 to 5.

Method 2: in order to reduce the encoding complexity of the first quantization parameter, in the embodiments of the present application, the target context model corresponding to the first quantization coefficient is the same as at least one of context models corresponding to other quantization coefficients whose parity is not hidden. That is, in the embodiments of the present application, the existing context model corresponding to other quantization coefficients whose parity is not hidden is reused to encode all or a portion of the quantization parameter whose parity is hidden, thereby reducing the encoding complexity of the quantization parameter whose parity is hidden.

As can be seen from the above, the quantization parameter may be divided into at least one portion. For example, the portion from 0 to 3 indicated by flag 1 of the quantization parameter is called BR, and the portion from 4 to 15 indicated by flags 2 to 5 of the quantization parameter is called LB.

In some embodiments, different portions of the quantization parameter correspond to different context models. In this case, the above S703 includes the following steps:

S703-A, obtaining multiple context models corresponding to target quantization coefficients of other quantization coefficients whose parity is not hidden, where the target quantization coefficients are portions of quantization coefficients of the quantization coefficients;

S703-B, determining a target context model corresponding to the target quantization coefficient of the first quantization coefficient from the multiple context models corresponding to the target quantization coefficients; and S703-C, encoding the target quantization coefficient of the first quantization coefficient using the target context model corresponding to the target quantization coefficient, to obtain the bitstream.

In Method 2, in order to reduce encoding complexity, context models corresponding to other quantization coefficients whose parity is not hidden are reused to encode the first quantization coefficient whose parity is hidden. Therefore, when encoding the target quantization coefficient of the first quantization coefficient, the context models corresponding to the target quantization coefficients of other quantization coefficients whose parity is not hidden is used to encode the target quantization coefficient of the first quantization coefficient.

To improve encoding accuracy of the quantization coefficient, multiple context models are usually created for each portion of the quantization coefficient, for example, R context models are created for the BR and Q context models are created for the LR, where R and Q are both positive integers.

In this way, when encoding the target quantization coefficient of the first quantization coefficient, multiple context models corresponding to the target quantization coefficients of other quantization coefficients whose parity is not hidden are first obtained, and then, from the multiple context models corresponding to the target quantization coefficients, the target context model corresponding to the target quantization coefficient is determined, and the target quantization coefficient of the first quantization coefficient is encoded using the target context model. For example, the target quantization coefficient is the BR, and it is assumed that the BR corresponds to R context models. In this way, the encoding side selects a context model from the R context models as the target context model corresponding to the BR, and uses the target context model corresponding to the BR to encode the BR of the first quantization coefficient. Similarly, in response to that the target quantization coefficient is the LR, it is assumed that the LR corresponds to Q context models. In this way, the encoding side selects a context model from the Q context models as the target context model corresponding to the LR, and uses the target context model corresponding to the LR to encode the LR of the first quantization coefficient.

The implementations of determining the target context model corresponding to the target quantization coefficient of the first quantization coefficient from the multiple context models corresponding to the target quantization coefficients in the above S703-B include but are not limited to following implementations.

Implementation 1: any one of the multiple context models corresponding to the target quantization coefficients determining as the target context model corresponding to the target quantization coefficient.

Implementation 2: the above S703-B includes following steps S703-B1 and S703-B2:

S703-B1, determining an index of the target context model corresponding to the target quantization coefficient; and S703-B2, determining, according to the index, the target context model corresponding to the target quantization coefficient from the multiple context models corresponding to the target quantization coefficients.

In Implementation 2, each of the multiple context models corresponding to the target quantization coefficients includes an index, so that the encoding side may determine the index of the target context model corresponding to the target quantization coefficient, and then select the target context model corresponding to the target quantization coefficient from the multiple context models corresponding to the target quantization coefficients according to the index.

The specific implementations of determining the index of the context model corresponding to the target quantization coefficient are not limited in the embodiments of the present application.

In the embodiments of the present application, the first quantization coefficient includes a BR, if the first quantization coefficient is greater than 3, the first quantization coefficient further includes an LR. The method of determining an index of the target context model corresponding to the BR and the method of determining an index of the target context model corresponding to the LR are different. The process of determining the index of the target context model corresponding to the LR and the process of determining the index of the target context model corresponding to the LR are described separately below.

Case 1: in response to that the target quantization coefficient is the BR of the first quantization coefficient, the above S703-B1 includes following step.

S703-B11, determining an index of the target context model corresponding to the BR according to a sum of BRs of encoded quantization coefficients around the first quantization coefficient.

In the embodiments of the present application, the BR of the first quantization coefficient is related to the BRs of the encoded quantization coefficients around the first quantization coefficient. Therefore, in the embodiments of the present application, the index of the target context model corresponding to the BR of the first quantization coefficient is determined according to the sum of the BRs of the encoded quantization coefficients around the first quantization coefficient.

The specific implementations of the above S703-B11 are not limited in the embodiments of the present application.

In an example, the sum of the BRs of the encoded quantization coefficients around the first quantization coefficient is determined as the index of the target context model corresponding to the BR of the first quantization coefficient.

In another example, a calculating process is performed on the sum of the BRs of the encoded quantization coefficients around the first quantization coefficient, to obtain the index of the target context model corresponding to the BR of the first quantization coefficient.

In some embodiments, the above S703-B11 includes the following steps:

S703-B111, adding the sum of the BRs of the encoded quantization coefficients around the first quantization coefficient to a first preset value, to obtain a first sum value;

S703-B112, dividing the first sum value by a first value, to obtain a first ratio; and S703-B113, determining, according to the first ratio, the index of the target context model corresponding to the BR.

In this embodiment, the method for determining the index of the target context model corresponding to the BR of the first quantization coefficient according to the sum of the BRs of the encoded quantization coefficients around the first quantization coefficient may be to add the sum of the BRs of the encoded quantization coefficients around the first quantization coefficient to the first preset value, to obtain the first sum value, then divide the first sum value by the first value, to obtain the first ratio, and finally determine the index of the target context model corresponding to the BR of the first quantization coefficient according to the first ratio.

In the embodiments of the present application, the encoded quantization coefficients around the first quantization coefficient may be understood as J encoded quantization coefficients located around the first quantization coefficient in the scan order.

In an instance, it is assumed that J is 5, taking Zig-Zag scan, Column scan and Row scan as examples, five encoded quantization coefficients around the first quantization coefficient are shown in FIGS. 9A to 9C, where the first quantization coefficient is the black portion in the figures, and the five encoded quantization coefficients around the first quantization coefficient are the gray portion. That is, in a case of determining the index of the target context model corresponding to the BR, the five encoded quantization coefficients around the first quantization coefficient as shown in FIG. 9A to FIG. 9C are taken as the reference.

The specific values of the first preset value and the first value are not limited in the embodiments of the present application.

Optionally, the first preset value is 1.

Optionally, the first preset value may be 2.

Optionally, the first value is 1.

Optionally, the first value is 2.

The specific method of determining the index of the target context model corresponding to the BR of the first quantization coefficient according to the first ratio in the above S703-B113 is not limited in the embodiments of the present application.

In Example 1, the first ratio is determined as the index of the target context model corresponding to the BR of the first quantization coefficient.

In Example 2, the first ratio is processed to obtain the index of the target context model corresponding to the BR of the first quantization coefficient. The specific manner of processing the first ratio is not limited in the embodiments of the present application.

In a possible implementation of Example 2, the above S703-B113 includes:

S703-B113-1, determining a minimum value between the first ratio and a first preset threshold as a second value; and S703-B113-2, determining, according to the second value, the index of the target context model corresponding to the BR.

In the possible implementation, the first ratio is compared with the first preset threshold, and the minimum value between the first ratio and the first preset threshold is determined as the second value, and then the index of the target context model corresponding to the BR of the first quantization coefficient is determined according to the second value.

The specific method of determining the index of the target context model corresponding to the BR according to the second value in the above S703-B113-2 is not limited in the embodiments of the present application.

For example, the second value determined above is determined as the index of the target context model corresponding to the BR of the first quantization coefficient.

For another example, an offset index $\text{offset}_{BR}$ of the BR is determined, and a sum of the second value and the offset index of the BR is determined as the index of the target context model corresponding to the BR.

In an instance, the index of the target context model corresponding to the BR of the first quantization coefficient may be determined according to the above formula (5).

The specific values of the first preset value, the first value and the first preset threshold are not limited in the embodiments of the present application.

In a possible implementation, it is assumed that the first preset value a1 is 1, the first value is 2, that is, b1=1, and the first preset threshold is 4, the above formula (5) may be specifically expressed as the above formula (6).

In another possible implementation, it is assumed that the first preset value a1 is 2, the first value is 4, that is, b1=2, and the first preset threshold is 4, the above formula (5) may be specifically expressed as the above formula (7).

In the embodiments of the present application, in a case of reusing an original context model to encode the BR of the first quantization coefficient, it is considered that a size of the quantization coefficient whose parity is hidden and a size of the quantization coefficient whose parity is not hidden are distributed differently overall, for example, the size of the quantization coefficient whose parity is hidden is approximately half of the size of the quantization coefficient whose parity is not hidden. Therefore, in the embodiments of the present application, in a case of reusing an existing context model, the process of determining the index of the context model is adjusted, to select a target context model suitable for the first quantization coefficient whose parity is hidden. Exemplarily, the sum of the BRs of the quantization coefficients around the first quantization coefficient is divided by 4, to obtain the first ratio, and the index of the target context model corresponding to the BR of the first quantization coefficient is determined according to the first ratio.

Furthermore, to achieve integer division, in a case where the sum of the BRs of the quantization coefficients around the first quantization coefficient is adjusted from shifting right by one bit as shown in formula (6) to shifting right by two bits as shown in formula (7), the first preset value a1 is adjusted from 1 in formula (6) to 2 in formula (7) to achieve rounding.

The specific method of determining the offset index $\text{offset}_{BR}$ of the BR is not limited in the embodiments of the present application.

In an example, the offset index of the BR is determined according to at least one of a position of the first quantization coefficient of the current block, a size of the current block, a scan order of the current block, or a color component of the current block.

For example, in a case where the first quantization coefficient is a quantization coefficient at an upper left position of the current block, the offset index of the BR is a first threshold.

For another example, in a case where the first quantization coefficient is not a quantization coefficient at an upper left position of the current block, the offset index of the BR is a second threshold.

The specific values of the first threshold and the second threshold are not limited in the embodiments of the present application.

Optionally, in a case where the color component of the current block is a luma component, the first threshold is 0.

Optionally, in a case where the color component of the current block is a chroma component, the first threshold is 10.

Optionally, in a case where the color component of the current block is a luma component, the second threshold is 5.

Optionally, in a case where the color component of the current block is a chroma component, the second threshold is 15.

The specific process of determining the index of the target context model corresponding to the BR of the first quantization coefficient is described above. In some embodiments, if the first quantization coefficient further includes an LR, in the embodiments of the present application, the index of the target context model corresponding to the LR of the first quantization coefficient further need to be determined.

The process of determining the index of the target context model corresponding to the LR of the first quantization coefficient is described below.

Case 2: in response to that the target quantization coefficient is the LR of the first quantization coefficient, the above S703-B1 includes the following steps:

S703-B21, determining an index of a target context model corresponding to the LR according to a sum of BRs and LRs of the encoded quantization coefficients around the first quantization coefficient.

In the embodiments of the present application, the LR of the first quantization coefficient is related to the BRs and LRs of the encoded quantization coefficients around the first quantization coefficient. Therefore, in the embodiments of the present application, the index of the target context model corresponding to the LR of the first quantization coefficient is determined according to the sum of the BRs and LRs of the encoded quantization coefficients around the first quantization coefficient.

The specific implementation of the above S703-B21 is not limited in the embodiments of the present application.

In an example, the sum of the BRs and LRs of the encoded quantization coefficients around the first quantization coefficient is determined as the index of the target context model corresponding to the LR of the first quantization coefficient.

In another example, a calculating process is performed on the sum of the BRs and LRs of the encoded quantization coefficients around the first quantization coefficient, to obtain the index of the target context model corresponding to the LR of the first quantization coefficient.

In some embodiments, the above S703-B21 includes the following steps:

S703-B211, adding the sum of the BRs and LRs of the encoded quantization coefficients around the first quantization coefficient to a second preset value, to obtain a second sum value;

S703-B212, dividing the second sum value by a third value, to obtain a second ratio; and S703-B213, determining, according to the second ratio, the index of the target context model corresponding to the LR.

In this embodiment, the method for determining the index of the target context model corresponding to the LR of the first quantization coefficient according to the sum of the BRs and LRs of the encoded quantization coefficients around the first quantization coefficient may be to add the sum of the BRs and LRs of the encoded quantization coefficients around the first quantization coefficient to the second preset value, to obtain the second sum value, then divide the second sum value by the third value, to obtain the second ratio, and finally determine the index of the target context model corresponding to the LR of the first quantization coefficient according to the second ratio.

In the embodiments of the present application, the encoded quantization coefficients around the first quantization coefficient may be understood as J encoded quantization coefficients located around the first coefficient in the scan order.

In an instance, it is assumed that J is 3, taking Zig-Zag scan, Column scan and Row scan as examples, three encoded quantization coefficients around the first quantization coefficient are shown in FIGS. 10A to 10C, where the first quantization coefficient is the black portion in the figures, and the three encoded quantization coefficients around the first quantization coefficient are the gray portion. That is, in a case of determining the index of the target context model corresponding to the LR, the three encoded quantization coefficients around the first quantization coefficient as shown in FIG. 10A to FIG. 10C.

The specific values of the second preset value and the third value are not limited in the embodiments of the present application.

Optionally, the second preset value is 1.

Optionally, the second preset value may be 2.

Optionally, the third value is 1.

Optionally, the third value is 2.

The specific method of determining the index of the target context model corresponding to the LR of the first quantization coefficient according to the second ratio in the above S703-B213 is not limited in the embodiments of the present application.

In Example 1, the second ratio is determined as the index of the target context model corresponding to the LR of the first quantization coefficient.

In Example 2, the second ratio is processed to obtain the index of the target context model corresponding to the LR of the first quantization coefficient. The specific manner of processing the second ratio is not limited in the embodiments of the present application.

In a possible implementation of Example 2, the above S703-B213 includes:

S703-B213-1, determining a minimum value between the second ratio and a second preset threshold as a fourth value; and S703-B213-2, determining, according to the fourth value, the index of the target context model corresponding to the LR.

In the possible implementation, the second ratio is compared with the second preset threshold, and the minimum value between the second ratio and the second preset threshold is determined as the fourth value, and then the index of the target context model corresponding to the LR of the first quantization coefficient is determined according to the fourth value.

The specific method of determining the index of the target context model corresponding to the LR according to the fourth value in the above S703-B213-2 is not limited in the embodiments of the present application.

For example, the fourth value determined above is determined as the index of the target context model corresponding to the LR of the first quantization coefficient.

For another example, an offset index $offset_{LR}$ of the LR is determined, and a sum of the fourth value and the offset index of the LR is determined as the index of the target context model corresponding to the LR.

In an instance, the index of the target context model corresponding to the LR of the first quantization coefficient may be determined according to the above formula (8).

The specific values of the second preset value, the third value and the second preset threshold are not limited in the embodiments of the present application.

In a possible implementation, it is assumed that the second preset value a2 is 1, the third value is 2, that is, b2=1, and the second preset threshold is 6, the above formula (8) may be specifically expressed as the above formula (9).

In another possible implementation, it is assumed that the second preset value a1 is 2, the third value is 4, that is, b2=2, and the second preset threshold is 6, the above formula (8) may be specifically expressed as the above formula (10).

In the embodiments of the present application, in a case of reusing an original context model to encode the LR of the first quantization coefficient, it is considered that the size of the quantization coefficient whose parity is hidden and the size of the quantization coefficient whose parity is not hidden are distributed differently overall, for example, the size of the quantization coefficient whose parity is hidden is approximately half of the size of the quantization coefficient whose parity is not hidden. Therefore, in the embodiments of the present application, in a case of reusing an existing context model, the process of determining the index of the context model is adjusted to select a target context model suitable for the first quantization coefficient whose parity is hidden. Exemplarily, the sum of less-than-16 portions of the quantization coefficients around the first quantization coefficient is divided by 4, to obtain the second ratio, and the index of the target context model corresponding to the LR of the first quantization coefficient is determined according to the second ratio.

Furthermore, in order to achieve integer division, in a case where the sum of the less-than-16 portions of the quantization coefficients around the first quantization coefficient is adjusted from shifting right by one bit as shown in formula (9) to shifting right by two bits as shown in formula (10), the second preset value a21 is adjusted from 1 in formula (9) to 2 in formula (10) to achieve rounding.

The specific method of determining the offset index offset$_{LR}$ of the LR is not limited in the embodiments of the present application.

In an example, the offset index of the LR is determined according to at least one of a position of the first quantization coefficient of the current block, a size of the current block, a scan order of the current block, or a color component of the current block.

For example, in a case where the first quantization coefficient is a quantization coefficient at an upper left position of the current block, the offset index of the LR is a third threshold.

For another example, in a case where the first quantization coefficient is not a quantization coefficient at an upper left position of the current block, the offset index of the LR is a fourth threshold.

The specific values of the third threshold and the fourth threshold are not limited in the embodiments of the present application.

Optionally, in a case where the color component of the current block is a luma component, the third threshold is 0.

Optionally, in a case where the color component of the current block is a chroma component, the third threshold is 14.

Optionally, in a case where the color component of the current block is a luma component, the fourth threshold is 7.

Optionally, in a case where the color component of the current block is a chroma component, the fourth threshold is 21.

In some embodiments, the calculation of the index of the context model of the first quantization coefficient is shown in Table 4 above.

According to the above steps, after determining the index of the target context model corresponding to the target quantization coefficient of the first quantization coefficient, the target context model corresponding to the target quantization coefficient of the first quantization coefficient is determined from multiple context models corresponding to the target quantization coefficients according to the index. For example, according to the index of the target context model corresponding to the BR of the first quantization coefficient, the target context model corresponding to the BR of the first quantization coefficient is obtained from multiple context models corresponding to the BRs of other quantization coefficients whose parity is not hidden. According to the index of the target context model corresponding to the LR of the first quantization coefficient, the target context model corresponding to the LR of the first quantization coefficient is obtained from multiple context models corresponding to the LRs of other quantization coefficients whose parity is not hidden.

From the above, it can be seen that the above-mentioned multiple context models include context models with different indexes under multiple QP segments (e.g., 4 QP segments) and 2 components (e.g., luma component and chroma component). In this way, in S703-B2 above, determining, according to the index, the target context model corresponding to the target quantization coefficient from the multiple context models corresponding to the target quantization coefficients, including: selecting at least one context model from the multiple context models corresponding to the target quantization coefficients, according to at least one of a quantization parameter, a transform type, a transform block size, a scan type, or a color component corresponding to the first quantization coefficient; and determining a context model corresponding to the index in the at least one context model as the target context model corresponding to the target quantization coefficient.

For example, according to the above steps, it is determined that the index corresponding to the BR (i.e., flag 1) of the first quantization coefficient is index 1, the QP segment corresponding to the first quantization coefficient is QP segment 1, and the first quantization coefficient is a quantization coefficient under the luma component. It is assumed that there are S context models corresponding to flag 1, T context models under QP segment 1 and the luma component are firstly selected from the S context models, a context model corresponding to index 1 in the T context models is determined as the target context model corresponding to the BR of the first quantization coefficient, and then the BR of the first quantization coefficient is encoded using the target context model.

For another example, according to the above steps, it is determined that the index corresponding to the LR (i.e., flags 2 to 5) of the first quantization coefficient is index 2, the QP segment corresponding to the first quantization coefficient is QP segment 1, and the first quantization coefficient is a quantization coefficient under the luma component. It is assumed that there are U context models corresponding to the LR, V context models under QP segment 1 and luma component are firstly selected from the U context models, a context model corresponding to index 2 in the V context models is determined as the target context models corresponding to flags 2 to 5 of the first quantization coefficient, and then the LR of the first quantization coefficient is encoded using the target context model.

In some embodiments, before determining the target context model from multiple context models, the encoding side needs to initialize the multiple context models, and then determine the target context model from initialized multiple context models.

For example, multiple context models corresponding to the BR are initialized, and then a target context model corresponding to the BR is selected from initialized multiple context models.

For another example, multiple context models corresponding to the LR are initialized, and then a target context model corresponding to the LR is selected from initialized multiple context models.

That is, in the embodiments of the present application, in order to enable the probability values of the context model corresponding to the coefficient whose parity is hidden to converge faster, each model may have a set of corresponding initial values according to a probability of occurrence of each symbol. In AVM, a probability of each context model is calculated as a probability that a symbol is less than a certain value of the context model, according to the number of symbols in the model and the probability of occurrence of each symbol and a cumulative distribution function. The probability value is indicated by a 16 bit integer by normalization.

In the embodiments of the present application, the methods for initializing multiple context models include but are not limited to the following method.

Method 1: the multiple context models are initialized using an equal probability value. For example, in a 4-symbol context model, symbols 0, 1, 2, and 3 all occur with a probability of 0.25. Then a probability of a symbol less than 1 is 0.25, a probability of a symbol less than 2 is 0.5, a probability of a symbol less than 3 is 0.75, and a probability of a symbol less than 4 is 1. The probabilities are rounded by 16 bits, and the probability of the symbol less than 1 is 8192, the probability of the symbol less than 2 is 16384, the probability of the symbol less than 3 is 24576, and the probability of the symbol less than 4 is 32768. These four integer values constitute the initial probability value of the context model.

Method 2: the multiple context models are initialized using a convergence probability value, where the convergence probability value is a convergent probability value corresponding to a context model in a case where the context model is used to encode a test video. Exemplarily, firstly, an initial probability value such as an equal probability is set for these context models. Next, a series of test videos are encoded using quantization coefficients corresponding to certain target bit rates, and the final convergence probability values of these context models are used as initial values of these context models. A new convergence value may be obtained by repeating the above steps, and an appropriate convergence value is selected as the final initial value.

According to the above method, after determining the target context model corresponding to the target quantization coefficient of the first quantization coefficient, the target quantization coefficient of the first quantization coefficient is encoded using the target context model, to obtain the bitstream.

Exemplarily, according to the index of the target context model corresponding to the BR of the first quantization coefficient, the target context model corresponding to the BR of the first quantization coefficient is obtained from obtained multiple context models corresponding to the BRs of other quantization coefficients whose parity is not hidden, and the target context model corresponding to the BR of the first quantization coefficient is used to encode the BR of the first quantization coefficient, to obtain an encoded BR, and then the bitstream is obtained according to the encoded BR.

In some embodiments, if the first quantization coefficient includes only the BR but not the LR, the encoded BR is output as a bitstream.

In some embodiments, if the first quantization coefficient further includes the LR, the target context model corresponding to the LR of the first quantization coefficient is obtained from obtained multiple context models corresponding to the LRs of other quantization coefficients whose parity is not hidden, according to the index of the target context model corresponding to the LR of the first quantization coefficient. Next, the encoding side uses the target context model corresponding to the LR to encode the LR of the first quantization coefficient, to obtain an encoded LR, and obtains the bitstream according to the encoded BR and encoded LR.

For example, in response to that the first quantization coefficient does not include a portion greater than 15, a bitstream formed by the encoded BR and encoded LR is output as a bitstream.

For another example, in response to that the first quantization coefficient further includes a portion greater than 15, the portion greater than 15 of the first quantization coefficient is encoded, and then a bitstream consisting of the encoded BR, encoded LR and an encoded value of the portion greater than 15 is output as a bitstream.

In the embodiments of the present application, the parity of the quantization coefficient whose parity is hidden of the first quantization coefficient is indicated by P quantization coefficients of the current region.

For example, a binary characteristic (0 or 1) of the P quantization coefficients of the current region is used to indicate the parity of the quantization coefficient whose parity is hidden.

In some embodiments, the parity of the quantization coefficient whose parity is hidden is indicated by parity corresponding to the P quantization coefficients of the current region.

In an example, the P quantization coefficients are all quantization coefficients of the current region.

In another example, the P quantization coefficients are portions of the quantization coefficients of the current region.

Exemplarily, the parity corresponding to the P quantization coefficients may be the parity of the minimum quantization coefficient in the P quantization coefficients, the parity of the maximum quantization coefficient in the P quantization coefficients, the parity of a sum of the absolute values of the P quantization coefficients, the parity of the number of target quantization coefficients of the P quantization coefficients, or the like.

In the embodiments of the present application, the parity corresponding to the P quantization coefficients of the current region is used to indicate the parity of the quantization coefficient whose parity is hidden. For example, the parity corresponding to P quantization coefficients being odd is used to indicate that the quantization coefficient whose parity is hidden is odd, and the parity corresponding to P quantization coefficients being even is used to indicate that the quantization coefficient whose parity is hidden is even.

In some embodiments, in response to that the parity corresponding to the P quantization coefficients is inconsistent with the parity of the quantization coefficient whose parity is hidden, the method of the embodiments of the present application further includes the following Step 1:

Step 1, adjusting the P quantization coefficients, to make the parity corresponding to the P quantization coefficients is consistent with the parity of the quantization coefficient whose parity is hidden.

Case 1: if the parity of the quantization coefficient whose parity is hidden is indicated by the parity of a sum of first absolute values of the P quantization coefficients, the above step 1 includes: adjusting the values of the P quantization coefficients, to make the parity of the sum of the first absolute values of the P quantization coefficients is consistent with the parity of the quantization coefficient whose parity is hidden.

Here, a first absolute value of a quantization coefficient is all or a portion of the absolute value of the quantization coefficient. For example, the first absolute value of the quantization coefficient is an absolute value of a portion that is less than 15.

The above Case 1 includes the following two examples.

In Example 1, if the quantization coefficient whose parity is hidden is odd, and the sum of the first absolute values of the P quantization coefficients is even, the values of the P quantization coefficients are adjusted, to make the sum of the first absolute values of the adjusted P quantization coefficients is odd.

For instance, if the quantization coefficient whose parity is hidden is odd, and the sum of the first absolute values of the P quantization coefficients is even, in this case, the minimum quantization coefficient in the P quantization coefficients is added by 1 or subtracted by 1, to modify the sum of the first absolute values of the P quantization coefficients to be odd.

In Example 2, if the quantization coefficient whose parity is hidden is even, and the sum of the first absolute values of the P quantization coefficients is odd, the values of the P quantization coefficients are adjusted, to make the sum of the first absolute values of the adjusted P quantization coefficients is even.

For instance, the quantization coefficient whose parity is hidden is even, and the sum of the first absolute values of the P quantization coefficients is odd, in this case, the minimum quantization coefficient in the P quantization coefficients is added by 1 or subtracted by 1, to modify the sum of the first absolute values of the P quantization coefficients to be even.

Case 2: if the parity of the quantization coefficient whose parity is hidden is indicated by the parity of the number of target quantization coefficients of the P quantization coefficients, the above step 1 includes: adjusting the values of the P quantization coefficients, to make the parity of the number of target quantization coefficients of the P quantization coefficients is consistent with the parity of the quantization coefficient whose parity is hidden.

The above Case 2 includes at least the following two examples.

In Example 1, if the quantization coefficient whose parity is hidden is odd, and the number of target quantization coefficients of the P quantization coefficients is even, the values of the P quantization coefficients are adjusted, to make the number of target quantization coefficients of the adjusted P quantization coefficients is odd.

In Example 2, if the quantization coefficient whose parity is hidden is even, and the number of target quantization coefficients of the P quantization coefficients is odd, the values of the P quantization coefficients are adjusted, to make the number of target quantization coefficients of the adjusted P quantization coefficients is even.

A target quantization coefficient is any one of a non-zero quantization coefficient, a non-zero quantization coefficient with even value, a quantization coefficient with even value, and a quantization coefficient with odd value in the P quantization coefficients.

In an example, if the target quantization coefficient is the non-zero quantization coefficient in the P quantization coefficients, the encoding side modifies at least one coefficient in the P quantization coefficients. For example, if the quantization coefficient whose parity is hidden is odd, and the number of non-zero quantization coefficients in the P quantization coefficients is even, one of the zero quantization coefficients in the P quantization coefficients may be adjusted to 1, or a value of a minimum quantization coefficient in the P quantization coefficients may be adjusted to 0, to make the number of non-zero quantization coefficients in the P quantization coefficients is odd.

For another example, if the quantization coefficient whose parity is hidden is even, and the number of non-zero quantization coefficients in the P quantization coefficients is odd, one of the zero quantization coefficients in the P quantization coefficients may be adjusted to 1, or the value of the minimum non-zero quantization coefficient in the P quantization coefficients may be adjusted to 0, to make the number of non-zero quantization coefficients in the P quantization coefficients is even.

In another example, if the target quantization coefficient is a non-zero quantization coefficient with even value in the P quantization coefficients, the encoding side modifies at least one coefficient in the P quantization coefficients. For example, if the quantization coefficient whose parity is hidden is odd, and the number of non-zero quantization coefficients with even value in the P quantization coefficients is even, one of the zero quantization coefficients in the P quantization coefficients may be adjusted to 2, or the value of the minimum non-zero quantization coefficient in the P quantization coefficients may be added by 1 or subtracted by 1, to make the number of non-zero quantization coefficients with even value in the P quantization coefficients is odd.

For another example, if the quantization coefficient whose parity is hidden is even, and the number of non-zero quantization coefficients with even value in the P quantization coefficients is odd, one of the zero quantization coefficients in the P quantization coefficients may be adjusted to 2, or the value of the minimum non-zero quantization coefficient in the P quantization coefficients may be added by 1 or subtracted by 1, to make the number of non-zero quantization coefficients with even value in the P quantization coefficients is even. The encoding side adjusts at least one coefficient in the P quantization coefficients using an adjustment method with the lowest rate-distortion cost.

In another example, if the target quantization coefficient is the quantization coefficient with even value in the P quantization coefficients, the encoding side modifies at least one coefficient in the P quantization coefficients. For example, if the quantization coefficient whose parity is hidden is odd, and the number of quantization coefficients with even value in the P quantization coefficients is even, one of the zero quantization coefficients in the P quantization coefficients may be adjusted to 1, or the minimum non-zero quantization coefficient in the P quantization coefficients may be adjusted to 0, to make the number of quantization coefficients with even value in the P quantization coefficients is odd.

For another example, if the quantization coefficient whose parity is hidden is even, and the number of quantization coefficients with even value in the P quantization coefficients is odd, one of the zero quantization coefficients in the P quantization coefficients may be adjusted to 1, or the minimum non-zero quantization coefficient in the P quantization coefficients may be adjusted to 0, to make the number of quantization coefficients in the P quantization coefficients is even.

In another example, if the target quantization coefficient is a quantization coefficient with odd value in the P quantization coefficients, the encoding side modifies at least one coefficient in the P quantization coefficients. For example, if the quantization coefficient whose parity is hidden is odd, and the number of quantization coefficients with odd value in the P quantization coefficients is even, one of the zero quantization coefficients in the P quantization coefficients may be adjusted to 1, or the minimum non-zero quantization coefficient in the P quantization coefficients may be adjusted to 0 or added by 1 or subtracted by 1, to make the number of quantization coefficients with odd value in the P quantization coefficients is odd.

For another example, if the quantization coefficient whose parity is hidden is even, and the number of quantization coefficients with odd value in the P quantization coefficients is odd, one of the zero quantization coefficients in the P quantization coefficients may be adjusted to 1, or the minimum non-zero quantization coefficient in the P quantization coefficients may be adjusted to 0 or added by 1 or subtracted by 1, to make the number of quantization coefficients in the P quantization coefficients is even.

Furthermore, the parity hiding technology proposed in the present application is implemented on the AVM reference software, a size of the used region is set to 16, and a threshold value of the number of non-zero coefficients for enabling parity hiding is 4. If a sum of the absolute values of portions of the non-zero coefficients less than or equal to 15 of the current region is odd, it means that a last coefficient in the scan order of the region (i.e., the second quantization coefficient) is odd; if it is even, it means that the last coefficient in the scan order of the region (i.e., the second quantization coefficient) is even.

In an example, if the condition of enabling the parity hiding technology of the present application is that: in a case where at least one direction of the transform block is an identity transform, the parity hiding technology is not enabled; in a case where both directions of the transform block are not identity transform, the parity hiding technology is enabled; the parity hiding technology is enabled under the luma component, and the parity hiding technology is not enabled under the chroma component. In this condition, the sequences with resolutions ranging from 270p to 4K are tested under a common test condition (CTC) in configurations of all intra, random access and low delay respectively, and the changes in coding performance are obtained as shown in Table 10, Table 11, and Table 12, respectively.

TABLE 10

| | all intra | | | | |
| | PSNR | | | | |
| | Y | U | V | YUV | wAverage |
| Class A1_4K | −0.26% | −1.09% | −1.05% | −0.36% | −0.33% |
| Class A1_2K | −0.26% | −1.24% | −1.19% | −0.35% | −0.34% |
| Class A3_720p | −0.27% | −0.92% | −1.00% | −0.34% | −0.33% |
| Class A4_360p | −0.32% | −1.11% | −1.08% | −0.38% | −0.38% |
| Class A5_270p | −0.14% | −0.77% | −0.57% | −0.19% | −0.19% |
| Class B1_SYN | −0.17% | −0.84% | −0.92% | −0.24% | −0.23% |
| Overall performance | −0.24% | −1.05% | −1.04% | −0.32% | −0.31% |

TABLE 11

| | random access | | | | |
| | PSNR | | | | |
| | Y | U | V | YUV | wAverage |
| Class A1_4K | −0.33% | −0.54% | −0.61% | −0.36% | −0.35% |
| Class A1_2K | −0.42% | −0.78% | −0.81% | −0.45% | −0.45% |
| Class A3_720p | −0.32% | −0.98% | −0.61% | −0.37% | −0.36% |
| Class A4_360p | −0.31% | −0.90% | −0.58% | −0.35% | −0.35% |
| Class A5_270p | −0.20% | −0.90% | −0.10% | −0.23% | −0.23% |
| Class B1_SYN | −0.25% | −0.60% | −0.40% | −0.28% | −0.27% |
| Overall performance | −0.34% | −0.76% | −0.60% | −0.37% | −0.36% |

TABLE 12

| | low delay | | | | |
| | PSNR | | | | |
| | Y | U | V | YUV | wAverage |
| Class A1_4K | | | | | |
| Class A1_2K | −0.22% | −0.64% | −0.80% | −0.25% | −0.26% |
| Class A3_720p | −0.24% | −0.99% | −0.31% | −0.28% | −0.27% |
| Class A4_360p | −0.10% | −1.02% | −0.02% | −0.14% | −0.14% |
| Class A5_270p | −0.03% | −1.36% | −1.04% | −0.13% | −0.12% |
| Class B1_SYN | −0.11% | −0.50% | −0.65% | −0.16% | −0.15% |
| Overall performance | −0.17% | −0.76% | −0.62% | −0.21% | −0.21% |

The PSNR in Tables 10 to 12 above is a peak signal-to-noise ratio, which indicates a ratio of a maximum possible signal power to a destructive noise power that affects its indication accuracy. Since many signals have very wide dynamic ranges, the PSNR is often expressed in logarithmic decibel unit. In video coding, the PSNR is used to evaluate quality of a compressed picture compared to an original picture. The higher the PSNR, the lower distortion after compression.

The negative sign "−" in the above table indicates performance gain.

It can be seen from Tables 10 to 12 above that, in a case where at least one direction of the transform block is identity transform, the parity hiding technology is not enabled, and the parity hiding technology is enabled under the luma component, and the parity hiding technology is not enabled under the chroma component. Under these conditions, in a case where the parity hiding technology provided by the embodiments of the present application is used and tested in the configurations of all intra, random access and low delay respectively, the performance is significantly improved.

In another example, in a case where at least one direction of the transform block is identity transform, the parity hiding technology is not enabled; in a case where both directions of the transform block are not identity transform, the parity hiding technology is enabled, and the context model corresponding to the quantization coefficients whose parity is not hidden is reused to encode the quantization coefficient whose parity is hidden. In this condition, the sequence with resolutions ranging from 270p to 4K are tested under the a common test condition (CTC) in configurations of all intra and random access respectively, and changes in coding performance are obtained as shown in Table 13 and Table 14 respectively.

TABLE 13

| | all intra | | | | |
| | PSNR | | | | |
| | Y | U | V | YUV | wAverage |
| Class A1_4K | −0.21% | −0.85% | −0.81% | −0.28% | −0.26% |
| Class A1_2K | −0.19% | −0.97% | −1.01% | −0.26% | −0.25% |
| Class A3_720p | −0.19% | −0.84% | −0.88% | −0.25% | −0.24% |

TABLE 13-continued

| all intra | | | | | |
| --- | --- | --- | --- | --- | --- |
| | PSNR | | | | |
| | Y | U | V | YUV | wAverage |
| Class A4_360p | −0.12% | −1.03% | −0.99% | −0.19% | −0.20% |
| Class A5_270p | −0.05% | −0.38% | −0.03% | −0.05% | −0.06% |
| Class B1_SYN | −0.09% | −0.48% | −0.55% | −0.13% | −0.12% |
| Overall performance | −0.16% | −0.80% | −0.80% | −0.22% | −0.21% |

TABLE 14

| random access | | | | | |
| --- | --- | --- | --- | --- | --- |
| | PSNR | | | | |
| | Y | U | V | YUV | wAverage |
| Class A1_4K | −0.23% | −0.49% | −0.44% | −0.25% | −0.25% |
| Class A1_2K | −0.33% | −0.66% | −0.61% | −0.36% | −0.36% |
| Class A3_720p | −0.16% | −0.62% | −0.34% | −0.19% | −0.18% |
| Class A4_360p | −0.25% | −0.34% | −1.19% | −0.29% | −0.29% |
| Class A5_270p | −0.11% | −0.47% | −1.27% | −0.17% | −0.17% |
| Class B1_SYN | −0.20% | −0.49% | −0.17% | −0.21% | −0.21% |
| Overall performance | −0.25% | −0.55% | −0.57% | −0.27% | −0.27% |

It can be seen from Tables 13 and 14 above that, in a case where at least one direction of the transform block is identity transform, the parity hiding technology is not enabled, and the context model corresponding to the quantization coefficients whose parity is not hidden is reused to encode the quantization coefficients whose parity is hidden. Under these conditions, in a case where the parity hiding technology provided by the embodiments of the present application is used and tested in the configurations of all intra and random access respectively, the performance is significantly improved.

In the video encoding method provided by the embodiments of the present application, the encoding side divides the current block into N regions, determines the second quantization coefficient of the current region, and performs parity hiding on all or a portion of the second quantization coefficient to obtain the first quantization coefficient, where the current region is a region that includes at least one non-zero quantization coefficient in the N regions; then, the encoding side determines the target context model corresponding to the first quantization coefficient, uses the target context model to encode the first quantization coefficient to obtain the bitstream, where the parity of the quantization coefficient whose parity is hidden of the first quantization coefficient is indicated by the P quantization coefficients of the current region. That is, in the embodiments of the present application, the encoding side performs parity hiding on all or a portion of the second quantization coefficient to obtain the first quantization coefficient. Since the absolute value of the first quantization coefficient is less than the absolute value of the second quantization coefficient, encoding the first quantization coefficient may reduce the number of encoding bits compared to encoding the second quantization coefficient, thereby reducing the encoding cost. In addition, the first quantization coefficient is encoded by separately determining the target context model corresponding to the first quantization coefficient, so as to improve the encoding accuracy of the first quantization coefficient.

FIG. 13 is a schematic flowchart of a video encoding method provided by the embodiments of the present application.

Based on the embodiments shown in FIG. 12 above, the video encoding method provided by the embodiments of the present application is further described below in conjunction with FIG. 13.

FIG. 13 is a schematic flowchart of a video encoding method provided by an embodiment of the present application. As shown in FIG. 13, the method of the embodiments of the present application includes following steps.

S801, at least one flag is obtained.

The at least one flag is used to indicate whether parity of a quantization coefficient is allowed to be hidden.

Optionally, the at least one flag includes at least one of a sequence level flag, a picture level flag, a slice level flag, a unit level flag, or a block level flag.

In response to that it is determined that parity of a quantization coefficient of the current block is allowed to be hidden according to the at least one flag, the following step S802 is performed.

In response to that it is determined that the parity of the quantization coefficient of the current block is not allowed to be hidden according to at least one flag, the following step S806 is performed.

S802, the current block is divided into N regions.

The region division method of the current block is not limited in the embodiments of the present application. For example, the current block is divided into the N regions according to the scan order, or the current block is divided into the N regions according to spatial positions of samples of the current block.

The sizes of the N regions may be the same or different, which is not limited in the embodiments of the present application.

The specific implementation process of the above S802 may refer to the relevant description of the above S701, which will not be repeated here.

S803, whether the current region meets a condition is determined.

The condition includes at least one of a preset condition and a condition of enabling parity hiding technology described blow.

In the embodiments of the present application, the parity hiding technology proposed in the present application is limited. Exemplarily, in a case where the current region meets the condition, it means that the current region may achieve significant beneficial effects by using the parity hiding technology provided by the embodiments of the present application. In this case, the following step S804 is performed.

In a case where the current region does not meet the condition, it means that the current region cannot achieve significant beneficial effects using the parity hiding technology provided by the embodiments of the present application. In this case, the following step S806 is performed.

The condition of enabling parity hiding technology is introduced in below.

In some embodiments, different conditions of enabling parity hiding technology may be preset according to the difference of at least one of a quantization parameter, a transform type, a transform block size, a scan type, or a color component.

For example, in response to that the quantization coefficient is greater than or equal to a certain preset value, the parity hiding technology is enabled, or in response to that the quantization coefficient is less than the certain preset value, the parity hiding technology is not enabled.

For another example, in response to that the transform type is a preset transform type, the parity hiding technology is enabled; or in response to that the transform type is not the preset transform type, the parity hiding technology is not enabled. For instance, in response to that the transform type of the current block is a first transform type, it is determined that the parity of the first quantization coefficient is not allowed to be hidden, where the first transform type is used to indicate that at least one direction of the current block is skipped transform, as detailed in Table 2 above.

For yet another example, in response to that the transform block size is greater than or equal to a preset size, the parity hiding technology is enabled, or in response to that the transform block size is less than the preset size, the parity hiding technology is not enabled.

For still another example, in response to that the color component of the current block is a first component, it is determined that the parity of the first quantization coefficient is not allowed to be hidden, that is, the parity hiding technology is not enabled; or in response to that the color component of the current block is not the first component, it is determined that the parity of the first quantization coefficient is allowed to be hidden, that is, the parity hiding technology is enabled. The first component is not limited in the embodiments of the present application. In a possible implementation, the first component is a chroma component, that is, the parity hiding technology is enabled under the luma component, and the parity hiding technology is not enabled under the chroma component.

For yet still another example, in response to that the transform block is applicable to a preset scan type, the parity hiding technology is enabled; or in response to that the transform block is not applicable to the preset scan type, the parity hiding technology is not enabled. The preset scan type is not limited in the present application, for example, the preset scan type is ZigZag scan or diagonal scan.

It should be noted that, the above examples are only exemplary descriptions, and the above examples may be combined with each other as the condition of enabling parity hiding technology.

The preset condition is introduced in below.

The specific contents of the preset condition are not limited in the embodiments of the present application, which may be set according to actual requirements.

In a possible implementation, the preset condition includes at least one of the following conditions:

Condition 1, the number of non-zero quantization coefficients of the current region being greater than a first preset numerical value;

Condition 2, in the current region, a distance between a first non-zero quantization coefficient and a last non-zero quantization coefficient in a decoding scan order being greater than a second preset numerical value;

Condition 3: in the current region, a distance between a first non-zero quantization coefficient and a last quantization coefficient in a decoding scan order being greater than a third preset numerical value;

Condition 4: in the current region, a sum of absolute values of non-zero quantization coefficients being greater than a fourth preset numerical value;

Condition 5: a color component of the current block being a second component, optionally, the second component is a luma component; or Condition 6: a transform type of the current block being not a first transform type, where the first transform type is used to indicate that at least one direction of the current block is skipped transform.

In some embodiments, the above six conditions may also be combined with each other to form new constraint conditions.

The specific values of the first preset value to fourth preset value are not limited in the embodiments of the present application, as long as the first preset value to the fourth preset value are all positive integers.

In an example, at least one of the first preset value, the second preset value, the third preset value, or the fourth preset value is a fixed value.

In another example, at least one of the first preset value, the second preset value, the third preset value, or the fourth preset value is a non-fixed value, i.e., a value determined by the encoding side according to current encoding information.

In some embodiments, if at least one of the first preset value, the second preset value, the third preset value, or the fourth preset value is a non-fixed value, the encoding side writes the non-fixed value into the bitstream, and the decoding side parses the non-fixed value from the bitstream.

In some embodiments, the encoding side may first determine whether the first quantization coefficient allows the parity of the quantization coefficient to be hidden according to at least one of the quantization parameter, transform type, transform block size, scan type, or color component corresponding to the first quantization coefficient, and in a case where the first quantization coefficient allows the parity of the quantization coefficient to be hidden, the decoding side determines whether the current region meets the preset condition.

In some embodiments, in a case of determining that the current region meets the preset conditions, the encoding side may determine whether the first quantization coefficient meets the condition of enabling parity hiding technology.

That is, the preset conditions and the conditions of enabling parity hiding technology may be used separately or in combination with each other.

S804, a second quantization coefficient of a current region is determined, and parity hiding is performed on all or a portion of the second quantization coefficient, to obtain a first quantization coefficient.

S805, a target context model corresponding to the first quantization coefficient is determined, and the first quantization coefficient is encoded using the target context model, to obtain a bitstream.

Optionally, the target context model corresponding to the first quantization coefficient is the same as at least one of the context models corresponding to other quantization coefficients whose parity is not hidden.

The above steps S804 and S805 may refer to the description of the above steps S702 and S703, which will not be repeated here.

S806, the second quantization coefficient is encoded, to obtain the bitstream.

In the embodiments of the present application, in a case of encoding the current region, the encoding side first determines whether the current region meets the condition, to determine whether significant beneficial technical effects may be brought in a case where the parity hiding technology provided by the present application is used to decode the current region. In a case where it is determined that the use of the parity hiding technology has significant beneficial effects, the technical solution of the present application is used to encode the current region to improve the encoding reliability.

It should be understood that FIGS. 6 to 13 are merely examples of the present application, which should not be construed as a limitation of the present application.

The preferred embodiments of the present application are described in detail above in conjunction with the accompanying drawings, however, the present application is not limited in the specific details in the above embodiments. Within the technical concept of the present application, a variety of simple modifications can be made to the technical solution of the present application, and these simple modifications all fall within the protection scope of the present application. For example, the various specific technical features described in the above specific embodiments can be combined in any suitable manner without contradiction. In order to avoid unnecessary repetition, the present application will not further explain various possible combinations. For another example, the various implementation modes of the present application can be arbitrarily combined, and as long as they do not violate the concept of the present application, they should also be regarded as the contents disclosed in the present application.

It should further be understood that, in the various method embodiments of the present application, the magnitude of serial numbers of the above-mentioned processes does not mean the order of execution. The execution order of each process should be determined by its function and internal logic, and should not constitute any limitation on the implementation process of the embodiments of the present application. In addition, in the embodiments of the present application, the term "and/or" is only an association relationship to describe associated objects, which means that there may be three kinds of relationships. Exemplarily, A and/or B may indicate three cases that: A exists alone, both A and B exist, and B exists alone. In addition, a character "/" herein generally means that related objects before and after "/" are in an "or" relationship.

The method embodiments of the present application have been described in detail above with reference to FIGS. 6 to 13. The apparatus embodiments of the present application will be described in detail below with reference to FIGS. 14 to 17.

Figures 14, 15, 16, 17:
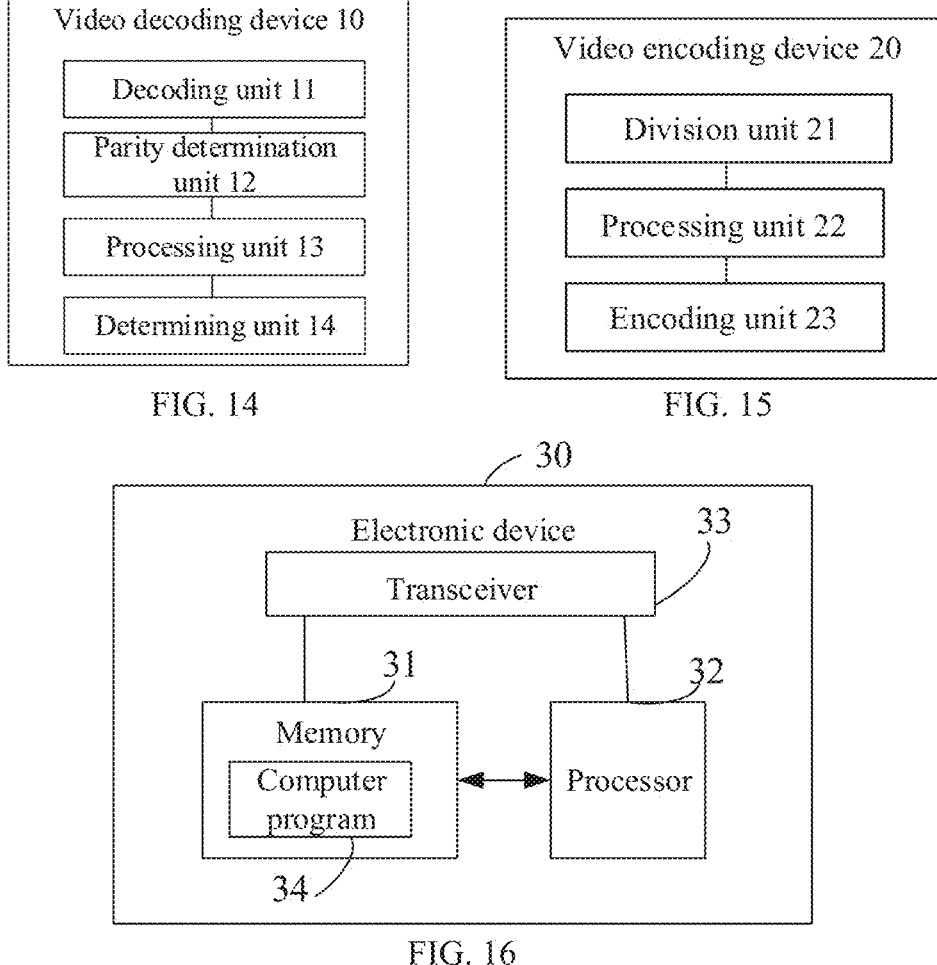
FIG. 14 is a schematic block diagram of a video decoding apparatus provided by the embodiments of the present application.
FIG. 15 is a schematic block diagram of a video encoding apparatus provided by the embodiments of the present application.
FIG. 16 is a schematic block diagram of an electronic device provided by the embodiments of the present application.
FIG. 17 is a schematic block diagram of a video coding system provided by the embodiments of the present application.

FIG. 14 is a schematic block diagram of a video decoding apparatus provided by the embodiments of the present application.

As shown in FIG. 14, the video decoding apparatus 10 includes:

a decoding unit 11, configured to decode a bitstream, to obtain P quantization coefficients of a current region, where the current region is a region of a current block includes at least one non-zero quantization coefficient, and P is a positive integer;

a parity determining unit 12, configured to determine, according to the P quantization coefficients, parity of a quantization coefficient whose parity is hidden of a first quantization coefficient, where the first quantization coefficient is a quantization coefficient obtained by performing parity hiding on all or a portion of a second quantization coefficient, the second quantization coefficient is a quantization coefficient whose parity is not hidden of the current region;

a processing unit 13, configured to determine a target context model corresponding to the first quantization coefficient, and decode the first quantization coefficient which is encoded based on context using the target context model, to obtain a decoded first quantization coefficient; and a determining unit 14, configured to determine the second quantization coefficient with parity according to the parity of the quantization coefficient whose parity is hidden and the decoded first quantization coefficient.

In some embodiments, the target context model corresponding to the first quantization coefficient is the same as at least one of the context models corresponding to other quantization coefficients whose parity is not hidden.

In some embodiments, the processing unit 13 is exemplarily configured to obtain multiple context models corresponding to target quantization coefficients of other quantization coefficients whose parity is not hidden; determine the target context model corresponding to a target quantization coefficient of the first quantization coefficient from the multiple context models corresponding to the target quantization coefficients; and decode the target quantization coefficient of the first quantization coefficient using the target context model corresponding to the target quantization coefficient, to obtain the first quantization coefficient.

In some embodiments, the processing unit 13 is exemplarily configured to determine an index of the target context model corresponding to the target quantization coefficient; and determine, according to the index, the target context model corresponding to the target quantization coefficient of the first quantization coefficient from the multiple context models corresponding to the target quantization coefficients.

In some embodiments, the processing unit 13 is exemplarily configured to, in response to that the target quantization coefficient is a base range indicated by flag 1 of the first quantization coefficient, determine an index of the target context model corresponding to the base range according to a sum of base ranges of decoded quantization coefficients around the first quantization coefficient.

In some embodiments, the processing unit 13 is exemplarily configured to add the sum of the base ranges of the decoded quantization coefficients around the first quantization coefficient to a first preset value, to obtain a first sum value; divide the first sum value by a first value, to obtain a first ratio; and determine, according to the first ratio, the index of the target context model corresponding to the base range.

Optionally, the first value is 4.

Optionally, the first preset value is 2.

In some embodiments, the processing unit 13 is exemplarily configured to determine a minimum value between the first ratio and a first preset threshold as a second value; and determine, according to the second value, the index of the target context model corresponding to the base range.

Optionally, the first preset threshold is 4.

In some embodiments, the processing unit 13 is exemplarily configured to determine an offset index of the base range; and determine a sum of the second value and the offset index of the base range as the index of the target context model corresponding to the base range.

In some embodiments, the processing unit 13 is exemplarily configured to determine the offset index of the base range according to at least one of a position of the first quantization coefficient of the current block, a size of the current block, a scan order of the current block, or a color component of the current block.

In some embodiments, in a case where the first quantization coefficient is a quantization coefficient at an upper left position of the current block, the offset index of the base range is a first threshold.

Optionally, in a case where the color component of the current block is a luma component, the first threshold is 0.

In some embodiments, in a case where the first quantization coefficient is not a quantization coefficient at an upper left position of the current block, the offset index of the base range is a second threshold.

Optionally, in response to that the color component of the current block is a luma component, the second threshold is 5.

In some embodiments, the processing unit 13 is exemplarily configured to, in response to that the target quantization coefficient is a lower range indicated by flags 2 to 5 of the first quantization coefficient, determine an index of a target context model corresponding to the lower range according to a sum of base ranges and lower ranges of decoded quantization coefficients around the first quantization coefficient.

In some embodiments, the processing unit 13 is exemplarily configured to add the sum of the base ranges and lower ranges of the decoded quantization coefficients around the first quantization coefficient to a second preset value, to obtain a second sum value; divide the second sum value by a third value, to obtain a second ratio; and determine, according to the second ratio, the index of the target context model corresponding to the lower range.

Optionally, the third value is 4.

Optionally, the second preset value is 2.

In some embodiments, the processing unit 13 is exemplarily configured to determine a minimum value between the second ratio and a second preset threshold as a fourth value; and determine, according to the fourth value, the index of the target context model corresponding to the lower range.

Optionally, the second preset threshold is 4.

In some embodiments, the processing unit 13 is exemplarily configured to determine an offset index of the lower range; and determine a sum of the fourth value and the offset index of the lower range as the index of the target context model corresponding to the lower range.

In some embodiments, the processing unit 13 is exemplarily configured to determine the offset index of the lower range according to at least one of a position of the first quantization coefficient of the current block, a size of the current block, a scan order of the current block, or a color component of the current block.

In some embodiments, in a case where the first quantization coefficient is a quantization coefficient at an upper left position of the current block, the offset index of the lower range is a third threshold.

Optionally, in a case where the color component of the current block is a luma component, the third threshold is 0.

In some embodiments, in a case where the first quantization coefficient is not a quantization coefficient at an upper left position of the current block, the offset index of the lower range is a fourth threshold.

Optionally, in a case where the color component of the current block is a luma component, the fourth threshold is 7.

In some embodiments, the processing unit 13 is exemplarily configured to decode a base range of the first quantization coefficient using a target context model corresponding to a base range indicated by flag 1 of the first quantization coefficient, to obtain a decoded base range; and determine the first quantization coefficient according to the decoded base range.

In some embodiments, the processing unit 13 is exemplarily configured to, in response to that the first quantization coefficient further includes a lower range indicated by flags 2 to 5, decode a lower range of the first quantization coefficient using a target context model corresponding to the lower range to obtain a decoded lower range; and determine the first quantization coefficient according to the decoded base range and decoded lower range.

In some embodiments, the processing unit 13 is exemplarily configured to select at least one context model from the multiple context models corresponding to the target quantization coefficients, according to at least one of a quantization parameter, a transform type, a transform block size, a scan type, or a color component corresponding to the first quantization coefficient; and determine a context model corresponding to the index in the at least one context model as the target context model corresponding to the target quantization coefficient.

In some embodiments, the processing unit 13 is further configured to initialize the multiple context models corresponding to the target quantization coefficients; and determine the target context model corresponding to the target quantization coefficient from initialized multiple context models corresponding to the target quantization coefficients.

In some embodiments, the processing unit 13 is exemplarily configured to initialize the multiple context models corresponding to the target quantization coefficients using an equal probability value; or initialize the multiple context models corresponding to the target quantization coefficients using a convergent probability value, where the convergent probability value is a convergent probability value corresponding to a context model in a case where the context model is used to encode a test video.

In some embodiments, the parity determining unit 12 is further configured to determine whether parity of the first quantization coefficient is allowed to be hidden, according to at least one of a quantization parameter, a transform type, a transform block size, a scan type, or a color component corresponding to the first quantization coefficient; and in a case where it is determined that the parity of the first quantization coefficients is allowed to be hidden, determine, according to the P quantization coefficients, the parity of the quantization coefficient whose parity is hidden.

In some embodiments, the parity determining unit 12 is exemplarily configured to, in response to that the transform type of the current block is a first transform type, determine that the parity of the first quantization coefficient is not allowed to be hidden, where the first transform type is used to indicate that at least one direction of the current block is skipped transform.

In some embodiments, the parity determining unit 12 is exemplarily configured to, in response to that the color component of the current block is a first component, determine that the parity of the first quantization coefficient is not allowed to be hidden.

Optionally, the first component is a chroma component.

In some embodiments, the parity determining unit 12 is exemplarily configured to determine, according to parity corresponding to the P quantization coefficients, the parity of the quantization coefficient whose parity is hidden.

In some embodiments, the determining unit 14 is exemplarily configured to perform an operation on the quantization coefficients whose parity is hidden using a preset operation mode, to obtain a first operation result; process the first operation result according to the parity, to obtain a second operation result; and obtain the second quantization coefficient according to the second operation result and the first quantization coefficient.

The parity determining unit 12 is exemplarily configured to, in response to that the current region meets a preset condition, determine the parity of the quantization coefficient whose parity is hidden according to the P quantization coefficients.

In some embodiments, the preset condition includes at least one of:

the number of non-zero quantization coefficients of the current region being greater than a first preset numerical value;

in the current region, a distance between a first non-zero quantization coefficient and a last non-zero quantization coefficient in a decoding scan order being greater than a second preset numerical value;

in the current region, a distance between a first non-zero quantization coefficient and a last quantization coefficient in a decoding scan order being greater than a third preset numerical value;

in the current region, a sum of absolute values of non-zero quantization coefficients being greater than a fourth preset numerical value;

a color component of the current block being a second component; or a transform type of the current block being not a first transform type, where the first transform type is used to indicate that at least one direction of the current block is skipped transform.

Optionally, the second component is a luma component.

In some embodiments, the parity determining unit 12 is further configured to, in response to that the current block is transformed using a target transform mode, skip the step of determining the parity of the quantization coefficient whose parity is hidden of the first quantization coefficient according to the P quantization coefficients.

In some embodiments, the target transform mode includes secondary transform, multiple transform or a first transform type, and the first transform type is used to indicate that at least one direction of the current block is skipped transform.

In some embodiments, the parity determining unit 12 is further configured to decode the bitstream to obtain at least one flag, where the at least one flag is used to indicate whether parity of a quantization coefficient is allowed to be hidden; and in response to that it is determined that parity of at least one quantization coefficient of the current block is allowed to be hidden according to the at least one flag, determine the parity of the quantization coefficient whose parity is hidden according to the P quantization coefficients.

Optionally, the at least one flag includes at least one of a sequence level flag, a picture level flag, a slice level flag, a unit level flag, or a block level flag.

In some embodiments, the first quantization coefficient is a non-zero quantization coefficient which is located at a K-th position in a scan order of the current region, K is less than or equal to the number of non-zero quantization coefficients of the current region.

In some embodiments, the decoding unit 11 is exemplarily configured to decode the bitstream, to obtain decoded information of the current block; divide the current block into N regions, where N is a positive integer; and obtain the P quantization coefficients of the current region from the decoded information of the current block.

It should be understood that the apparatus embodiments and the method embodiments may correspond to each other, and similar descriptions may refer to the method embodiments, which will not be repeated here for the sake of brevity. Exemplarily, the video encoding apparatus 10 shown in FIG. 14 may correspond to the corresponding subject executing the methods of the embodiments of the present application, and the aforementioned and other operations and/or functions of various units in the video encoding apparatus 10 are respectively for implementing the corresponding processes in various methods, which will not be repeated here for the sake of brevity.

FIG. 15 is a schematic block diagram of a video encoding apparatus provided by the embodiments of the present application.

As shown in FIG. 15, the video encoding apparatus 20 includes:

a dividing unit 21, configured to divide a current block into N regions, where N is a positive integer;

a processing unit 22, configured to determine a second quantization coefficient of a current region, and perform parity hiding on all or a portion of the second quantization coefficient, to obtain a first quantization coefficient, where the current region is a region that includes at least one non-zero quantization coefficient in the N regions; and an encoding unit 23, configured to determine a target context model corresponding to the first quantization coefficient, and encode the first quantization coefficient using the target context model to obtain a bitstream, where parity of a quantization coefficient whose parity is hidden of the first quantization coefficient is indicated by P quantization coefficients of the current region, and P is a positive integer.

In some embodiments, the target context model corresponding to the first quantization coefficient is the same as at least one of context models corresponding to other quantization coefficients whose parity is not hidden.

In some embodiments, the encoding unit 23 is exemplarily configured to obtain multiple context models corresponding to target quantization coefficients of other quantization coefficients whose parity is not hidden; determine a target context model corresponding to a target quantization coefficient of the first quantization coefficient from the multiple context models corresponding to the target quantization coefficients; and encode the target quantization coefficient of the first quantization coefficient using the target context model of the target quantization coefficient, to obtain the bitstream.

In some embodiments, the encoding unit 23 is exemplarily configured to determine an index of the target context model corresponding to the target quantization coefficient; and determine the target context model corresponding to the target quantization coefficient from the multiple context models corresponding to the target quantization coefficients according to the index.

In some embodiments, the encoding unit 23 is exemplarily configured to, in response to that the target quantization coefficient is a base range indicated by flag 1 of the first quantization coefficient, determine an index of the target context model corresponding to the base range according to a sum of base ranges of the encoded quantization coefficients around the first quantization coefficient.

In some embodiments, the encoding unit 23 is exemplarily configured to add the sum of the base ranges of the encoded quantization coefficients around the first quantization coefficient to a first preset value, to obtain a first sum value; divide the first sum value by a first value, to obtain a first ratio; and determine the index of the target context model corresponding to the base range according to the first ratio.

Optionally, the first value is 2.

Optionally, the first preset value is 2.

In some embodiments, the encoding unit 23 is exemplarily configured to determine a minimum value between the first ratio and a first preset threshold as a second value; and determine the index of the target context model corresponding to the base range according to the second value.

Optionally, the first preset threshold is 4.

In some embodiments, the encoding unit 23 is exemplarily configured to determine an offset index of the base range; and determine a sum of the second value and the offset index of the base range as the index of the target context model corresponding to the base range.

In some embodiments, the encoding unit 23 is exemplarily configured to determine the offset index of the base range according to at least one of a position of the first quantization coefficient of the current block, a size of the current block, a scan order of the current block, or a color component of the current block.

In some embodiments, in a case where the first quantization coefficient is a quantization coefficient at an upper left position of the current block, the offset index of the base range is a first threshold.

In some embodiments, in a case where the first quantization coefficient is not a quantization coefficient at an upper left position of the current block, the offset index of the base range is a second threshold.

Optionally, in a case where the color component of the current block is a luma component, the second threshold is 5.

In some embodiments, the encoding unit 23 is exemplarily configured to, in response to that the target quantization coefficient is a lower range indicated by flags 2 to 5 of the first quantization coefficient, determining an index of a target context model corresponding to the lower range according to a sum of base ranges and e lower ranges of encoded quantization coefficients around the first quantization coefficient.

In some embodiments, the encoding unit 23 is exemplarily configured to add the sum of the base ranges and lower ranges of the encoded quantization coefficients around the first quantization coefficient to a second preset value, to obtain a second sum value; divide the second sum value by a third value, to obtain a second ratio; and determine the index of the target context model corresponding to the lower range according to the second ratio.

Optionally, the third value is 2.

Optionally, the second preset value is 2.

In some embodiments, the encoding unit 23 is exemplarily configured to determine a minimum value between the second ratio and a second preset threshold as a fourth value; and determine the index of the target context model corresponding to the lower range according to the fourth value.

Optionally, the second preset threshold is 4.

In some embodiments, the encoding unit 23 is exemplarily configured to determine an offset index of the lower range; and determine a sum of the fourth value and the offset index of the lower range as the index of the target context model corresponding to the lower range.

In some embodiments, the encoding unit 23 is exemplarily configured to determine the offset index of the lower range according to at least one of a position of the first quantization coefficient of the current block, a size of the current block, a scan order of the current block, or a color component of the current block.

In some embodiments, in a case where the first quantization coefficient is a quantization coefficient at an upper left position of the current block, the offset index of the lower range is a third threshold.

Optionally, in a case where the color component of the current block is a luma component, the third threshold is 0.

In some embodiments, in a case where the first quantization coefficient is not a quantization coefficient at an upper left position of the current block, the offset index of the lower range is a fourth threshold.

Optionally, in a case where the color component of the current block is a luma component, the fourth threshold is 7.

In some embodiments, the encoding unit 23 is exemplarily configured to encode a base range of the first quantization coefficient using a target context model corresponding to a base range indicated by flag 1 of the first quantization coefficient, to obtain an encoded base range; and obtain the bitstream according to the encoded base range.

In some embodiments, the encoding unit 23 is exemplarily configured to, in response to that the first quantization coefficient further includes a lower range indicated by flags 2 to 5, encoding a lower range of the first quantization coefficient using a target context model corresponding to the lower range to obtain an encoded lower range; and determine the bitstream according to the encoded base range and encoded lower range.

In some embodiments, the encoding unit 23 is exemplarily configured to select at least one context model from the multiple context models corresponding to the target quantization coefficients, according to at least one of a quantization parameter, a transform type, a transform block size, a scan type, or a color component corresponding to the first quantization coefficient; and determine a context model corresponding to the index in the at least one context model as the target context model corresponding to the target quantization coefficient.

In some embodiments, the encoding unit 23 is further configured to initialize the multiple context models corresponding to the target quantization coefficients; and determine the target context model corresponding to the target quantization coefficient of the first quantization coefficient from initialized multiple context models corresponding to the target quantization coefficients.

In some embodiments, the encoding unit 23 is exemplarily configured to initialize the multiple context models corresponding to the target quantization coefficients using an equal probability value; or initialize the multiple context models corresponding to the target quantization coefficients using a convergent probability value, where the convergent probability value is a convergent probability value corresponding to a context model in a case where the context model is used to encode a test video.

In some embodiments, the processing unit 22 is exemplarily used to determine whether parity of the first quantization coefficient is allowed to be hidden, according to at least one of a quantization parameter, a transform type, a transform block size, a scan type, or a color component corresponding to the first quantization coefficient; and in a case where it is determined that the parity of the first quantization coefficients is allowed to be hidden, perform parity hiding on all or a portion of the second quantization coefficient, to obtain the first quantization coefficient.

In some embodiments, the processing unit 22 is exemplarily configured to, in response to that the transform type of the current block is a first transform type, determine that the parity of the first quantization coefficient is not allowed to be hidden, where the first transform type is used to indicate that at least one direction of the current block is skipped transform.

In some embodiments, the processing unit 22 is exemplarily configured to, in response to that the color component of the current block is a first component, determine that the parity of the first quantization coefficient is not allowed to be hidden.

Optionally, the first component is a chroma component.

In some embodiments, the parity of the quantization coefficient whose parity is hidden is indicated by parity corresponding to the P quantization coefficients of the current region.

In some embodiments, in response to that the parity corresponding to the P quantization coefficients is inconsistent with the parity of the quantization coefficient whose parity is hidden, the processing unit 22, configured to adjust the P quantization coefficients, to make the parity corresponding to the P quantization coefficients is consistent with the parity of the quantization coefficient whose parity is hidden.

In some embodiments, the processing unit 22 is exemplarily configured to process all or a portion of the second quantization coefficient using a preset operation mode, to obtain the first quantization coefficient.

In some embodiments, the preset operation mode includes dividing all or a portion of the second quantization coefficient by 2 and rounding a result.

In some embodiments, the processing unit 22 is exemplarily configured to, in response to that the current region meets a preset condition, perform parity hiding on all or a portion of the second quantization coefficient, to obtain the first quantization coefficient.

In some embodiments, the preset condition includes at least one of:

the number of non-zero quantization coefficients of the current region being greater than a first preset numerical value;

in the current region, a distance between a first non-zero quantization coefficient and a last non-zero quantization coefficient in a scan order being greater than a second preset numerical value;

in the current region, a distance between a first non-zero quantization coefficient and a last quantization coefficient in a scan order being greater than a third numerical preset value;

in the current region, a sum of absolute values of non-zero quantization coefficients being greater than a fourth preset numerical value;

a color component of the current block being a second component; or a transform type of the current block being not a first transform type, where the first transform type is used to indicate that at least one direction of the current block is skipped transform.

Optionally, the second component is a luma component.

In some embodiments, the processing unit 22 is further configured to, in response to that the current block is transformed using a target transform mode, skip the step of performing parity hiding on all or a portion of the second quantization coefficient, to obtain the first quantization coefficient.

In some embodiments, the target transform method includes secondary transform, multiple transform or a first transform type, and the first transform type is used to indicate that at least one direction of the current block is skipped transform.

In some embodiments, the processing unit 22 is further configured to obtain at least one flag, where the at least one flag is used to indicate whether parity of a quantization coefficient is allowed to be hidden; and in response to that it is determined that parity of a quantization coefficient of the current block is allowed to be hidden according to the at least one flag, perform parity hiding on all or a portion of the second quantization coefficient, to obtain the first quantization coefficient.

Optionally, the at least one flag includes at least one of a sequence level flag, a picture level flag, a slice level flag, a unit level flag, or a block level flag.

In some embodiments, the first quantization coefficient is a non-zero quantization coefficient which is located at a K-th position in a scan order of the current region, K is less than or equal to the number of non-zero quantization coefficients of the current region.

It should be understood that the apparatus embodiments and the method embodiments may correspond to each other, and similar descriptions may refer to the method embodiments, which will not be repeated here for the sake of brevity. Exemplarily, the video encoding apparatus 20 shown in FIG. 15 may correspond to the corresponding subject executing the methods of the embodiments of the present application, and the aforementioned and other operations and/or functions of various units in the video encoding apparatus 20 are respectively for implementing the corresponding processes in various methods, which will not be repeated here for the sake of brevity.

The above describes the apparatus and system of the embodiments of the present application from the perspective of functional units in conjunction with the accompanying drawings. It should be understood that the functional units may be implemented in a hardware form, may be implemented by instructions in a software form, or may be implemented by a combination of hardware and software units. Exemplarily, various steps of the method embodiments in the present application may be completed by an integrated logic circuit of hardware in the processor and/or an instruction in a software form. The steps of the method disclosed in combination with the embodiments of the present application may be directly embodied as being performed and completed by a hardware decoding processor, or by using a combination of hardware and software units in the decoding processor. Optionally, the software unit may be located in the mature storage medium in the art such as a random memory, a flash, a read-only memory, a programmable read-only memory or an electrically erasable programmable memory, a register. The storage medium is located in a memory, and a processor reads information in the memory and completes the steps in the above method embodiments in combination with the hardware of the processor.

FIG. 16 is a schematic block diagram of an electronic device provided by the embodiments of the present application.

As shown in FIG. 16, the electronic device 30 may be a video encoder or a video decoder as described in the embodiments of the present application, and the electronic device 30 may include:

a memory 33 and a processor 32, where the memory 33 is configured to store a computer program 34 and transmit the computer program 34 to the processor 32. In other words, the processor 32 may call the computer program 34 from the memory 33 and run the computer program 34, to implement the methods in the embodiments of the present application.

For example, the processor 32 may be configured to perform the steps in the above methods according to instructions in the computer program 34.

In some embodiments of the present application, the processor 32 may include but is not limited to:

a general-purpose processor, a digital signal processor (DSP), an application specific integrated circuit (ASIC), a field programmable gate array (FPGA) or other programmable logic devices, a discrete gate or transistor logic device, a discrete hardware component.

In some embodiments of the present application, the memory 33 includes but is not limited to:

a volatile (transitory) memory and/or a non-volatile (non-transitory) memory. Herein, the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash. The volatile memory may be a random access memory (RAM), which is used as an external cache. By way of illustrative rather than limiting illustration, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct rambus random access memory (Direct Rambus RAM, DR RAM).

In some embodiments of the present application, the computer program 34 may be divided into one or more units, the one or more units are stored in the memory 33 and executed by the processor 32 to complete the method provided by the present application. The one or more units may be a series of computer program instruction segments capable of completing specific functions, and the instruction segments are used to describe the execution process of the computer program 34 in the electronic device 30.

As shown in FIG. 16, the electronic device 30 may further include:

a transceiver 33, where the transceiver 33 may be connected to the processor 32 or the memory 33.

Here, the processor 32 may control the transceiver 33 to communicate with other devices, and exemplarily, may transmit information or data to other devices, or receive information or data transmitted by other devices. The transceiver 33 may include a transmitter and a receiver. The transceiver 33 may further include an antenna(s), and the number of antenna(s) may be one or more.

It should be understood that the various components of the electronic device 30 are connected via a bus system, where the bus system includes not only a data bus, but also a power bus, a control bus and a status signal bus.

FIG. 17 is a schematic block diagram of a video coding system 40 provided by the embodiments of the present application.

As shown in FIG. 17, the video coding system 40 may include: a video encoder 41 and a video decoder 42, where the video encoder 41 is configured to perform the video encoding method involved in the embodiments of the present application, and the video decoder 42 is configured to perform the video decoding method involved in the embodiments of the present application.

A computer storage medium is further provided by the present application, and a computer program is stored on the computer storage medium. The computer program, when executed by a computer, causes the computer to perform the method in the above method embodiments. In other words, a computer program product including instructions is further provided by the embodiments of the present application, and the instructions, when executed by a computer, cause the computer to perform the method in the above method embodiments.

When the above embodiments are implemented by using software, they may be implemented in the form of a computer program product in whole or in portion. The computer program product includes one or more computer instructions. When the computer program instructions are loaded and executed on a computer, processes or functions of the embodiments of the present application are generated in whole or in portion. The computer may be a general-purpose computer, a special-purpose computer, a computer network, or other programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center via wired (e.g., coaxial cable, fiber optic, digital subscriber line (DSL)) or wireless (e.g., infrared, radio, microwave) means. The computer-readable storage medium may be any available medium that can be accessed by the computer, or a data storage device, such as including a server or a data center that integrates one or more available mediums. The available medium may be a magnetic medium (e.g., a floppy disk, a hard disk or a magnetic tape), an optical medium (e.g., a digital video disk (DVD)) or a semiconductor medium (e.g., a solid state disk (SSD)), etc.

Those ordinary skilled in the art may realize that units and algorithm steps of the examples described in combination with the embodiments disclosed herein can be implemented in electronic hardware or in a combination of computer software and electronic hardware. Whether these functions are performed by way of hardware or software depends on a specific application and a design constraint of the technical solution. A skilled person may use different methods for each specific application, to implement the described functions, but such implementation should not be considered beyond the scope of the present application.

In the several embodiments provided in the application, it should be understood that, the disclosed systems, apparatus, and method may be implemented in other ways. For example, the apparatus embodiments described above are only schematic, for example, division of the units is only division of logical functions, and there may be other division methods in an actual implementation, such as, a plurality of units or components may be combined or integrated into another system, or some features may be ignored or not performed. Furthermore, the coupling or direct coupling or communicative connection between each other as shown or discussed may be indirect coupling or communicative connection of apparatus or units via some interfaces, which may be electrical, mechanical, or in other forms.

The units described as separate components may be or may not be physically separated, and the components shown as units may be or may not be physical units, that is, they may be located in one place, or may be distributed onto a plurality of network units. All or a portion of the units may be selected according to actual needs, to implement the purpose of the schemes of the embodiments. For example, various functional units in the various embodiments of the present application may be integrated into one processing unit, or the various units may exist physically separately, or two or more units may be integrated into one unit.

The above contents are only specific implementations of the present application, but the protection scope of the present application is not limited thereto, and any skilled familiar with this technical field may easily think of changes or substitutions within the technical scope disclosed in the present application, which should be all covered within the protection scope of the present application. Therefore, the protection scope of the present application should be subject to the protection scope of the claims.

What is claimed is:

1. A video decoding method, comprising:

decoding a bitstream, to obtain P quantization coefficients of a current region, wherein the current region is a region of a current block that comprises at least one non-zero quantization coefficient, and P is a positive integer;

determining, according to the P quantization coefficients, parity of a quantization coefficient whose parity is hidden of a first quantization coefficient, wherein the first quantization coefficient is a quantization coefficient obtained by performing parity hiding on all or a portion of a second quantization coefficient, the second quantization coefficient is a quantization coefficient whose parity is not hidden of the current region;

determining a target context model corresponding to the first quantization coefficient, and decoding the first quantization coefficient which is encoded based on context using the target context model, to obtain a decoded first quantization coefficient; and determining the second quantization coefficient according to the parity of the quantization coefficient whose parity is hidden and the decoded first quantization coefficient.

2. The method according to claim 1, wherein the target context model corresponding to the first quantization coefficient is the same as at least one of context models corresponding to other quantization coefficients whose parity is not hidden.

3. The method according to claim 1, wherein determining the target context model corresponding to the first quantization coefficient comprises:

obtaining multiple context models corresponding to target quantization coefficients, wherein the target quantization coefficients are portions of quantization coefficients among quantization coefficients; and determining a target context model corresponding to a target quantization coefficient of the first quantization coefficient from the multiple context models corresponding to the target quantization coefficients; and decoding the first quantization coefficient which is encoded based on context encoding using the target context model, to obtain the decoded first quantization coefficient comprises:

decoding the target quantization coefficient of the first quantization coefficient using the target context model corresponding to the target quantization coefficient, to obtain the decoded first quantization coefficient.

4. The method according to claim 3, wherein determining the target context model corresponding to the target quantization coefficient of the first quantization coefficient from the multiple context models corresponding to the target quantization coefficients comprises:

determining an index of the target context model corresponding to the target quantization coefficient; and determining, according to the index, the target context model corresponding to the target quantization coefficient from the multiple context models corresponding to the target quantization coefficients.

5. The method according to claim 4, wherein determining the index of the target context model corresponding to the target quantization coefficient comprises:

in response to that the target quantization coefficient is a base range indicated by flag 1 of the first quantization coefficient, determining an index of the target context model corresponding to the base range according to a sum of base ranges of decoded quantization coefficients around the first quantization coefficient; or in response to that the target quantization coefficient is a lower range indicated by flags 2 to 5 of the first quantization coefficient, determining an index of a target context model corresponding to the lower range according to a sum of base ranges and lower ranges of decoded quantization coefficients around the first quantization coefficient.

6. The method according to claim 5, wherein determining the index of the target context model corresponding to the lower range according to the sum of the base ranges and the lower ranges of the decoded quantization coefficients around the first quantization coefficient comprises:

adding the sum of the base ranges and lower ranges of the decoded quantization coefficients around the first quantization coefficient to a second preset value, to obtain a second sum value;

dividing the second sum value by a third value, to obtain a second ratio; and determining, according to the second ratio, the index of the target context model corresponding to the lower range.

7. The method according to claim 4, wherein determining, according to the index, the target context model corresponding to the target quantization coefficient from the multiple context models corresponding to the target quantization coefficients comprises:

selecting at least one context model from the multiple context models corresponding to the target quantization coefficients, according to at least one of a quantization parameter, a transform type, a transform block size, a scan type, or a color component corresponding to the first quantization coefficient; and determining a context model corresponding to the index in the at least one context model as the target context model corresponding to the target quantization coefficient.

8. The method according to claim 1, wherein the method further comprises:

determining whether parity of the first quantization coefficient is allowed to be hidden, according to at least one of a quantization parameter, a transform type, a transform block size, a scan type, or a color component corresponding to the first quantization coefficient; and determining, according to the P quantization coefficients, the parity of the quantization coefficient whose parity is hidden of the first quantization coefficient comprises:

in a case where it is determined that the parity of the first quantization coefficient is allowed to be hidden, determining, according to the P quantization coefficients, the parity of the quantization coefficient whose parity is hidden.

9. The method according to claim 8, wherein determining whether the parity of the first quantization coefficient is allowed to be hidden, according to at least one of the quantization parameter, the transform type, the transform block size, the scan type, or the color component corresponding to the first quantization coefficient comprises:

in response to that the transform type of the current block is a first transform type, determining that the parity of the first quantization coefficient is not allowed to be hidden, wherein the first transform type is used to indicate that at least one direction of the current block is skipped transform.

10. The method according to claim 8, wherein determining whether the parity of the first quantization coefficient is allowed to be hidden, according to at least one of the quantization parameter, the transform type, the transform block size, the scan type, or the color component corresponding to the first quantization coefficient comprises:

in response to that the color component of the current block is a first component, determining that the parity of the first quantization coefficient is not allowed to be hidden; wherein the first component is a chroma component.

11. The method according to claim 1, wherein the method further comprises:

in response to that the current block is transformed using a target transform mode, skipping the step of determining, according to the P quantization coefficients, the parity of the quantization coefficient whose parity is hidden of the first quantization coefficient;

wherein the target transform mode comprises secondary transform, multiple transform or a first transform type, and the first transform type is used to indicate that at least one direction of the current block is skipped transform.

12. The method according to claim 1, wherein the method further comprises:

decoding the bitstream to obtain at least one flag, wherein the at least one flag is used to indicate whether parity of a quantization coefficient is allowed to be hidden;

wherein determining, according to the P quantization coefficients, the parity of the quantization coefficient whose parity is hidden of the first quantization coefficient comprises:

in response to that it is determined that parity of at least one quantization coefficient of the current block is allowed to be hidden according to the at least one flag, determining, according to the P quantization coefficients, the parity of the quantization coefficient whose parity is hidden, wherein the at least one flag comprises at least one of a sequence level flag, a picture level flag, a slice level flag, a unit level flag, or a block level flag.

13. A video encoding method, comprising:

dividing a current block into N regions, wherein N is a positive integer;

determining a second quantization coefficient of a current region, and performing parity hiding on all or a portion of the second quantization coefficient, to obtain a first quantization coefficient, wherein the current region is a region that comprises at least one non-zero quantization coefficient in the N regions; and determining a target context model corresponding to the first quantization coefficient, and encoding the first quantization coefficient using the target context model to obtain a bitstream, wherein parity of a quantization coefficient whose parity is hidden of the first quantization coefficient is indicated by P quantization coefficients of the current region, and P is a positive integer.

14. The method according to claim 13, wherein the target context model corresponding to the first quantization coefficient is the same as at least one of context models corresponding to other quantization coefficients whose parity is not hidden.

15. The method according to claim 13, wherein determining the target context model corresponding to the first quantization coefficient, and encoding the first quantization coefficient using the target context model to obtain the bitstream comprises:

obtaining multiple context models corresponding to target quantization coefficients, wherein the target quantization coefficients are portions of quantization coefficients among quantization coefficients; and determining a target context model corresponding to a target quantization coefficient of the first quantization coefficient from the multiple context models corresponding to the target quantization coefficients; and encoding the first quantization coefficient using the target context model to obtain the bitstream comprises:

encoding the target quantization coefficient of the first quantization coefficient using the target context model of the target quantization coefficient, to obtain the bitstream.

16. The method according to claim 15, wherein determining the target context model corresponding to the target quantization coefficient of the first quantization coefficient from the multiple context models corresponding to the target quantization coefficients comprises:

determining an index of the target context model corresponding to the target quantization coefficient; and determining, according to the index, the target context model corresponding to the target quantization coefficient from the multiple context models corresponding to the target quantization coefficients.

17. The method according to claim 13, wherein the method further comprises:

determining whether parity of the first quantization coefficient is allowed to be hidden, according to at least one of a quantization parameter, a transform type, a transform block size, a scan type, or a color component corresponding to the first quantization coefficient; and performing parity hiding on all or a portion of the second quantization coefficient, to obtain the first quantization coefficient comprises:

in a case where it is determined that the parity of the first quantization coefficient is allowed to be hidden, performing parity hiding on all or a portion of the second quantization coefficient, to obtain the first quantization coefficient.

18. The method according to claim 17, wherein determining whether the parity of the first quantization coefficient is allowed to be hidden, according to at least one of the quantization parameter, the transform type, the transform block size, the scan type, or the color component corresponding to the first quantization coefficient comprises:

in response to that the transform type of the current block is a first transform type, determining that the parity of the first quantization coefficient is not allowed to be hidden, wherein the first transform type is used to indicate that at least one direction of the current block is skipped transform.

19. The method according to claim 17, wherein determining whether the parity of the first quantization coefficient is allowed to be hidden, according to at least one of the quantization parameter, the transform type, the transform block size, the scan type, or the color component corresponding to the first quantization coefficient comprises:

in response to that the color component of the current block is a first component, determining that the parity of the first quantization coefficient is not allowed to be hidden;

wherein the first component is a chroma component.

20. A video decoder, comprising a memory and a processor; wherein the memory is configured to store a computer program; and the processor is configured to execute the computer program to implement:

decoding a bitstream, to obtain P quantization coefficients of a current region, wherein the current region is a region of a current block that comprises at least one non-zero quantization coefficient, and P is a positive integer;

determining, according to the P quantization coefficients, parity of a quantization coefficient whose parity is hidden of a first quantization coefficient, wherein the first quantization coefficient is a quantization coefficient obtained by performing parity hiding on all or a portion of a second quantization coefficient, the second quantization coefficient is a quantization coefficient whose parity is not hidden of the current region;

determining a target context model corresponding to the first quantization coefficient, and decoding the first quantization coefficient which is encoded based on context using the target context model, to obtain a decoded first quantization coefficient; and determining the second quantization coefficient according to the parity of the quantization coefficient whose parity is hidden and the decoded first quantization coefficient.

\* \* \* \* \*